(12) United States Patent
Jeanty et al.

(10) Patent No.: US 12,004,451 B2
(45) Date of Patent: Jun. 11, 2024

(54) AUTONOMOUS CROP HARVESTER

(71) Applicant: Advanced Farm Technologies, Inc., Davis, CA (US)

(72) Inventors: Cedric Jeanty, Davis, CA (US); Carl Allendorph, San Diego, CA (US); Marc Grossman, Davis, CA (US)

(73) Assignee: Advanced Farm Technologies, Inc., Davis, CA (US)

( * ) Notice: Subject to any disclaimer, the term of this patent is extended or adjusted under 35 U.S.C. 154(b) by 666 days.

(21) Appl. No.: 17/282,995

(22) PCT Filed: Oct. 3, 2019

(86) PCT No.: PCT/US2019/054581
§ 371 (c)(1),
(2) Date: Apr. 5, 2021

(87) PCT Pub. No.: WO2020/076616
PCT Pub. Date: Apr. 16, 2020

(65) Prior Publication Data
US 2021/0337734 A1    Nov. 4, 2021

Related U.S. Application Data

(60) Provisional application No. 62/742,698, filed on Oct. 8, 2018, provisional application No. 62/854,264, filed on May 29, 2019.

(51) Int. Cl.
*A01D 46/30* (2006.01)
*B25J 5/00* (2006.01)
(Continued)

(52) U.S. Cl.
CPC .............. *A01D 46/30* (2013.01); *B25J 5/007* (2013.01); *B25J 9/04* (2013.01); *B25J 15/0616* (2013.01); *B65G 47/914* (2013.01); *A01D 46/253* (2013.01)

(58) Field of Classification Search
CPC .......... A01D 46/30; B25J 15/0616; B25J 9/04
See application file for complete search history.

(56) References Cited

U.S. PATENT DOCUMENTS

| 4,114,939 A | * | 9/1978 | Burt | ........................ | B65G 47/91 294/186 |
| 4,252,497 A | * | 2/1981 | Burt | ........................ | B65G 47/91 414/793 |

(Continued)

FOREIGN PATENT DOCUMENTS

| CA | 3111265 A1 | * | 9/2021 | ........... A01D 46/005 |
| CN | 105746092 | * | 7/2016 | |

(Continued)

OTHER PUBLICATIONS

International Search Report and Written Opinion mailed Feb. 6, 2020 in International Application No. PCT/US2019/054581.

*Primary Examiner* — Alicia Torres
*Assistant Examiner* — Ashley A Kaercher
(74) *Attorney, Agent, or Firm* — Knobbe, Martens, Olson & Bear LLP

(57) ABSTRACT

Systems and methods capable of selecting and positively grasping objects of interest within a cluttered environment are described. Some aspects of the present disclosure provide for real-time control of a robot that uses various sensors and reacts to sensor input in real time to adjust the robots path. In some embodiments, a robotic item picker includes an end effector having a shaft extending along a longitudinal axis between a proximal end and a distal end, a carriage configured to rotate about and translate along an intermediate portion of the shaft between a proximal position and a distal position, a suction device coupled to the distal end of the shaft, and a plurality of fingers spaced radially about the carriage. The robot may be a t-bot including a longitudinal member rotatable about a lengthwise axis of the longitudinal (Continued)

member, a carriage translatable along the lengthwise axis, and a radial member slidably mounted to the carriage. The end effector may be rotatably coupled at a distal end of the radial member.

25 Claims, 38 Drawing Sheets

(51) Int. Cl.
*B25J 9/04* (2006.01)
*B25J 15/04* (2006.01)
*B25J 15/06* (2006.01)
*B65G 47/91* (2006.01)
*A01D 46/253* (2006.01)

(56) References Cited

U.S. PATENT DOCUMENTS

| | | | | |
|---|---|---|---|---|
| 4,336,926 A * | 6/1982 | Inagaki | B25J 15/0286 | 901/17 |
| 4,749,219 A * | 6/1988 | Bolle, Jr. | B25J 15/0616 | 271/103 |
| 4,975,016 A * | 12/1990 | Pellenc | A01D 46/30 | 414/730 |
| 8,132,835 B2 * | 3/2012 | Ban | B25J 15/0616 | 294/183 |
| 8,855,818 B2 | 10/2014 | Hashimoto | | |
| 11,647,692 B2 * | 5/2023 | Knopf | B25J 11/0045 | 56/332 |
| 2001/0019692 A1 * | 9/2001 | Ehrat | B25J 17/0266 | 414/735 |
| 2005/0126144 A1 | 6/2005 | Koselka et al. | | |
| 2016/0073584 A1 * | 3/2016 | Davidson | A01D 46/30 | 294/198 |
| 2017/0273241 A1 * | 9/2017 | Salisbury | A01D 46/24 | |
| 2018/0267690 A1 | 9/2018 | Kemp et al. | | |
| 2019/0029178 A1 * | 1/2019 | Russel | A01D 46/30 | |
| 2020/0196528 A1 * | 6/2020 | Salisbury | A01D 46/005 | |
| 2020/0323140 A1 * | 10/2020 | Gielis | A01D 46/24 | |
| 2021/0045290 A1 * | 2/2021 | Takemura | B25J 13/081 | |
| 2021/0267125 A1 * | 9/2021 | Lu | A01D 46/30 | |
| 2021/0337734 A1 * | 11/2021 | Jeanty | B25J 5/007 | |
| 2022/0078972 A1 * | 3/2022 | Faulring | B25J 15/0226 | |
| 2023/0189713 A1 * | 6/2023 | Maor | A01D 46/30 | 56/328.1 |
| 2023/0225807 A1 * | 7/2023 | Kang | A61B 34/30 | |
| 2023/0321846 A1 * | 10/2023 | Lei | B65G 47/90 | 700/245 |

FOREIGN PATENT DOCUMENTS

| | | | | |
|---|---|---|---|---|
| CN | 106363653 A * | 2/2017 | | A01D 46/30 |
| CN | 106717534 A * | 5/2017 | | |
| CN | 107457795 A | 12/2017 | | |
| CN | 107457795 A * | 12/2017 | | |
| CN | 107662196 A * | 2/2018 | | |
| CN | 107662197 A * | 2/2018 | | |
| CN | 107711078 A * | 2/2018 | | |
| CN | 108271532 A * | 7/2018 | | A01D 46/30 |
| CN | 108391507 A * | 8/2018 | | A01D 46/00 |
| CN | 108582127 A * | 9/2018 | | A01D 46/30 |
| CN | 108718689 A * | 11/2018 | | |
| CN | 108718708 A * | 11/2018 | | |
| CN | 108811743 A * | 11/2018 | | A01D 46/247 |
| CN | 109105001 A * | 1/2019 | | A01D 46/30 |
| CN | 109328651 A * | 2/2019 | | A01D 46/30 |
| CN | 109463128 A * | 3/2019 | | |
| CN | 109526399 A * | 3/2019 | | |
| CN | 110431998 A * | 11/2019 | | |
| CN | 111108916 A * | 5/2020 | | |
| CN | 111758397 A * | 10/2020 | | |
| CN | 111941441 A * | 11/2020 | | |
| CN | 112136506 A * | 12/2020 | | |
| CN | 112549065 A * | 3/2021 | | A01D 46/30 |
| CN | 112640664 A * | 4/2021 | | A01D 46/30 |
| CN | 112772150 A * | 5/2021 | | |
| CN | 112930868 A * | 6/2021 | | |
| CN | 113348864 A * | 9/2021 | | |
| CN | 113414771 A * | 9/2021 | | |
| CN | 113591293 A * | 11/2021 | | |
| CN | 113858170 A * | 12/2021 | | |
| CN | 113892346 A * | 1/2022 | | |
| CN | 113994813 A * | 2/2022 | | |
| CN | 113303096 B * | 3/2022 | | A01D 46/30 |
| CN | 114175922 A * | 3/2022 | | |
| CN | 111972129 B * | 5/2022 | | A01D 46/30 |
| CN | 114431006 A * | 5/2022 | | |
| CN | 114916313 A * | 8/2022 | | |
| CN | 114916315 A * | 8/2022 | | |
| CN | 114931026 A * | 8/2022 | | |
| CN | 114946406 A * | 8/2022 | | |
| CN | 115004946 A * | 9/2022 | | |
| CN | 115067074 A * | 9/2022 | | |
| CN | 111958625 B * | 11/2022 | | A01D 46/30 |
| CN | 115250745 A * | 11/2022 | | |
| CN | 115250747 A * | 11/2022 | | |
| CN | 115413481 A * | 12/2022 | | |
| CN | 115413487 A * | 12/2022 | | |
| CN | 115462242 A * | 12/2022 | | |
| CN | 113815017 B * | 1/2023 | | |
| CN | 116048082 A * | 5/2023 | | |
| CN | 116097981 A * | 5/2023 | | |
| CN | 116369057 A * | 7/2023 | | |
| CN | 116058178 A * | 8/2023 | | |
| EP | 3138379 A1 * | 3/2017 | | A01D 45/006 |
| EP | 4176704 A1 * | 5/2023 | | A01D 46/24 |
| FR | 2 680 946 A1 | 3/1993 | | |
| JP | 59-224611 | 12/1984 | | |
| JP | H01 300822 A | 12/1989 | | |
| JP | 05-189031 | 7/1993 | | |
| JP | 08-300285 | 11/1996 | | |
| JP | 08300285 A * | 11/1996 | | |
| JP | 2000-006076 | 1/2000 | | |
| JP | 2009-027976 | 2/2009 | | |
| JP | 2009027976 A * | 2/2009 | | |
| JP | 2013-202728 | 10/2013 | | |
| JP | 2013202728 A * | 10/2013 | | |
| JP | 2017-147958 | 8/2017 | | |
| JP | 2017147958 A * | 8/2017 | | A01D 45/28 |
| JP | 7229976 B2 * | 2/2023 | | B25J 15/0641 |
| WO | WO 2006/013593 | 2/2006 | | |
| WO | WO-2006013593 A1 * | 2/2006 | | A01D 46/30 |
| WO | WO-2016090012 A1 * | 6/2016 | | A01D 46/005 |
| WO | WO-2018017616 A1 * | 1/2018 | | B25J 13/082 |
| WO | WO-2019049130 A1 * | 3/2019 | | A01D 46/084 |
| WO | WO 2020/154473 | 7/2020 | | |
| WO | WO-2020154473 A1 * | 7/2020 | | A01D 46/005 |
| WO | WO-2020168261 A1 * | 8/2020 | | A01D 45/006 |
| WO | WO 2021/141954 | 7/2021 | | |
| WO | WO-2021141954 A1 * | 7/2021 | | A01D 45/263 |
| WO | WO-2022189456 A1 * | 9/2022 | | |
| WO | WO-2022232166 A1 * | 11/2022 | | A01D 46/30 |
| WO | WO-2023046295 A1 * | 3/2023 | | |
| WO | WO-2023154267 A1 * | 8/2023 | | |

* cited by examiner

AUTONOMOUS CROP HARVESTER

CROSS-REFERENCE TO RELATED APPLICATIONS

This application is the U.S. National Phase of PCT/US2019/054581, filed Oct. 3, 2019, which claims the benefit of U.S. Provisional Application Ser. No. 62/742,698, filed Oct. 8, 2018, titled AUTONOMOUS CROP HARVESTER, and U.S. Provisional Application Ser. No. 62/854,264, filed May 29, 2019, titled AUTONOMOUS CROP HARVESTER, both of which are hereby incorporated by reference in their entirety and for all purposes.

FIELD

The present disclosure relates to robots, and more particularly to autonomous selection and retrieval of items using robots.

BACKGROUND

Industrial robots are frequently utilized in "pick and place" implementations for repeatedly retrieving and moving items. Existing systems typically require items to be pre-sorted in predetermined locations such as bins or conveyors, and are not able to accurately and precisely identify and retrieve items in cluttered environments. Many existing industrial robots are also not designed to pick and place delicate, soft-bodied objects that can be easily damaged during the acts of picking up the object, moving the object to a new location, and/or releasing the object into the new location. Robots that are designed to manipulate easily-damaged objects typically include very precise mechanical specifications and small tolerances for error to achieve high accuracy and near 100% success rate in picking and placing the object without damaging it. Such robots tend to be heavy, costly machines that are ill-suited for pick and place operations in industrial and agricultural environments and are unable to move through a field of objects with agility and precision to avoid damaging objects of interest during picking operations. In addition, existing industrial robots are not designed to pick up a plurality of delicate, differently shaped and sized, soft-bodied objects that are stationary and tethered to the ground as the objects enter into a work space of the robot moving over the plurality of objects. Accordingly, there is a need for improvement in many aspects of autonomous selection and retrieval of items using robots.

SUMMARY

The systems and methods of this disclosure each have several innovative aspects, no single one of which is solely responsible for its desirable attributes. Without limiting the scope as expressed by the claims that follow, its more prominent features will now be discussed briefly.

In one embodiment, an end effector for a picking robot is described. The end effector includes a shaft extending along a longitudinal axis between a proximal end and a distal end, a carriage configured to rotate about and translate along an intermediate portion of the shaft between a proximal position and a distal position, a suction device coupled to the distal end of the shaft, and a plurality of fingers spaced radially about the carriage, each finger coupled to the carriage by a hinge and extending distally from the carriage, the plurality of fingers configured to envelop the intermediate portion of the shaft when the carriage is in the proximal position, the plurality of fingers further configured to envelop a target object space including the distal end of the shaft and the suction device when the carriage is in the distal position.

In some embodiments, the suction device is configured to apply a vacuum to the target object space when the carriage is in the proximal position and in the distal position. In some embodiments, the suction device is a distal-most portion of the end effector when the carriage is in the proximal position, and the plurality of fingers are the distal-most portion of the end effector when the carriage is in the distal position. In some embodiments, the plurality of figures do not envelop the distal end of the shaft when the carriage is in the proximal position. In some embodiments, the plurality of fingers are configured to envelop an object within the target object space when the carriage is in the distal position. In some embodiments, each of the plurality of fingers is configured to rotate about the hinge toward the longitudinal axis of the shaft. In some embodiments, a volume of the target object space decreases when each of the plurality of fingers rotates toward the longitudinal axis of the shaft. In some embodiments, the carriage is rotationally fixed about the shaft, and wherein the shaft is rotatably mounted within the end effector such that the carriage is rotatable by rotating the shaft about the longitudinal axis. In some embodiments, the shaft includes a collar extending radially outward about the distal end of the shaft, each finger includes a finger extension extending radially inward toward the longitudinal axis at a proximal end of the finger, and, as the carriage moves from the proximal position towards the distal position, the finger extension is configured to contact the collar before the carriage reaches the distal position. In some embodiments, movement of the carriage to the distal position following contact of each finger extension with the collar causes each finger to rotate about the hinge toward the longitudinal axis. In some embodiments, movement of the carriage to the distal position following contact of each finger extension with the collar causes the volume of the target object space to decrease. In some embodiments, each finger includes at least one force sensor configured to detect a force exerted between the finger and an object within the target object space. In some embodiments, the force exerted between the finger and the object comprises at least one of a normal force and a shear force. In some embodiments, the suction device includes at least one sensor configured to detect the presence of an object within the target object space. In some embodiments, the at least one sensor is selected from the group consisting of a linear position sensor and a vacuum sensor. In some embodiments, the at least one sensor includes a linear position sensor or a 3D force sensor, wherein the object within the target object space is tethered to a stationary object, and wherein the at least one sensor is configured to detect a direction at which the object is tethered to the stationary object. In some embodiments, the end effector further includes a camera coupled to the end effector and processing circuitry configured to detect target objects based at least in part on images obtained from the camera. In some embodiments, the processing circuitry is further configured to determine target object locations with respect to a coordinate system based at least in part on the images obtained from the camera. In some embodiments, the processing circuitry is further configured to share at least one of image data and target object location data with processing circuitry associated with a second end effector. In some embodiments, the suction device is a suction cup including a collapsible bellows.

In another embodiment, a method of picking a berry is described. The method includes, by a robotic process, engaging the berry with a suction device of an end effector, moving a plurality of fingers of the end effector from a retracted configuration to an extended configuration to grip the berry, moving the berry along a vertical linear path, moving the berry along a circular arc defined by a stem of the berry as a radius, rotating the berry about a longitudinal axis of the berry, and moving the berry upward along the vertical linear path to break the stem.

In some embodiments, the berry is moved upward to break the stem with an acceleration of at least 3 g. In some embodiments, the method further includes calculating an azimuthal stem direction corresponding to the stem of the berry, wherein the circular arc is determined based on the calculated azimuthal stem direction. In some embodiments, each of the plurality of fingers comprises at least one force sensor configured to measure a force exerted on the berry by the finger, and calculating the azimuthal stem direction includes detecting a change in force at the force sensor in at least one of the fingers, and performing one or more trigonometric operations based on the detected change in force to determine an azimuthal stem direction. In some embodiments, each of the plurality of fingers includes at least one force sensor configured to measure a force exerted on the berry by the finger, and calculating the azimuthal stem direction includes, while moving the berry along the vertical linear path, detecting an increase in force at the force sensors in two of the plurality of fingers, and determining an azimuthal stem direction based at least in part on known azimuthal directions corresponding to the two of the plurality of fingers. In some embodiments, the berry is engaged based at least in part on a predetermined berry location. In some embodiments, engaging the berry includes moving the end effector such that the suction device travels along at least a portion of a calculated ray approach path, the ray approach path extending through and beyond the predetermined berry location; while moving the end effector, detecting engagement of the berry based on data received from at least one of a vacuum sensor and a linear position sensor associated with the suction device; and pausing movement of the end effector based on detecting the engagement of the berry. In some embodiments, engaging the berry includes moving the end effector such that the suction device travels along at least a portion of a calculated ray approach path to the predetermined berry location; while moving the end effector, determining an updated berry location different from the predetermined berry location based at least in part on image data from one or more imaging devices; calculating an updated ray approach path to the updated berry location; and moving the end effector along at least a portion of the updated ray approach path to engage the berry. In some embodiments, the method further includes determining the predetermined berry location based at least in part on image data from one or more imaging devices coupled to the end effector. In some embodiments, the method further includes determining the predetermined berry location based at least in part on image data from one or more imaging devices coupled to a second end effector different than the end effector that engages the berry. In some embodiments, the method further includes determining the predetermined berry location by at least detecting a berry candidate including one or more red-colored pixels in an image of a picking area, calculating a confidence level based on at least one of a count of the one or more red-colored pixels, a shape of a region defined by the one or more red-colored pixels, or a hue corresponding to at least one of the one or more red-colored pixels, and establishing, with reference to a coordinate system, the predetermined berry location corresponding to the berry candidate, based at least in part on the image.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations are merely examples and are not intended to be limiting. Throughout the drawings, similar symbols typically identify similar components, unless context dictates otherwise.

DETAILED DESCRIPTION

Figure 1:
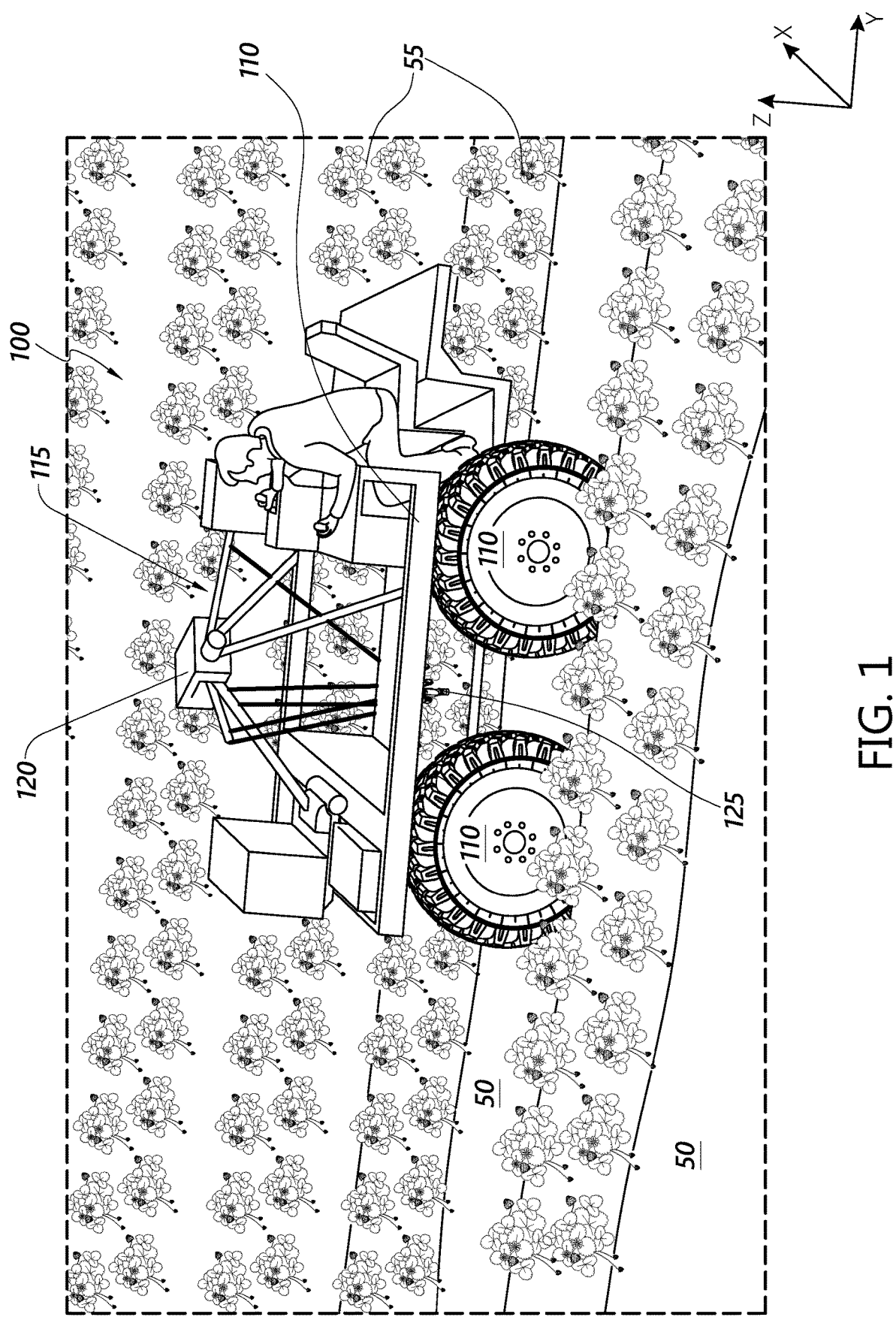
FIG. 1 depicts an example embodiment of a harvester as described herein.

Embodiments of the present disclosure provide systems and methods capable of selecting and positively grasping objects of interest within a cluttered environment. Implementations of the present disclosure can also provide real-time control of a robot that reacts to sensor input in real time to adjust the robot's path. Throughout the following description, various embodiments will be described with reference to the example implementation of picking or harvesting agricultural crops such as strawberries. However, it will be understood that any of the systems, devices, or methods described herein may equally be applied to any other robotic, industrial, agricultural, or other application, for example, harvesting of other crops, handling of eggs or other delicate items, pick and place implementations, or the like.

Existing grippers are typically capable of picking items from a controlled environment, such as a conveyor, bin, flat surface, tray, or the like. However, existing gripping robots typically require the items to be well separated, sorted by type, or otherwise prepared in advance for picking. Thus, existing gripping robots generally struggle to identify, select, and/or pick items from a jumbled, crowded, or irregular environment, such as an environment in which items are close together, do not all have the same size and shape, are mixed with other debris or materials that are not intended to be picked, etc. Such environments are challenging for successful pick and place operations because locating and retrieving items of interest requires real-time analysis of many unpredictable, constantly-changing variables, such as but not limited to visibility of items of interest that are present in many different orientations and heights, and distinguishing characteristics of an item of interest from the surrounding environment (so that resources are not expended picking objects that are not of items of interest). In the case of grippers intended for use in agricultural or industrial applications, environmental conditions, such as but not limited to changing terrain, moisture levels, time of day, temperature, lighting conditions, and density and inertia of debris surrounding items of interest, are also unpredictable variables.

Some existing grippers that use suction cups may be able to engage specific items due to their small size and the high accuracy of robots used to manipulate these grippers. However, suction cup grippers do not positively grasp items, and are therefore limited in the forces they can apply to those objects. These force limitations necessarily limit the accelerations and therefore speed at which they can move objects. The force limitations also limit the mass of the objects they can move.

Embodiments of the present disclosure provide systems and methods capable of selecting and positively grasping objects of interest within a cluttered environment. Gripping devices described herein use a combination of suction grasping and mechanical gripper grasping. In these embodiments, initial engagement of an item is accomplished with a suction cup that protrudes beyond gripper fingers when the fingers are in a retracted configuration. The retracted configuration gives the entire gripper assembly a high aspect ratio (for example, the gripper assembly is substantially longer than it is wide). Thus, the retracted configuration may advantageously allow the suction cup to reach down into crowded environments, such as a jumbled, unpredictable mess of leaves and stems, to engage a particular item, such as a berry to be picked from within the mess of leaves and stems.

Some agricultural implementations may require a relatively high acceleration (e.g., in the range of 3 g-5 g or more), such as to separate a berry or other fruit from a stem. Advantageously, embodiments of the present disclosure do not rely solely on a suction cup, which alone may not be able to apply sufficient force for a complete picking operation. Embodiments of the present disclosure advantageously include a suction cup that is capable of lifting an item of interest enough to at least partially move it clear of other surrounding items and debris, plus other features that advantageously disengage the item of interest from its surroundings and move the now-disengaged item of interest to a new location—all without damaging the item. Once the item is at least partially clear of surrounding items and debris, mechanical grasping elements such as fingers are actuated. The fingers can travel from the retracted configuration to an extended configuration. In the extended configuration, the fingers can close around the suction cup and the item engaged thereon, providing a positive grasp on the item. Thus, the gripping assemblies described herein may advantageously use initial suction actions followed by gripping actions to allow the use of a positive mechanical grasp in cluttered environments that would otherwise prevent reliable positive grasping of items.

In some aspects, the gripping assemblies described herein may further include one or more sensors configured to provide real-time feedback of grasping and/or picking operations. These sensors can allow the system to terminate and/or modify a picking sequence based on new information received from the various sensors in real-time. Real-time feedback may save time when a full predetermined cycle to pick one particular item is aborted and not completed for each item picking sequence in a series of item picking sequences. Real-time adjustment may also be advantageous by contributing to successful operation in a less structured or more irregular environment. In one non-limiting example, the robot work volume is a field of strawberry plants with thousands of individual strawberries, many of which are ready for harvest, which translates to thousands of individual item picking sequences. Relatively small time savings (for example, one second, a half second, etc.) on a percentage of these sequences due to real-time feedback thus results in significant time and cost savings. For example, although operating costs may vary by embodiment, in some cases an average time reduction of one second per pick sequence may result in a profitable operation, relative to a pick sequence that may not even break even relative to manual harvesting.

In one example of the present disclosure, the robot or an end effector (for example, a gripping assembly) coupled to the robot includes a vacuum sensor that can detect when the suction cup has generated a seal against an item of interest. The vacuum sensor may report an analog value that may be used to determine the quality or strength of the seal based on how much vacuum (e.g., negative pressure) is reported. In operating environments that are cluttered and/or have non-static items to be picked, the estimate of an item's position is not always correct due to the presence of occluding debris, motion of the items, and/or imperfect estimates of the initial location of an item. Thus, the suction cup may make contact with an item before or after it is expected to make contact due to movement or an inaccurate assessment of the item's position. In view of this, the robot's suction mechanism may be configured to follow a path extending through and beyond the item's estimated position. However, once a vacuum is detected at the vacuum sensor, a processor controlling the robot may stop forward motion because the detected vacuum indicates that the suction cup has made contact with the item, or is very likely to have made contact with the item with a high degree of confidence.

In another example, the suction cup (or a vacuum generator or other structure to which the suction cup is attached) may include a push switch or other positional detector. A positional detector may allow the system to detect when the gripping assembly has made contact with or "run into"

something, such as an item or other debris. Thus, rather than continuing through a fully predetermined sequence, the gripping assembly may detect if it is running into an item and can stop forward motion in response to this detected contact. Thus, a positional detector, alone or in combination with a vacuum sensor, can advantageously allow a gripping assembly to reach for items without the system controlling the gripping assembly having exact certainty of where the items are, by planning to travel through an item based on assessment of the item's likely position but stopping once contact is made (or very likely to have been made within a certain degree of confidence).

In a third example, some or all of the fingers in a gripping assembly can each include one or more force sensors within the finger. A force sensor can be positioned to detect the force exerted by a single finger on an item being grasped by a plurality of fingers. Thus, force sensors may be used to detect when an item is being grasped and, based on real-time feedback from the sensor, avoid exerting too much grasping force against a delicate item, such as a berry. Moreover, if the item of interest is tethered to a stationary object (for example, a berry on a stem connected to a bush planted in the ground), the forces detected at the force sensors within the three fingers can be used to determine the direction from which the tether is pulling against the gripping assembly's motion. More specifically, when the gripper is moved away from the initial grasp location, the corresponding changes in the force sensor measurements can be used to determine the stem or tether direction based on known trigonometric principles. As will be described in greater detail below, picking efficiency, success rate, and sensitivity of the grasping and disengagement operations to minimize damage may be improved when the stem or tether direction is known. In a further example, the force sensors in the fingers may be advantageously used to detect when a grasped item has been dropped and, when an accidental drop is detected, stop and re-attempt to pick up the item rather than waste time by continuing to a pre-determined drop location without the item.

The harvesters described herein may use eye-in-hand configurations in which some or all of the imaging cameras used to detect and identify items for picking are mounted on the moving end effectors, rather than in a static location within the system. Eye-in-hand configurations of the present disclosure have several advantages for picking implementations. For example, cameras mounted on implementations of end effectors of the present disclosure can look around objects such as foliage or the end effector itself, that would otherwise partially block images taken from a static viewpoint. In another example, during a picking sequence of a first object of interest, end effector-mounted cameras may be able to identify several possible ray approach paths that can later be used by an end effector to approach a second item of interest for picking without running into debris or clutter in the vicinity of the item, thereby increasing efficiency, success rate, and/or sensitivity of the second picking sequence. In yet another advantage, eye-in-hand configurations may allow for less precise or well-calibrated cameras to be used. For example, an error in item position estimation due to camera calibration may be relatively large for a camera located above the end effector, but may be significantly smaller for a camera located on the end effector near the item. In addition, analysis of image data may be simplified because positioning a camera on the end effector may eliminate the need to accurately calculate the location of the end effector based on image data.

Example Harvester According to the Present Disclosure

FIG. 1 depicts an example embodiment of a harvester 100 as described herein. The harvester 100 includes wheels 105 supporting a platform 110. The harvester 100 further includes one or more work cells 115, each work cell 115 including one or more robots 120. Each robot 120 is configured to support and move an end effector 125 for picking and removing items within a work volume. The work volume is a region of three-dimensional space, generally below the harvester 100, in which the robot or robots of a work cell 115 are configured to move and pick items. In some embodiments, the work volume can include a volume of space at and above the surface of an agricultural field, including but not limited to a field of strawberry plants. The wheels 105 can be sized, shaped, and spaced so as to sit within furrows 50 of an agricultural field such that the platform 110 supports the work cells 115, robots 120, and end effectors 125 over one or more rows 55 disposed between the furrows 50. In the example implementation depicted in FIG. 1, the rows contain strawberry plants including at least some ripe strawberries to be picked. It will be understood that embodiments of the harvester 100 are not limited to moving in the work volume using wheels. Any other suitable mechanism can be employed, such as but not limited to a sliding sled mounted on rails running in the furrows or an elevated platform moved on a cable suspended over the work volume.

The harvester 100 may further include one or more motors under control of processing circuitry and configured to drive one or more of the wheels 105 to propel the harvester 100 along the furrows 50. The motors and processing circuitry may be configured to propel the harvester 100 at a constant or substantially constant speed, and/or may be configured to propel the harvester 100 at a variable speed. For example, in some embodiments the harvester 100 may travel more slowly or stop when a relatively large number of items have been identified to be picked within the working volume of one or more work cells 115, and may travel at a relatively higher speed when fewer items have been identified to be picked within the working volumes of the work cells 115.

Figure 2A:
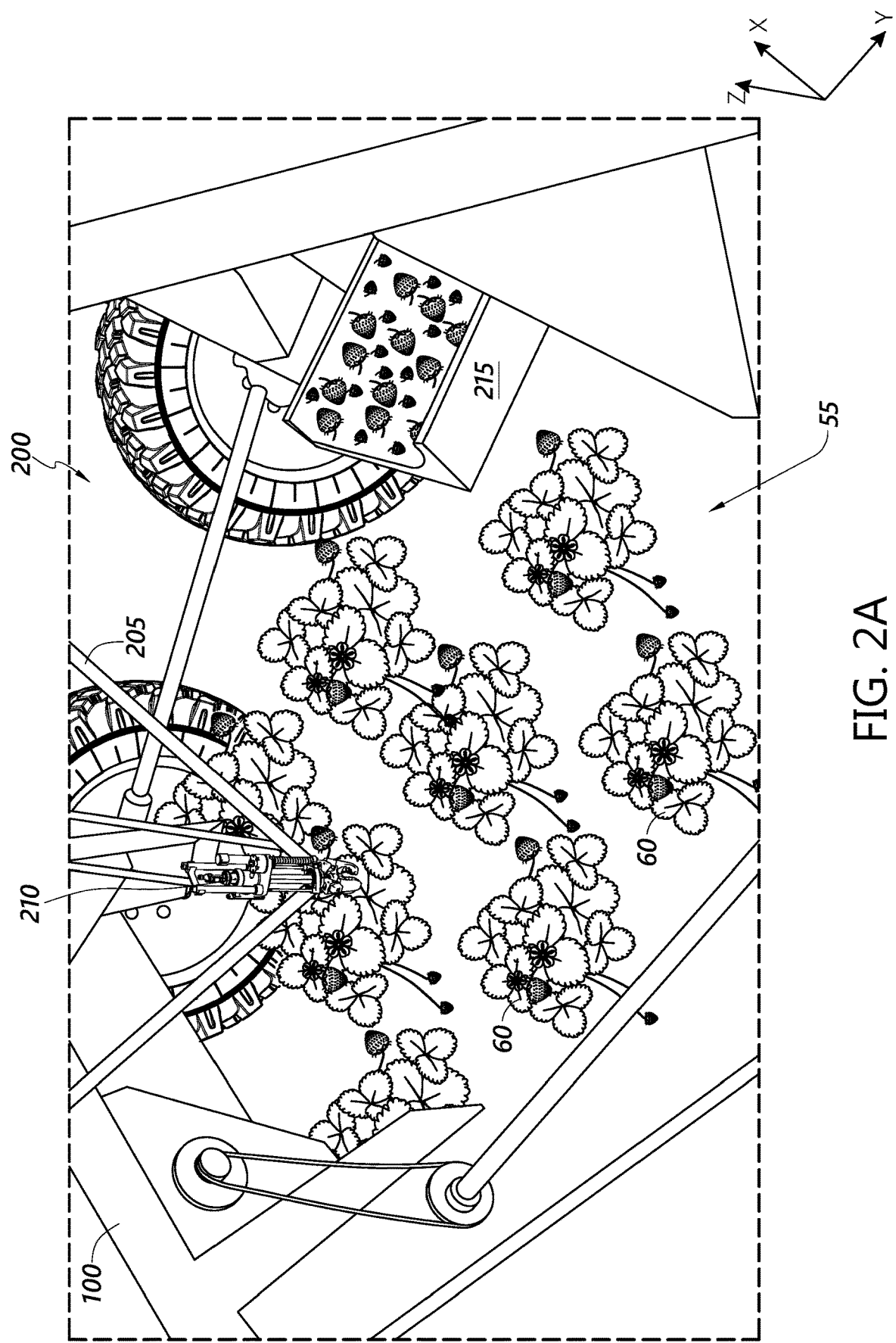
FIGS. 2A and 2B depict an example embodiment of a harvester work cell including a portion of a robot and an end effector of the harvester of FIG. 1.
Figure 2B:
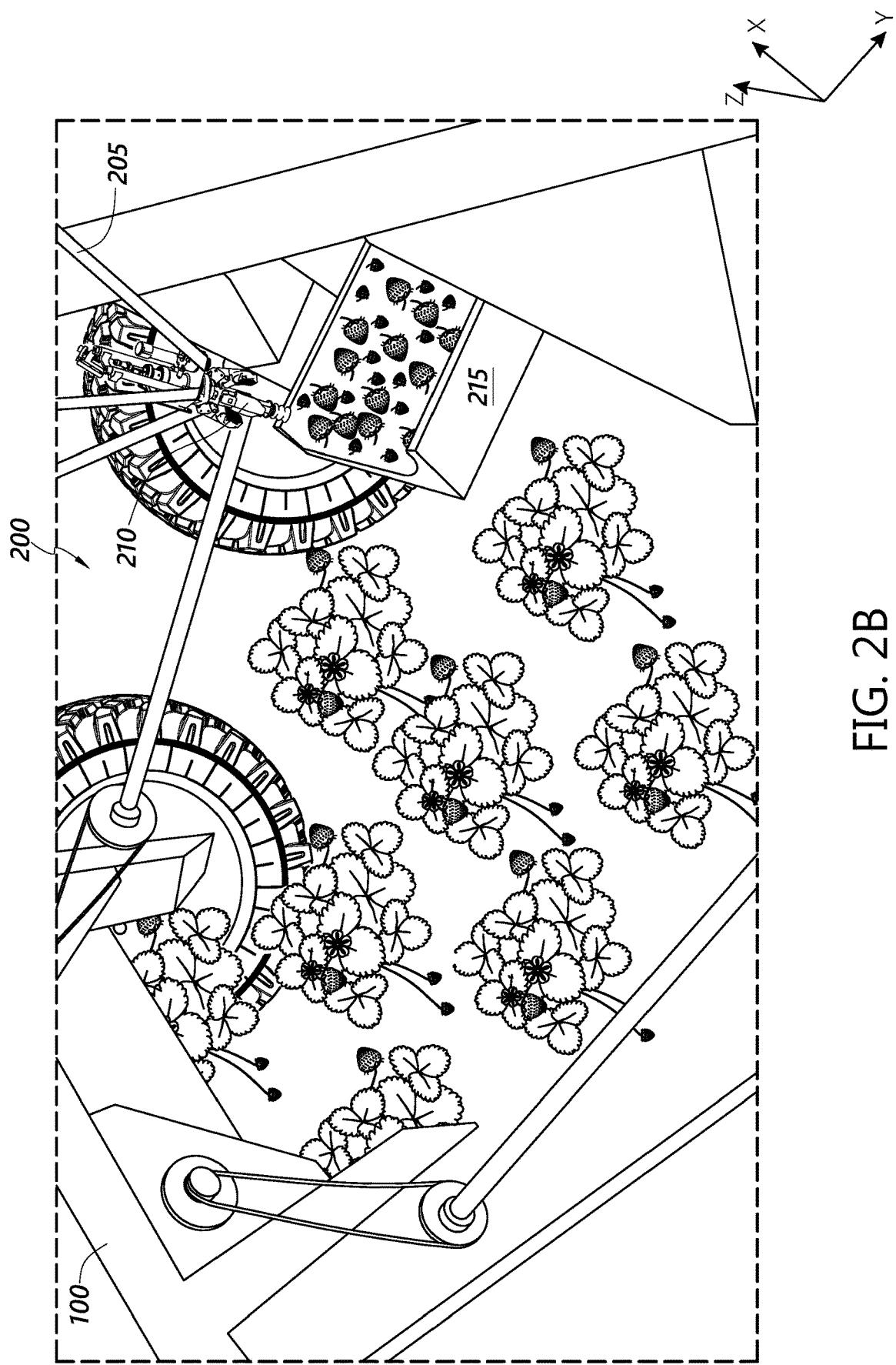

FIGS. 2A and 2B depict close-up views of a portion of the harvester 100 of FIG. 1. The views of FIGS. 2A and 2B illustrate a work cell 200, including a receptacle for picked items 215 and a portion of a robot 120 having arms 205 and an end effector 210. As described with reference to FIG. 1, the harvester 100 supports the robot 120 and the end effector 210 over a row 55 including plants 60. The robot 120 and the end effector 210 are movable within the work volume relative to the harvester 100. The views in FIGS. 2A and 2B are images of individual points in time during picking operations. However, it will be understood that the work volume moves in space relative to the harvester 100 as the harvester moves along the rows 55, adding to the complexity of the picking methods described herein.

In the example harvester 100 of FIGS. 2A and 2B, the robot 120 is a delta robot configured to move the end effector 210 using arms 205. In some embodiments, delta robots may be advantageous for the systems described herein as they can provide relatively high speed and/or acceleration, as well as high stability for supporting the end effector 210. In other implementations, a t-bot or any other suitable type of robot, robotic arm, or the like may be used to support and position the end effector 210 within the harvester 100.

While the work cell 200 is disposed above the row 55, individual items such as berries may be picked from the plants 60 by the robot using the end effector 210. As shown in FIG. 2A, the arms 205 may position the end effector 210 above a plant 60 containing an item of interest to be picked. Once the end effector 210 has grasped and picked the item, the arms 205 move the end effector 210 and the item to a location above the receptacle 215, as shown in FIG. 2B. When the end effector 210 is above the receptacle 215, the end effector 210 releases the item such that the item falls into the receptacle 215. In some embodiments, overall harvesting speed may be increased by causing the end effector 210 to release the item before reaching a location above the receptacle 215, while traveling toward the receptacle 215, such that the item's velocity and trajectory carries it across the remaining lateral distance to fall into the receptacle 215.

Figure 3A:
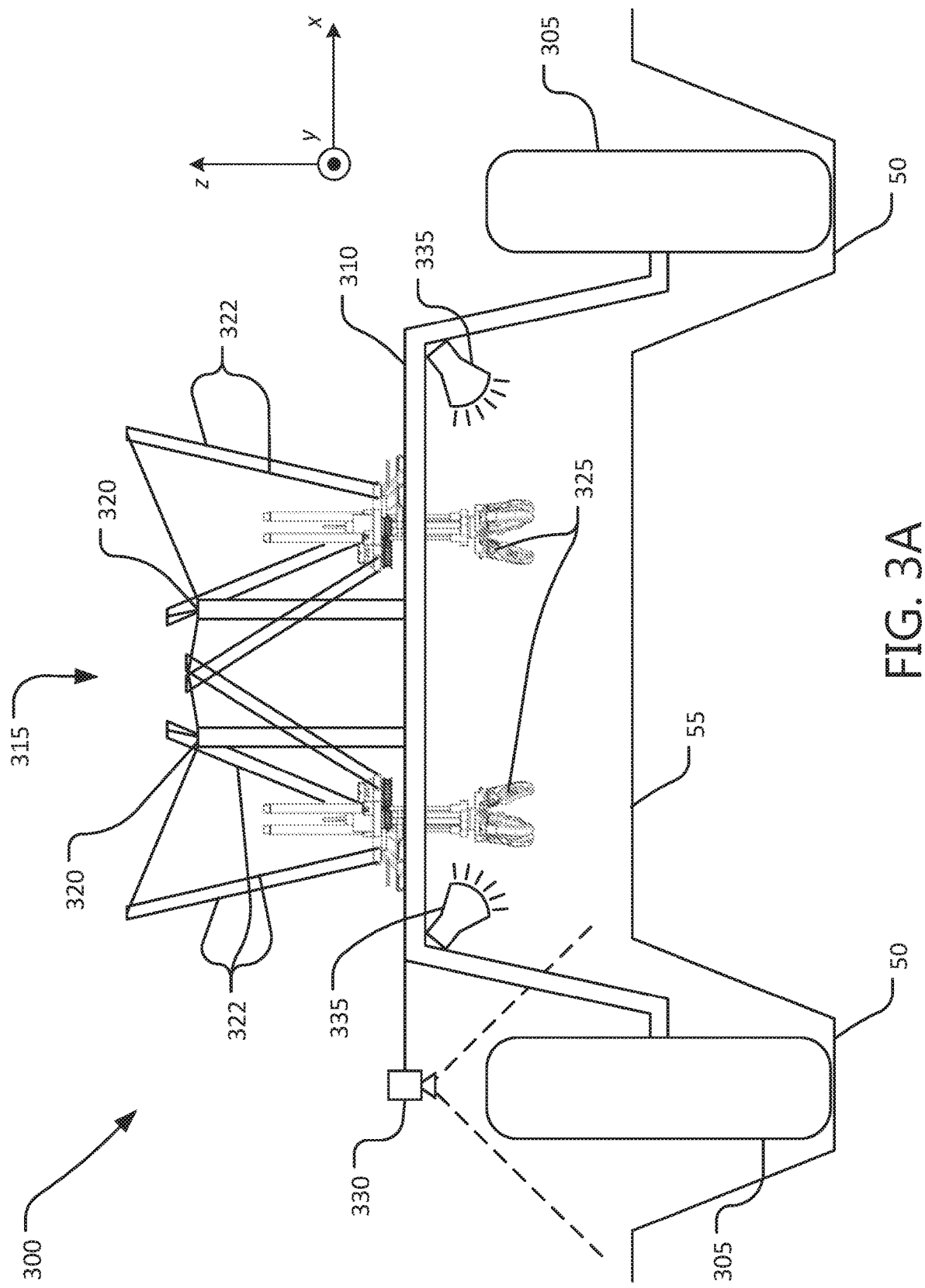
FIG. 3A is a cross-sectional view schematically illustrating components of a first example harvester, including a first example robot that can be implemented on a harvester as described herein such as the harvester of FIG. 1.

FIG. 3A is a cross-sectional view schematically illustrating components of an example harvester 300 according to the present disclosure. Similar to the harvester 100 of FIGS. 1, 2A, 2B, the harvester 300 includes a plurality of wheels 305 supporting a platform 310. The harvester 300 includes at least one work cell 315, the at least one work cell including at least one robot 320. The example harvester 300 illustrated in FIG. 3A includes one work cell 315 that includes two robots 320, each robot 320 having a plurality of arms 322 configured to support and manipulate an end effector 325 for picking. However, more than two robots 320 may also be included in a work cell 315. As will be described in greater detail below, multiple robots 320 operating within a single work cell 315 may be in communication such that they can avoid mutual interference while moving. In addition, multiple robots 320 within a work cell 315 may exchange information regarding location and acquisition of target items to enhance the accuracy and/or efficiency of identifying and picking items.

The harvester 300 is configured to travel within an agricultural field. Accordingly, the platform 310 is positioned relative to the wheels 305 such that the platform 310 is supported above a row 55 while the wheels 305 travel along the bottom of furrows 50 surrounding the row 55. Although the harvester 300 is depicted as having a single work cell 315 supported by wheels 305 spaced to travel in adjacent furrows 50, larger harvesters 300 including more than one work cell 315 can equally be implemented using the systems and methods described herein. For example, a harvester 300 may have a wider wheel base such that the harvester spans two, three, four, or more rows 55. Generally, such harvesters 300 may have an individual work cell 315 for each row, and may further include additional wheels 305 spaced to travel in intermediate furrows 50 to support the frame 310. In one particular example, a harvester 300 is sized to span three rows 50, and thus includes three work cells 315 spaced along the x-axis, each work cell 315 including two robots 320 and two end effectors 325. In another example, a harvester 300 may include multiple work cells 315 spaced along the y-axis and configured to operate on a single row, for example, a forward work cell 315 and an aft work cell 315. In this example, the forward work cell 315 may pick only a portion (for example, half) of the items of interest in the work volume, while the aft work cell picks the remaining items of interest from the work volume after the forward work cell 315 has conducted a first pass.

The harvester 300 may be propelled autonomously along the furrows 50. In some embodiments, at least one guidance sensor 330 is coupled to the harvester 300 to detect the contour of the furrow 50. In various implementations, the guidance sensor 330 may include any one or more of a LIDAR system, an optical detector such as a camera, or the like. A guidance system of the harvester 300 may steer one or more wheels of the harvester 300 such that the wheels 305 remain within and do not impact the sides of the furrows 50. Light sources 335 may further be provided to illuminate at least a portion of the row 55 and/or furrows 50 to facilitate picking and/or guidance operations. Harvester guidance is described in greater detail below with reference to FIGS. 9A-10.

Figure 3B:
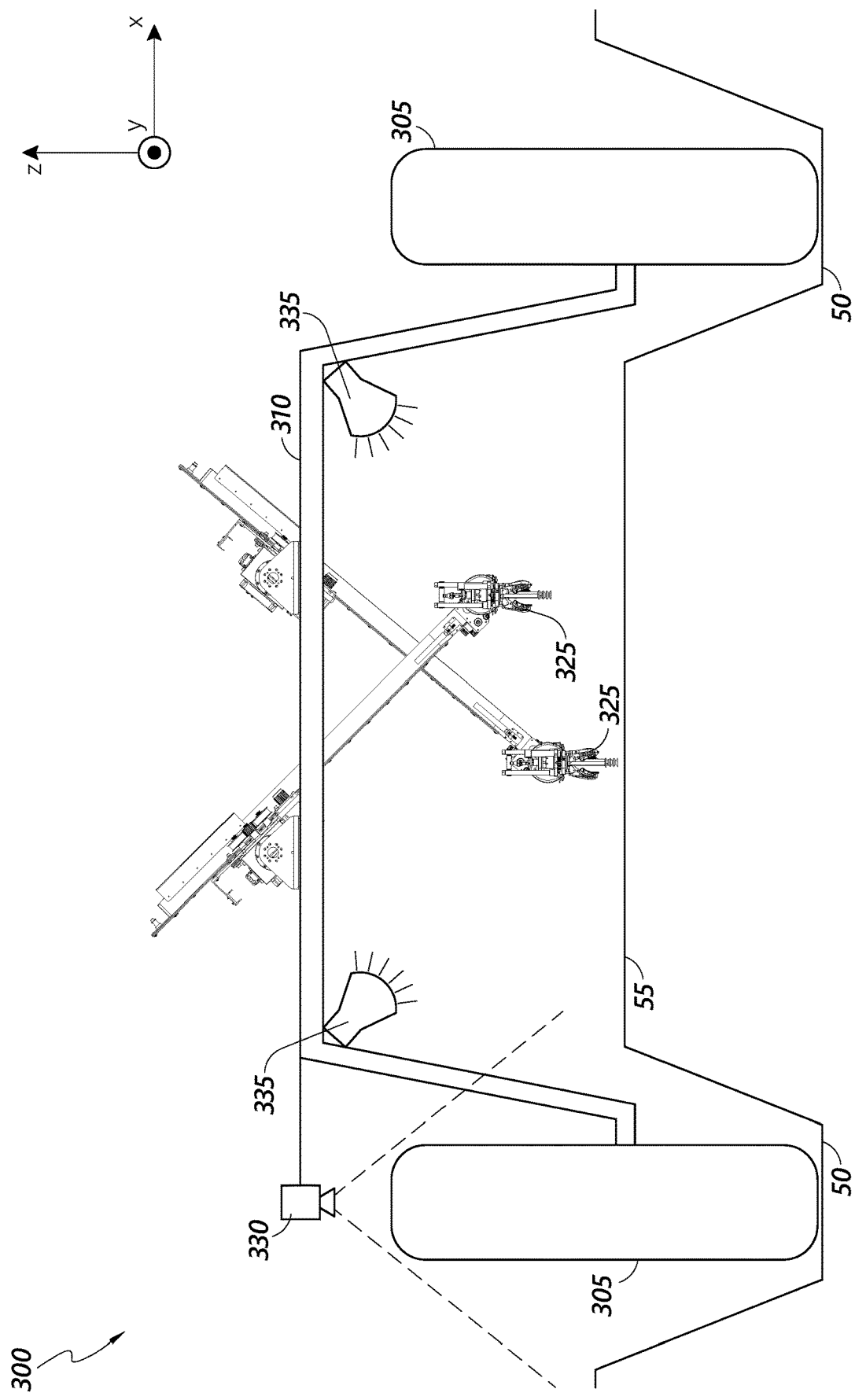
FIG. 3B is a cross-sectional view schematically illustrating components of a second example harvester, including a second example robot that can be implemented on a harvester as described herein such as the harvester of FIG. 1.

FIG. 3B schematically illustrates a further example of a harvester 300. While the robots 320 of FIG. 3A were illustrated as delta robots, the robots 320 of FIG. 3B are illustrated as modified t-bots. In some embodiments, a t-bot or modified t-bot may advantageously be smaller than a delta robot and/or may include fewer components capable of extending toward components of an adjacent robot. Thus, the modified t-bot implementations described herein may advantageously reduce the probability of a collision occurring between multiple robots of a harvester, may reduce and/or simplify the computational requirements for preventing collisions between robots, may reduce interference with other objects within the picking area (e.g., branches and the like), may provide a high aspect ratio suitable for reaching into plants or other cluttered areas, and may include various other operational advantages as will be described in greater detail with reference to FIGS. 12A-12G.

Figure 3C:
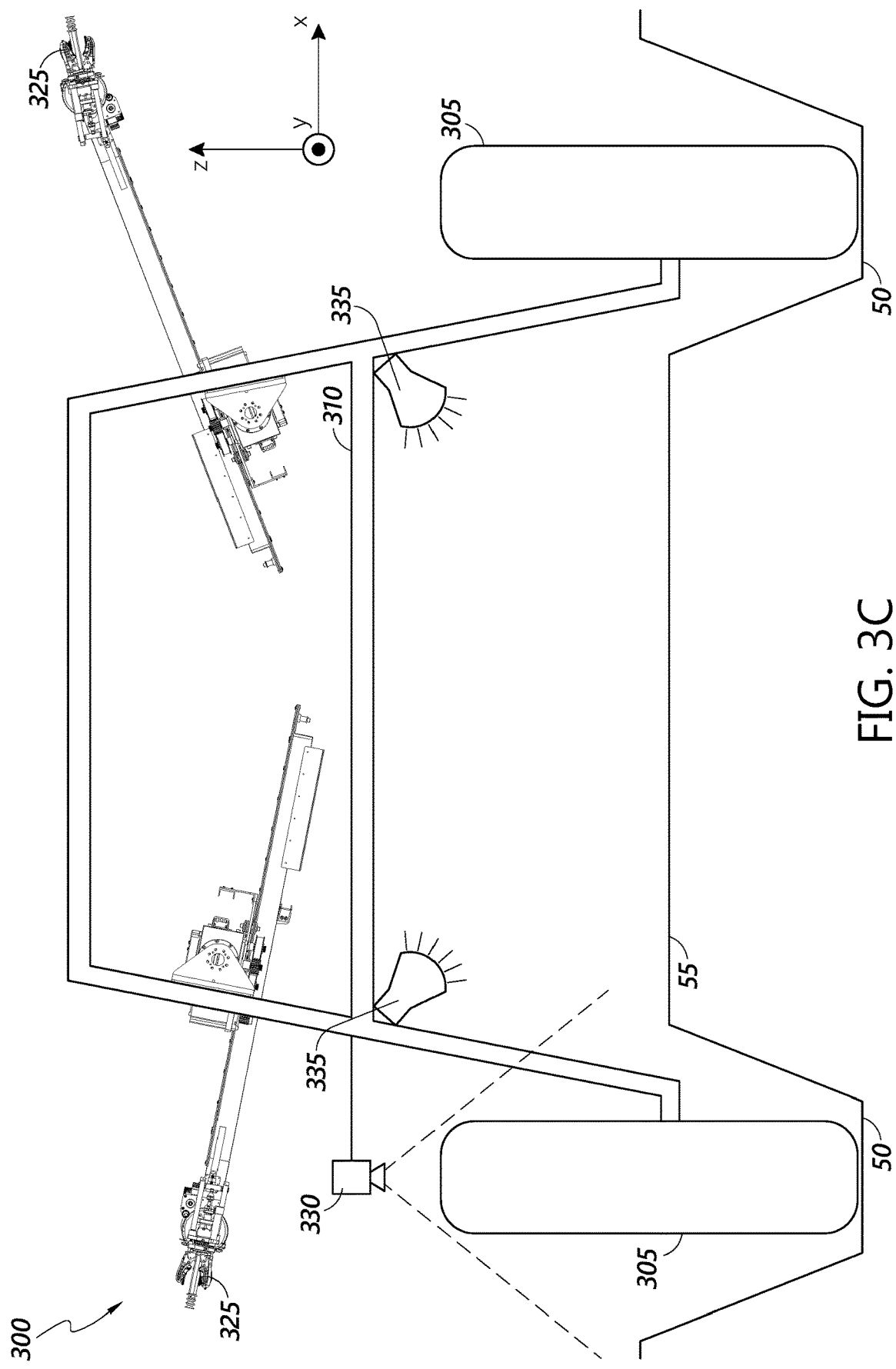
FIG. 3C is a cross-sectional view schematically illustrating components of a third example harvester, including the second example robot of FIG. 3B in a horizontal configuration for picking vertically oriented items.

FIG. 3C schematically illustrates an additional example of a harvester 300. As shown in FIG. 3C, the robots 320 of FIG. 3B may be oriented in a horizontal configuration instead of or in addition to the vertical configuration illustrated in FIG. 3B. In some embodiments, a horizontal configuration may allow the harvester 300 to be used for picking vertically grown crops such as vine crops, tree crops, or vertically grown arrangements of crops such as strawberries or other conventionally horizontal crops. The horizontal configuration may further allow the harvester 300 to be used for pruning implementations.

Figure 4A:
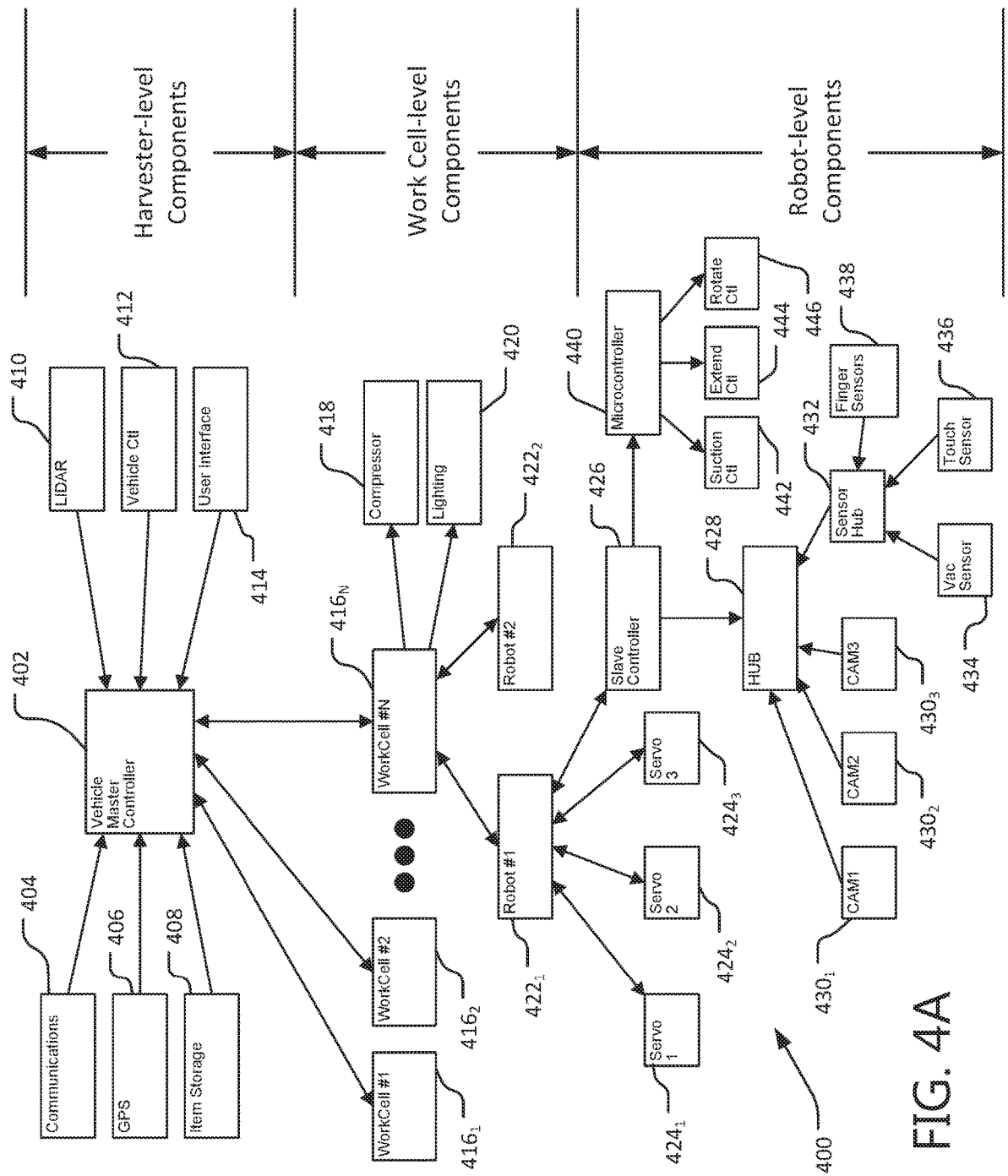
FIG. 4A is a high-level schematic block diagram illustrating hardware components of an example embodiment of a harvester as described herein.

FIG. 4A is a high-level schematic block diagram illustrating a hardware hierarchy of an example harvester 400. The harvester 400 includes a vehicle master controller 402, a communications module 404, a GPS module 406, an item storage container 408, a LIDAR system 410, a vehicle control unit 412, a user interface 414, and any number of work cells $416_1$, $416_2$, . . . $416_N$. Each work cell $416_1$, $416_2$, . . . $416_N$ includes an air compressor 418, lighting 420, and two robots $422_1$, $422_2$, although in some embodiments work cells may contain a single robot or more than two robots. Although only illustrated for work cell $416_N$, it will be understood that the other work cells may each include similar components. Each robot $422_1$, $422_2$ includes an end effector and servos $424_1$, $424_2$, $424_3$ for moving the end effector. Although various subcomponents are only depicted for robot $422_1$, any other robots within the harvester 400 may include similar components. The end effector includes at least a slave controller in communication with an end effector hub 428 and an end effector microcontroller 440. The end effector hub 428 is in communication with any input devices of the end effector, including one or more cameras $430_1$, $430_2$, $430_3$, and a sensor hub 432. Some or all of the cameras $430_1$, $430_2$, $430_3$ may be disposed on the end effector (e.g., eye-in-hand configurations) or elsewhere, such as on a robot $422_1$, $422_2$, or on another moving or stationary component of the harvester 400. The sensor hub 432 receives data from a vacuum sensor 434, a touch sensor 436, and finger sensors 438 located within the end effector. The microcontroller 440 is configured to actuate a suction control 442, finger extension control 444, and rotation control 446 of the end effector. Although various processing components are described as being distributed among various controllers, microcontrollers, hubs, and the like, it will be understood that any of these components and/or processing operations may be differently grouped and/or may be implemented in more or fewer components than those depicted in FIG. 4A.

The vehicle master controller 402 is in communication with each work cell $416_1$, $416_2$, ... $416_N$ in the harvester. The vehicle master controller is also in communication with harvester-level components including the communications module 404, the GPS module 406, the LIDAR system 410, the vehicle control unit 412, and the user interface 414. The vehicle master controller 402 can control the movement and/or navigation of the harvester 400, for example, based on information received from the work cells $416_1$, $416_2$, ... $416_N$, the robots $422_1$, $422_2$, or other components. As described with reference to FIG. 3, the vehicle master controller 402 may use ground contour information from the LIDAR system 410 to cause the vehicle control unit 412 to steer the harvester 400 such that the wheels of the harvester remain within furrows and do not collide with planting rows. The vehicle master controller 402 may use location data from the GPS module 406 to execute a predetermined harvesting path, report the harvester's location via the communications module 404, or perform other position-related functions such as yield logging/recording, plant health logging/recording, blossom count logging/recording, etc. The vehicle master controller 402 may report other metrics (e.g., key performance indicators). For example, the vehicle master controller 402 may report metrics such as berries picked per robot, current pick rate (e.g., in seconds per berry), or other operational information associated with the harvester 400. The communications module 404 may be configured to communicate by one or more wireless communication paths, such as a cellular network, mobile internet (e.g., 3G, LTE, etc.), Bluetooth, near field communication (NFC), Wi-Fi, or the like.

The harvester may have any number of work cells $416_1$, $416_2$, ... $416_N$. Each work cell $416_1$, $416_2$, ... $416_N$ may include a dedicated compressor 418 for supplying pressurized air for pneumatic systems, and lighting 420 to illuminate the picking area of the work cell $416_1$, $416_2$, ... $416_N$. If the work cells $416_1$, $416_2$, ... $416_N$ each include more than one robot $422_1$, $422_2$, the robots $422_1$ and $422_2$ of the work cell may be in communication with each other to avoid colliding during picking operations. Each robot $422_1$, $422_2$ includes one or more servos $424_1$, $424_2$, $424_3$ for moving the end effector within the work cell area. In the example of a delta robot, three servos may be used. In the example t-bot embodiments described herein, three or more servos may be used, for example, depending on the number of axes included in the particular t-bot design.

Figure 4B:
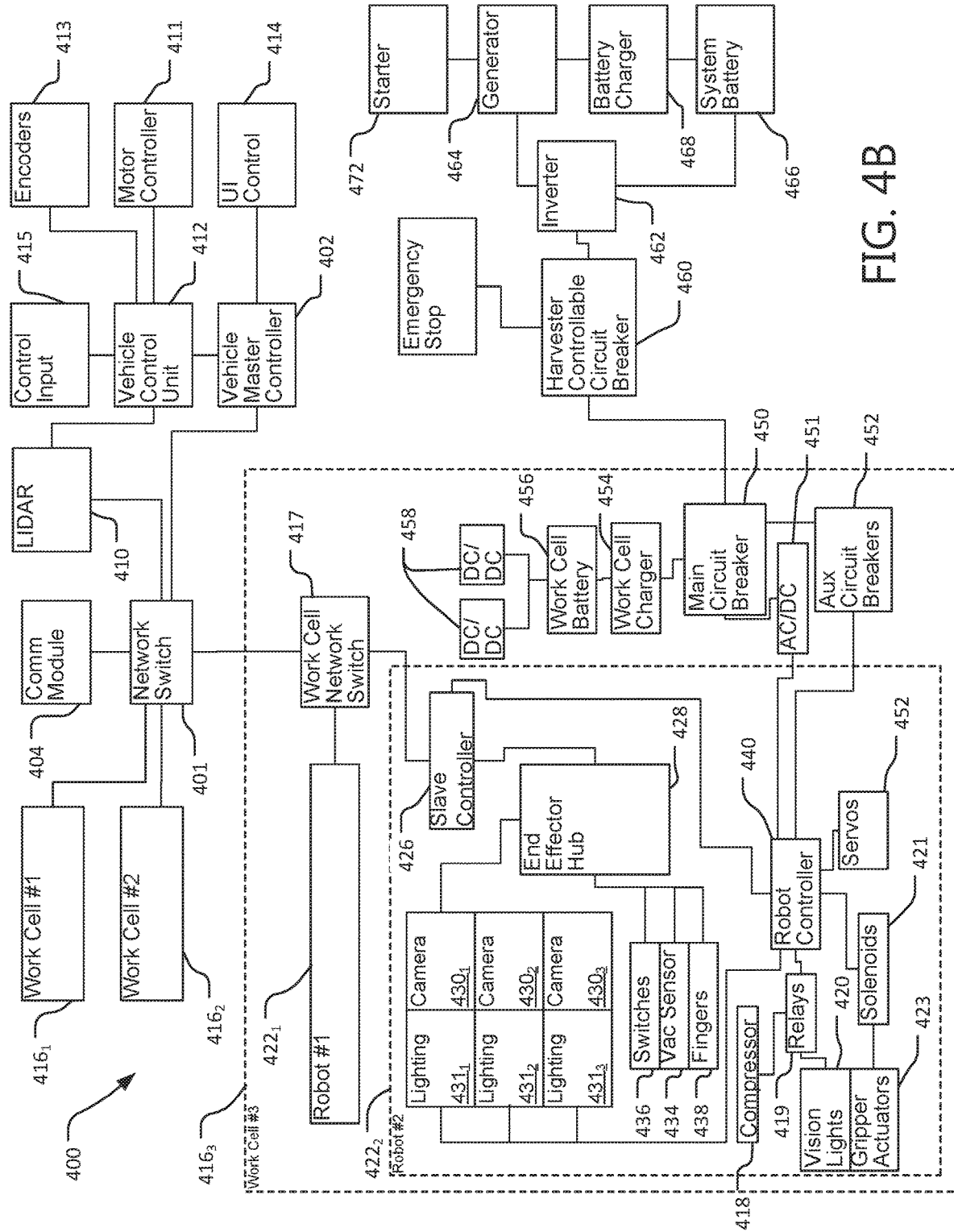
FIG. 4B is a schematic block diagram illustrating hardware components of the harvester of FIG. 4A.

Consistent with the hierarchy of FIG. 4A, FIG. 4B is a schematic block diagram illustrating electrical connections and hardware components of an example implementation of a harvester 400 according to one implementation of the present disclosure. FIG. 4B schematically illustrates a harvester 400 including three work cells $416_1$, $416_2$, $416_3$. Although only the components of work cell $416_3$ are shown in FIG. 4B, it will be understood that work cells $416_1$ and $416_2$ can include all or a subset of the components illustrated within work cell $416_3$. A network switch 401 provides for switchable communications between each of the work cells $416_1$, $416_2$, ... $416_N$ and harvester-level components such as the vehicle master controller 402, the LIDAR system 410, and the communications module 404. The vehicle master controller 402 is directly or indirectly in electrical communication with the vehicle control unit 412, motor controller 411, vehicle control encoders 413, vehicle control input 415, and user interface control 414. The vehicle control unit 412 may be a microcontroller or other processing circuitry configured to receive information from the vehicle control encoders 413 and vehicle control input 415. The vehicle control unit 412 may further be configured to command the motor controller 411. The motor controller 411 may be electrical drivers or the like, configured to rotate one or more drive motors using system power to move the harvester 400. The vehicle control encoders 413 may be, e.g., rotary encoders or the like, configured to communicate angular position and/or speed of one or more drive motors of the harvester 400. The vehicle control input 415 is a device for receiving manual control commands, such as a joystick or the like. In various embodiments, the vehicle control unit 415 may be used for diagnostic operation, initial position, storage, or other non-autonomous aspects of harvester 400 operation. The user interface control 414 may include additional manual controls such as one or more buttons, an on/off switch and/or key, status indicator or annunciator lamps, or the like. Certain embodiments of the harvester 400 may not include a vehicle control unit 415 and/or user interface control 414, and may be configured to operate autonomously without input from the vehicle control unit 415 and/or user interface control 414.

A work cell-level network switch 417 is included within each of the work cells $416_1$, $416_2$, ... $416_N$ to route communications between the harvester-level network switch 401 and components of the work cell $416_1$, $416_2$, ... $416_N$. In this example implementation, each work cell includes two robots $422_1$, $422_2$ in communication with the network switch 417. Within each robot $422_1$, $422_2$, a slave controller 426 provides connectivity between the work cell-level network switch 417 and the end effector hub 428 and robot controller 440. The end effector hub 428 is in communication with and configured to receive sensor data from one or more vacuum sensors 434, linear position sensors 436, and finger force sensors 438.

The end effector hub 428 is further in communication with cameras $430_1$, $430_2$, $430_3$, some or all of which may be mounted to the end effector in an eye-in-hand configuration. Lighting elements $431_1$, $431_2$, $431_3$, which may be located adjacent to corresponding cameras $430_1$, $430_2$, $430_3$, are in communication with the robot controller 440, which is configured to control the activation and/or intensity of the lighting elements $431_1$, $431_2$, $431_3$. In some embodiments, the robot controller 440 may be configured to control the lighting elements $431_1$, $431_2$, $431_3$ based at least in part on image data received from the cameras $430_1$, $430_2$, $430_3$ at the end effector hub 428. For example, the intensity of light produced at an individual lighting element (e.g., element $431_1$) may be reduced when the overall light intensity detected at the corresponding camera $430_1$ is higher than a predetermined threshold, or when it is determined that an object is in close proximity to the camera $430_1$. In some embodiments, the robot controller 440 may be configured to control the lighting elements $431_1$, $431_2$, $431_3$ based at least in part on one or more light sensors located near the cameras $430_1$, $431_2$, $430_3$, and/or based on detected proximity to an object.

The robot controller 440 is further in communication with, and configured to at least partially control, various other switchable or controllable robot components, such as one or more relays 419 for controlling an air compressor 418 and/or vision lights 420, one or more solenoids or other switches for controlling actuators 423 within the end effector, and the servos 424 for controlling the robot to move the end effector.

Electrical power for operation of the harvester 400, work cells 416₁, 416₂, 416₃, and robots 422₁, 422₂ can be received from a system battery 466 and/or a generator 464. Additional components such as a starter 472 for the generator 464 and a battery charger 468 for charging the system battery from the generator 464 may be provided. An inverter 462 and one or more harvester-level circuit breakers 460 can be in communication with the generator and system battery to provide electrical power to each work cell 416₁, 416₂, 416₃. An emergency stop switch 470 may be provided to allow an operator to cut off power to the harvester 400.

Within each work cell 416₁, 416₂, 416₃, a work cell main circuit breaker 450 is connected to the harvester-level circuit breaker 460 as well as any auxiliary circuit breakers 452. An AC/DC converter 451 within the work cell provides DC electrical power to the robot controller 440. A work cell-level battery charger 454 can charge a work cell battery 456. The work cell battery 456 may be connected to one or more DC/DC converters 458 to provide DC electrical power at one or more desired voltages as necessary to operate the various electrical components within the work cell 416₁, 416₂, 416₃. Various embodiments may include alternative power supply configurations, for example, including features such as thermal circuit breakers, contactors or other relays, emergency stop circuitry, or the like.

Example End Effector According to the Present Disclosure

FIGS. 5A-5D depict an example end effector 500 or gripper according to one implementation of the present disclosure. The end effector 500 is configured to operate in conjunction with a robot to identify, select, and pick items. As will be described in greater detail, the end effector 500 includes various features that may provide enhanced utility for the picking of delicate items, such as berries or other agricultural products, as well as for picking items in a cluttered and/or non-static environment. The end effector 500 may operate at least partially under the control of a controller 501 (which can be, for example, slave controller 426 described above with reference to FIG. 4A) and/or other processing components. The end effector 500 in this example includes a base 510, a shaft 520, and a carriage 530 coupled to a plurality of fingers 540. Although the end effector 500 is illustrated as having three fingers 540, some embodiments may include two fingers, four fingers, five fingers, or more.

Figure 5A:
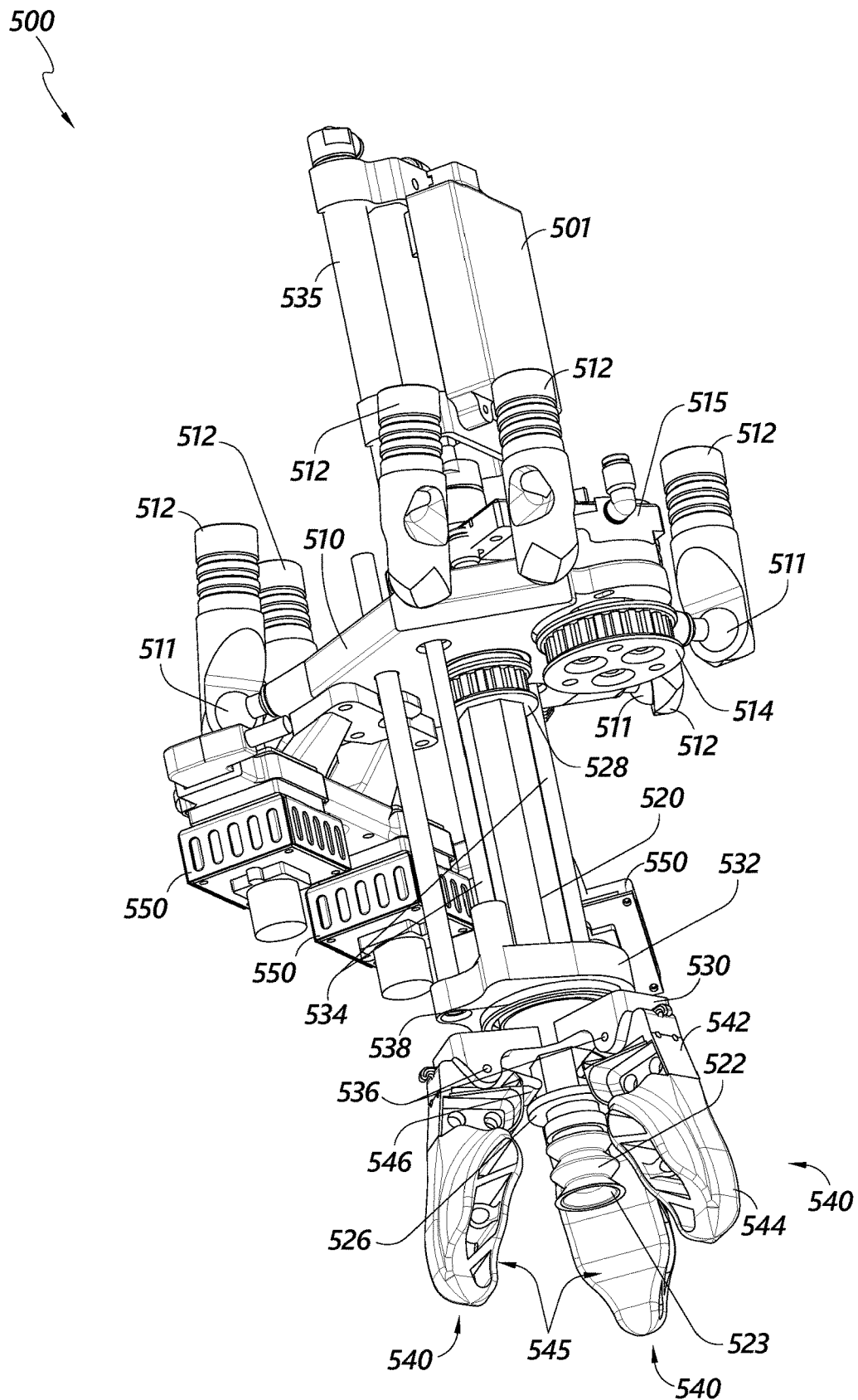
FIGS. 5A-5E depict an example end effector compatible with a robot as described herein.
Figure 5B:
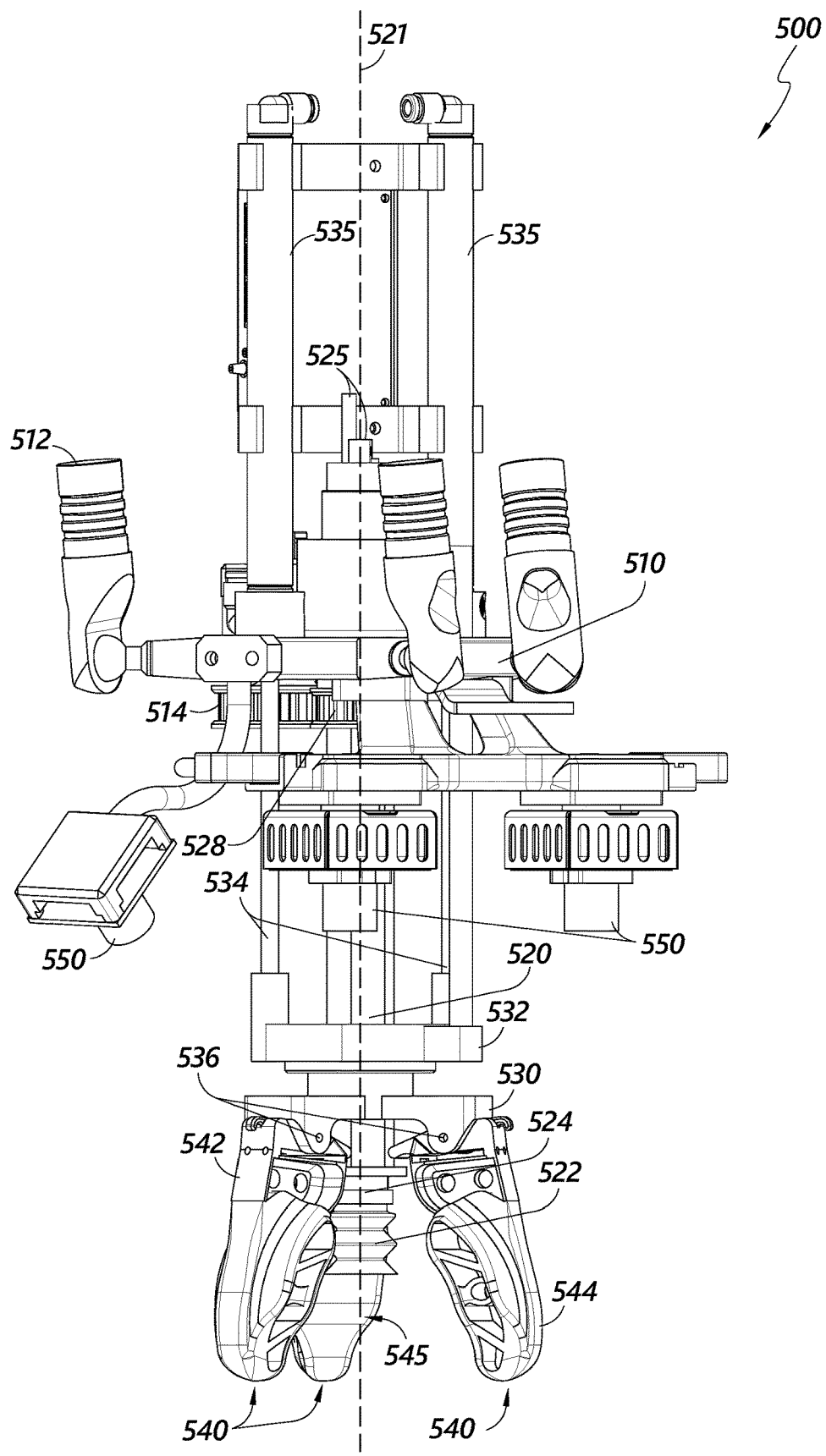
Figure 5C:
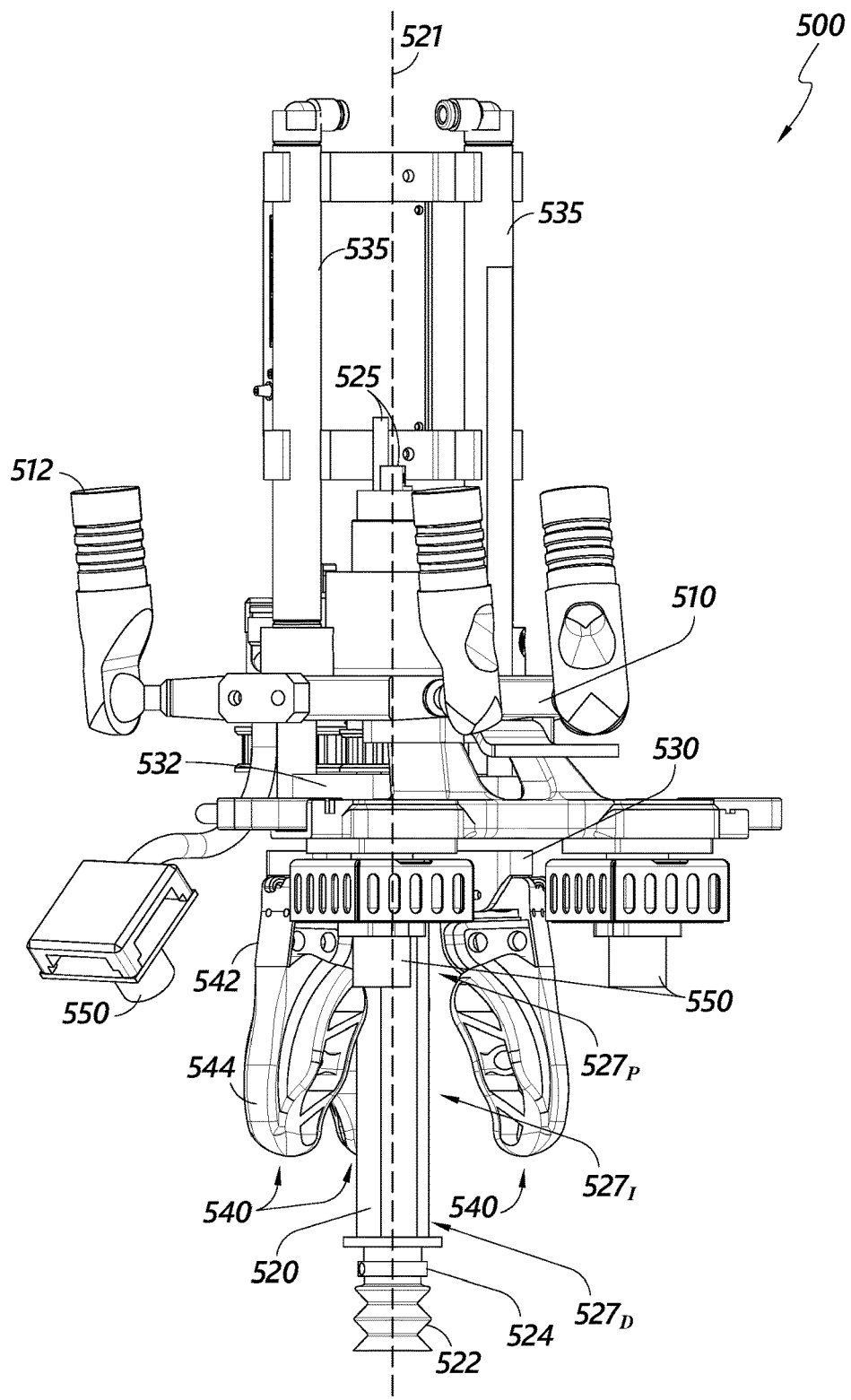
Figure 5E:
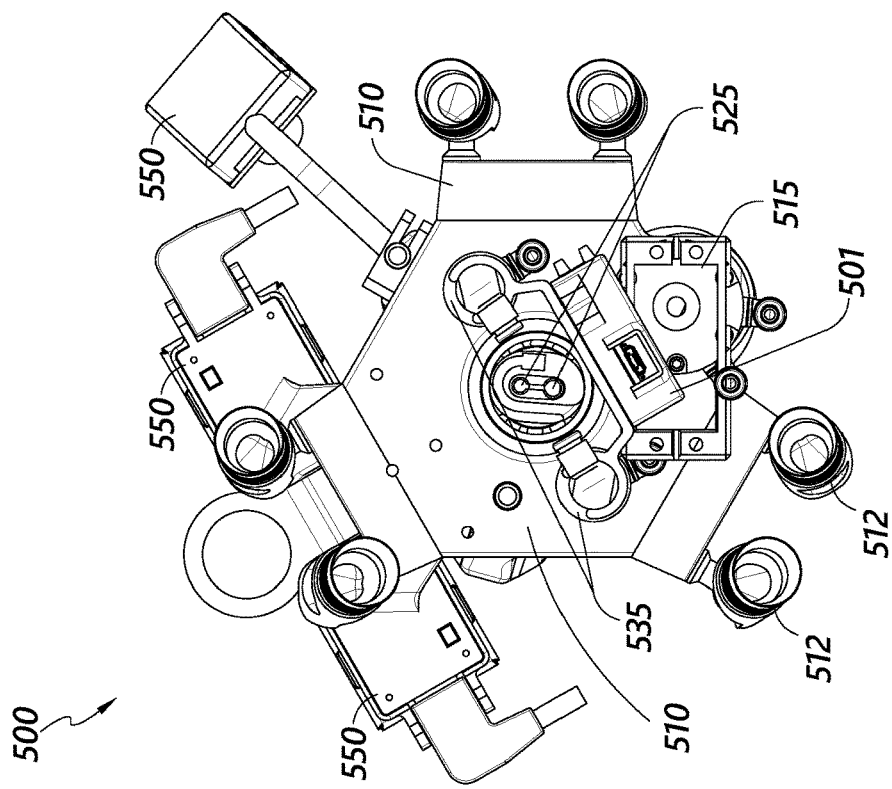
Figure 5D:
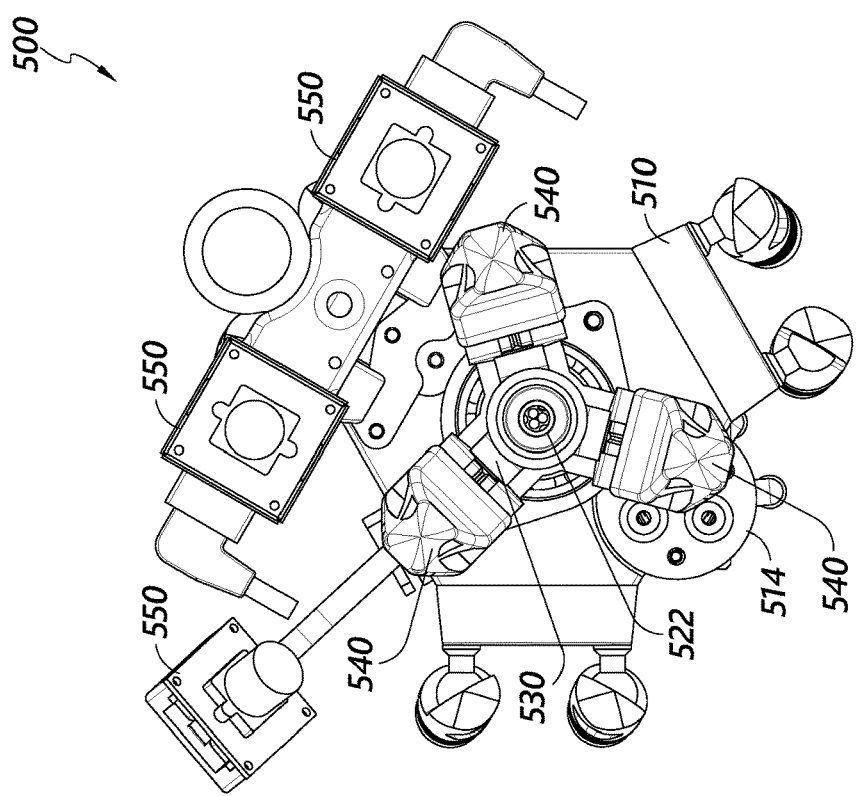

The base 510 serves as a mounting platform to which other components of the end effector 500 are coupled. One or more robot arms 512, a shaft actuator gear 514, and a shaft actuator 515 are coupled to the base 510. A partial section of six robot arms 512 is illustrated in FIG. 5A (which can be, for example robot arms 322 described above with reference to FIG. 3). FIGS. 5A-5E depict six robot arms 512 but it will be understood that any suitable number of robot arms can be implemented. The base 510 may include one or more generally rigid materials, such as a metal, a hard plastic, or the like. The base 510 includes ball-socket type connections 511 to six robot arms 512 for control by a delta robot, which may include three pairs of two arms. A delta robot may be desirable for operation of the end effector 500, as a delta robot may be well-suited for keeping the end effector 500 in a constant vertical or near vertical orientation. However, any other suitable type of robotic arm or support structure can be implemented in embodiments of the present disclosure, and it will be understood that the locations of connections on the base 510 may vary for other robot configurations, for example, as shown in FIGS. 12A-12G.

The shaft 520 extends perpendicularly downward from the base 510 along a longitudinal axis 521 and provides a structure along which the carriage 530 and fingers 540 may be translated longitudinally along the axis. The shaft 520 includes a proximal end 527$_P$, a distal end 527$_D$, and an intermediate portion 527$_I$. The base 510 is generally located at the proximal end 527$_P$ of the shaft. In some embodiments, the shaft 520 may extend above the base 510 as well. A suction device such as a suction cup 522 is coupled to the distal end 527$_D$ of the shaft 520 by a suction cup coupler 524. The suction device may be the suction cup 522 having collapsible bellows, but should not be limited to this embodiment and may include any of various other suction devices. The distal end 527$_D$ of the shaft 520 further includes a collar 526. A shaft gear 528 for rotation of the shaft 520 is located at the proximal end 527$_P$ of the shaft. The shaft gear 528 is substantially coaxial with the shaft 520 and may be formed integrally with the shaft 520 or may be formed as a distinct component and joined to the shaft 520. In embodiments with a separately formed shaft gear 528, it may be desirable for the shaft 520 to have a non-circular cross section (e.g., the hexagonal cross-section depicted in FIGS. 5A-5D) to allow rotation of the shaft gear 528 to induce rotation of the shaft 520.

The suction cup 522 is disposed at the distal end of the shaft 520 such that, when the carriage 530 and fingers 540 are retracted toward the proximal end of the shaft 520, the suction cup 522 is the lowest point of the end effector 500 in the z-axis direction and can be used to initially engage an item to be picked. One or more pneumatic connections 525 provide pressurized air and/or suction for operation of the suction cup 522. In some embodiments, the suction cup 522 may include and/or may be connected to a Venturi effect suction device, and the pneumatic connections 525 may provide pressurized air to the suction cup 522. The pneumatic connections 525 may be routed through the interior of the shaft 520 to the suction cup 522. In the non-limiting embodiment depicted in FIGS. 5A-5D, the suction cup 522 includes a collapsible bellows configured to conform to the surface of an item of interest when engaging the item.

The suction cup 522 may further include a vacuum sensor (e.g., a pressure sensor) configured to detect a pressure in the space within the suction cup 522. In some embodiments, the Venturi effect device or other negative pressure device may continuously create a negative pressure at an opening 523 of the suction cup 522. As long as the opening 523 is open to the atmosphere and is not obscured by an item, the vacuum sensor may detect a consistent pressure similar to or slightly lower than atmospheric pressure. However, when the opening 523 is obscured or blocked (as, for example, when the suction cup 522 engages with the surface of an item), the pressure within the suction cup 522 may drop substantially lower due to the operation of the negative pressure device. Accordingly, a sudden low-pressure detection at the vacuum sensor may indicate to the controller 501 or other processing circuitry that the suction cup 522 has contacted an item. Varying degrees of pressure measured by the vacuum sensor can also be used to indicate degree and sufficiency of engagement with the contacted item. In the non-limiting example of strawberry picking, an optimal engagement with a relatively flat and smooth side of a berry may result in a lowest pressure detection, while engagement with the calyx or a combination of the berry and the calyx may result in a less effective seal and a corresponding higher pressure measurement. Other scenarios, such as when a relatively small berry is sucked up into the bellows or when a stem or leaf is positioned between the suction cup 522 and the body of the berry, may also be detected when a less optimal seal causes a reduced vacuum. In some embodiments, a negative pressure device located near the tip of the shaft 520 may advantageously enhance detection at the vacuum sensor. For example, where the vacuum cavity is small (e.g., including only the tip of the shaft 520, rather than the entire interior of the shaft 520), evacuation of the cavity occurs relatively quickly when the opening 523 is blocked, resulting in a shorter time required to detect blocking of the opening 523.

The suction cup 522 may be coupled to the shaft 520 at the suction cup coupler 524. In some embodiments, the suction cup coupler 524 may be movably coupled to the shaft 520. In one example, the suction cup 522 is fixedly coupled to the suction cup coupler 524, and the suction cup coupler 524 is slidably mounted within the shaft 520 such that an upward force at the opening 523 of the suction cup 522 causes the suction cup coupler 524 to move upward along the longitudinal axis 521 relative to the shaft 520. In this example, a linear position sensor included within the end effector 500 may be triggered by the motion of the suction cup coupler 524. Accordingly, the triggering of the linear position sensor may indicate to the controller 501 or other processing circuitry that the suction cup 522 has contacted an item. The suction cup coupler 524 may comprise a portion of the vacuum generator associated with the suction cup 522. For example, the suction cup coupler 524 may include a Venturi effect device or other vacuum generator sized and shaped to securably receive the suction cup 522.

The collar 526 includes a portion of the shaft 520 at the distal end that is wider (e.g., has a greater radial extent) about the longitudinal axis 521 relative to a portion of the shaft 520 above the collar 526. The collar 526 may be integrally formed with the shaft 520 or may be formed separately and joined to the shaft 520, and may comprise the same material as the shaft 520 or any other substantially rigid material. By having a larger radial extent relative to the proximal portion of the shaft 520, the collar 526 can retain components that are slidably mounted on the shaft 520 and prevent such components from sliding off the end of the shaft 520. Such components can include, for example, the carriage 530. In the example end effector 500, the collar 526 has a circular cross-section about the longitudinal axis 521 so as to retain shaft-mounted components at any radial location about the longitudinal axis 521.

The shaft gear 528 is rotationally fixed relative to the shaft 520, such that rotation of the shaft gear 528 causes the shaft 520 to rotate about the longitudinal axis. Thus, the shaft gear 528 can be rotated to rotate the shaft 520 and any other components rotationally fixed thereto, such as the carriage 530 and fingers 540. In the example end effector 500, the shaft gear 528 can be coupled to the shaft actuator gear 514 by a belt, chain, or any other suitable mechanism, such that rotation of the shaft actuator gear 514 causes the shaft gear 528 and the shaft 520 to rotate about the longitudinal axis. A non-coaxially located shaft actuator 515 (which may include the rotation control 446 of FIG. 4A) can thus rotate the shaft 520 by rotating the shaft actuator gear 514. The shaft actuator 515 may be, for example, a pneumatic rotary actuator, a servomotor, or other suitable actuator. Rotation of the shaft 520 relative to the end effector 500 may be controlled by processing circuitry of the shaft actuator 515 and/or the controller 501, which may include the slave controller 426 of FIG. 4A, the microcontroller 440, and/or other processing components.

The carriage 530 is disposed about the shaft 520 and supports the fingers 540. The carriage 530 may include any substantially rigid material, such as but not limited to a metal or a hard plastic. The carriage 530 is rotatably coupled to a carriage slider 532 in a longitudinally fixed configuration along the longitudinal axis. The carriage slider 532 is fixed to one or more rods 534 driven by linear actuators 535 to control the longitudinal position of the carriage 530 along the shaft 520 and/or a controllable force applied to the carriage 530 (e.g., to control a grasping force applied at the fingers 540, as will be described below in greater detail). Linear actuators 535 may be any suitable type of linear actuator, such as mechanical, pneumatic, hydraulic, electro-mechanical, etc. The carriage 530 further includes hinge points 536 for rotatably coupling the fingers 540 to the carriage 530.

In order to provide for longitudinal and rotational collective motion of the fingers 540, the carriage 530 is rotatable about the longitudinal axis and is translatable along the longitudinal axis. To achieve these two degrees of motion, the carriage 530 can be rotationally fixed and longitudinally-movable relative to the shaft 520, and can be rotationally-movable and longitudinally fixed relative to the carriage slider 532. In some embodiments, the carriage 530 has a central opening having a complementary profile to the cross-section of the shaft. For example, for a shaft 520 having a hexagonal cross-section as shown in FIGS. 5A-5D, the carriage 530 may have a hexagonal central opening sized and shaped to engage with the hexagonal cross-section of the shaft 520 such that rotation of the shaft 520 about the longitudinal axis causes the carriage 530 to rotate simultaneously. The carriage 530 may be coupled coaxially with the carriage slider 532 by a bearing 538 (for example, a plain bearing, a ball bearing or other suitable rotating-element bearing, etc.) to allow the carriage 530 to rotate freely relative to the carriage slider 532 while fixing the carriage 530 longitudinally to the carriage slider 532.

The fingers 540 are coupled to the carriage 530 and provide a positive mechanical grasp on items engaged at the suction cup 522. Each finger 540 can include a substantially rigid base 542 formed of a hard plastic, a metal, or any other suitable material. Each finger can also include a resilient and/or cushioned tip 544 formed of a soft plastic, a rubber, or any other suitable elastomeric material. For example, the tip 544 may comprise a cushioned or resilient material on at least an inward-facing grasping surface 545. The base 542 of each finger 540 can be mounted to the carriage 530 at a hinge point 536, such that the fingers 540 can rotate inward toward the suction cup or outward away from the suction cup about the hinge points 536. In some embodiments, the tip 544 forms most of the exterior surface of the finger 540. For example, the rigid base 542 may include a central spine on which the resilient tip 544 may be formed or adhered. In some embodiments, the resilient tip 544 may be a slidably removable tip that can be attached and/or removed by sliding the resilient tip 544 onto or off of the rigid base 542. The rigid base may include one or more locking features (not shown) that may engage with corresponding features of the resilient tip 544 to detachably secure the resilient top 544 onto the rigid base 542. Thus, the fingers may provide cushioned and/or compressible interior engagement surfaces while remaining securely fixed to the carriage 530.

The fingers 540 are radially spaced about the carriage to define a target object space surrounding the suction cup 522 and bounded by the interior surfaces 545 of the fingers 540 when the carriage 530 is located at or near the distal end of the shaft 520. The fingers 540 may rotate inward about the hinge points 536 to engage an item located within the target object space. This inward rotation decreases the volume of the target object space, allowing the fingers to close in on the target object space until they contact and grasp the item engaged by the suction cup. This can allow for reliable grasping of the item, no matter what orientation or position the item is in relative to the suction cup. The fingers 540 may be individually or collectively actuated to rotate about the hinge points 536. In some embodiments, the fingers 540 may be indirectly actuated such that additional linear or rotational actuators need not be provided in the vicinity of the carriage. In one non-limiting example embodiment, the fingers 540 may be mechanically interlocked with the shaft 520 such that they automatically close around the target object space as the carriage 530 approaches its extreme distal position.

Each finger 540 is outwardly biased (e.g., by a spring) to an open configuration in example implementations. Each finger 540 further includes a substantially rigid extension 546 that extends radially inward from the base 542. In this example, as the carriage 530 and fingers 540 travel toward the distal end along the shaft 520, a distal side of each extension 546 will contact the proximal-most surface of collar 526 while the carriage 530 is still at an intermediate position proximally spaced from its extreme distal position. As the carriage 530 moves beyond this intermediate position, the extensions 546 will be retained in the same longitudinal position along the shaft 520 by the collar 526 and any further distal motion of the carriage 530 will cause the fingers 540 to rotate about the hinge points 536. In this manner, control of the end effector 500 may be simplified as the linear actuators 535 may be able to control both translation of the carriage 530 and closing of the fingers 540 within a single axis of motion.

Some or all of the fingers 540 may include one or more force sensors at an interior grasping surface or at an internal location within the fingers 540. The force sensors can include flat and/or compact force sensors such as force-sensitive resistors. In some embodiments, the one or more force sensors are placed at the interface between the resilient tip and an inward-facing portion of the base 542, such that the force exerted between an inner surface of the tip 544 and an item in the target object space is transferred to and measured at the force sensor. In some embodiments, the force sensors may be attached to the inward-facing portion of the base 542 such that the resilient tips may be removed and/or replaced while the force sensors remain attached to the fingers 540. Some embodiments may include more than one force sensor in each finger 540, for example, to provide redundancy and/or to provide more detailed data regarding the force being applied to an object by the fingers. Accordingly, an increase in the force measured at the finger force sensors relative to a baseline may indicate to the controller 501 or other processing circuitry that a finger 540 has contacted an item.

The forces detected at the finger force sensors may further be used to control the linear actuators 535. For example, a predetermined threshold force value may be associated with a maximum grasping force to be applied to items (e.g., to avoid bruising fruit being picked by the end effector 500). In this example, the linear actuators 535 may stop distal movement of the carriage 530 when the force detected at any of the finger force detectors reaches or exceeds the predetermined threshold value. As will be described in greater detail below, differences between forces detected at individual fingers 540 may further be used to determine a direction from which the grasped item is tethered to another object (for example, the direction of a fruit stem tethered to a plant).

The end effector may further include one or more cameras 550 or other imaging devices. The cameras 550 include photodetectors configured to image an area below and/or laterally displaced from the end effector. In some embodiments, image data from two or more cameras 550 may be used for stereo imaging or other techniques for determining depth information of the imaged region. Image data obtained at the cameras 550 may be processed to identify imaged items to be picked, as well as to determine location information associated with the items. In some embodiments, some or all of the cameras 550 may further include one or more light sources at or near the cameras 550 to illuminate the cameras' field of view, for example, to provide controllable illumination which may improve the reliability of item detection and identification. In some embodiments, the light sources may provide illumination from a source that is functionally coincident or nearly coincident with the camera or cameras. Thus, as the cameras and lights get closer to an object, the light intensity reflected off the object and thus present on the camera's imager increases. In some cases, such increased intensity may undesirably interfere with accurate imaging. In some aspects, the intensity of the lighting may be controlled as a function of distance from an item being approached, such that light is emitted with a lower intensity when the item of interest is close to the light source and camera. In other aspects, the intensity of the lighting may be controlled as a function of the intensity of light detected at the camera.

Example Robot-Level Harvesting Process According to the Present Disclosure

With reference to FIGS. 6A-6G, an example picking sequence using the example end effector 500 of FIGS. 5A-5D will now be described. The picking sequence may be performed under control of one or more computing devices and/or control circuitry of the harvesters, work cells, robots, and end effectors described herein. For example, the picking sequence may be controlled at least in part by one or more software processes executing on some or all of the vehicle master controller 402, slave controller 426, end effector hub 428, controller 440, or other processing components illustrated in FIGS. 4A and 4B. Although the example picking sequence of FIGS. 6A-6G is depicted and described with reference to the particular agricultural implementation of picking a strawberry from a strawberry plant, it will be understood that this sequence or similar sequences may equally be used for other agricultural or non-agricultural picking implementations.

As described above with reference to FIGS. 5A-5E, the end effector 500 includes, among other components, a shaft 520, a carriage 530, a suction device such as a suction cup 522, and a plurality of fingers 540. The shaft 520 extends along the longitudinal axis 521 between a proximal end $527_P$ and a distal end $527_D$. The carriage 530 is configured to rotate about and translate along an intermediate portion $527_I$ of the shaft 520 between a proximal position and a distal position. The suction cup 522 is coupled to the distal end of the shaft and forms the distal-most portion of the end effector 500 when the carriage 530 is in the proximal position. The fingers 540 are spaced radially about the carriage 530, with each finger 540 coupled to the carriage by a hinge at hinge point 536 and extending distally from the carriage 530. The plurality of fingers 540 envelop the intermediate portion $527_I$ of the shaft 520 when the carriage 530 is in the proximal position. When the carriage 530 is in the distal position, the plurality of fingers 540 envelop a target object space including the distal end $527_D$ of the shaft and the suction cup 522. The fingers form the distal-most portion of the end effector 500 when the carriage 530 is in the distal position.

Figure 6A:
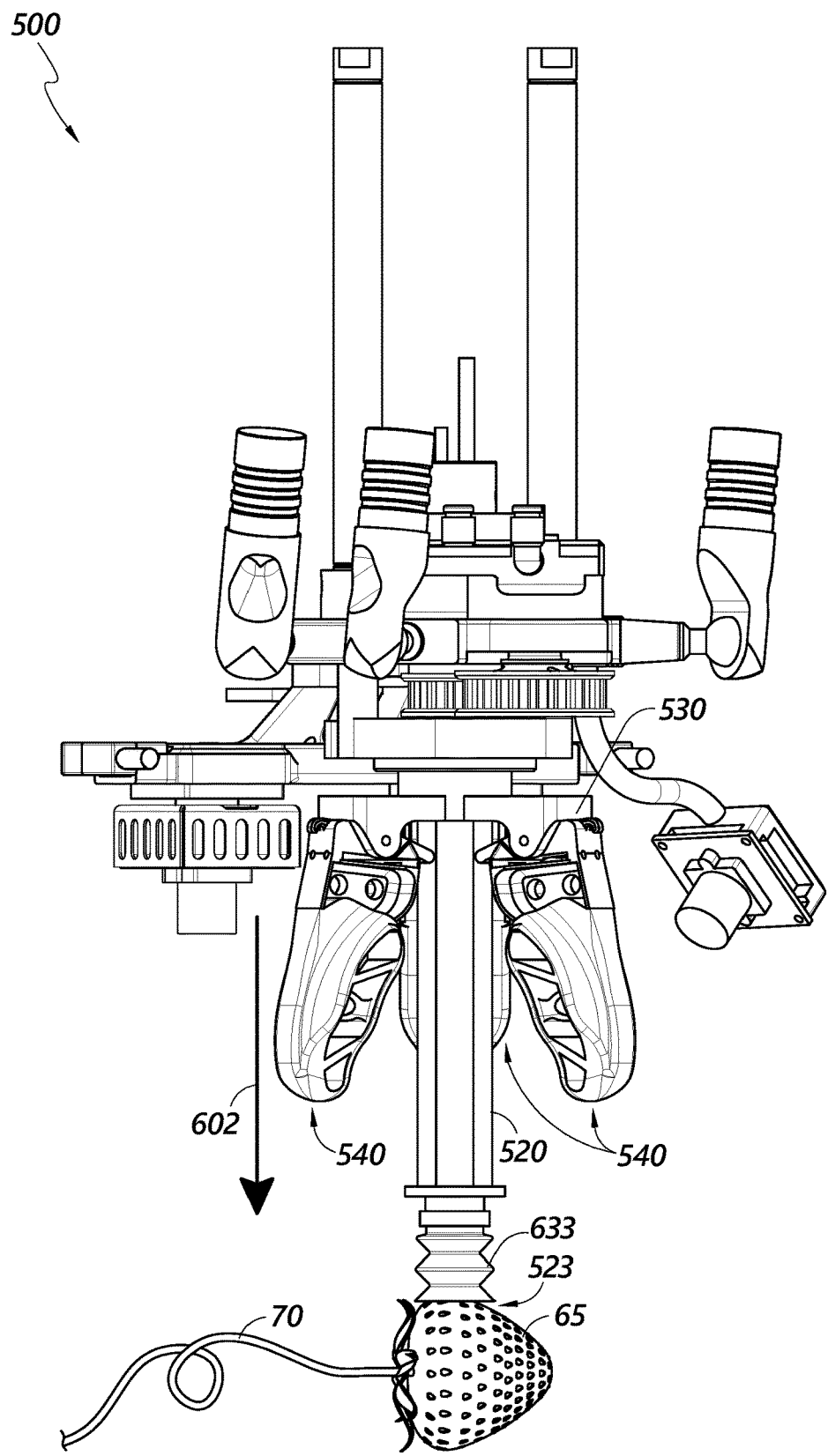
FIGS. 6A-6G depict an example sequence for picking a berry using the example end effector of FIGS. 5A-5E.

The picking sequence begins with the end effector 500 in the initial configuration depicted in FIG. 6A. In the initial configuration of FIG. 6A, the carriage 530 and fingers 540 are in a retracted configuration, and are positioned at or near the proximal end of the shaft 520. In this initial configuration, the portion of the end effector 500 distal to the carriage 530 has a relatively high aspect ratio (that is, is longer along the longitudinal axis relative to the width of this portion perpendicular to the longitudinal axis) because the shaft 520 and suction cup 522 extend significantly beyond the ends of the fingers 540. In accordance with the item identification and selection methods described below, the robot corresponding to the end effector 500 has moved the end effector 500, generally along a downward direction 602, to a position at which the suction cup 522 engages a strawberry 65 attached to a stem 70. In this initial configuration, the strawberry 65 covers substantially all of the opening 523 of the suction cup 522 and therefore experiences an upward suction force along the longitudinal axis. The upward suction force causes the suction cup 522 to suction grasp the strawberry 65. This engaging of the strawberry at the suction cup 522 may be detected based on data from a vacuum sensor, a linear position sensor, and/or a force sensor as described with reference to FIGS. 5A-5D. When the strawberry 65 has been engaged by the suction cup 522, in some embodiments the end effector 500 moves longitudinally upward, opposite the direction 602, to pull the strawberry 65 clear of stems, leaves, dirt, or other clutter or debris that may have been located near the strawberry 65.

Figure 6B:
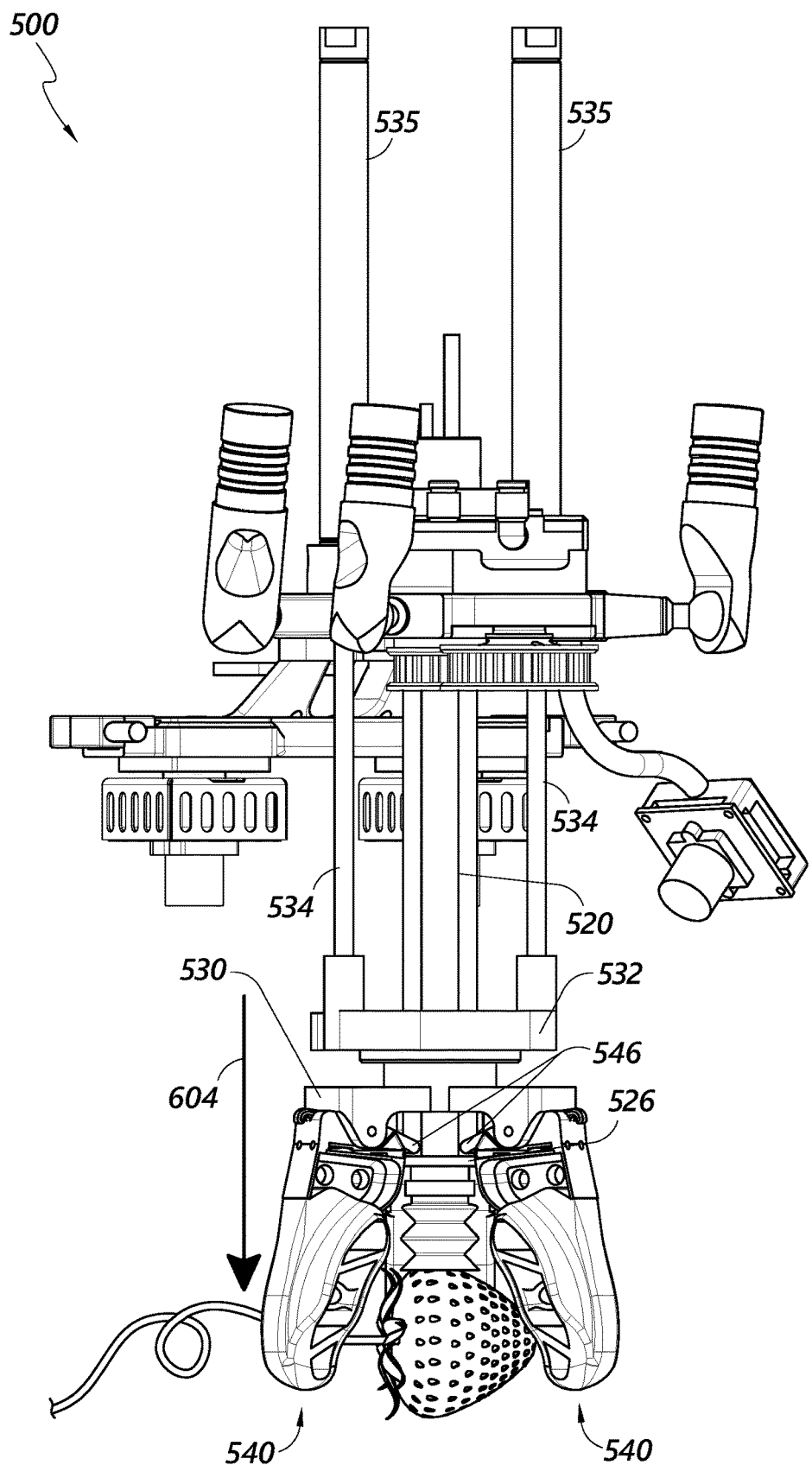

Referring now to FIG. 6B, after the strawberry 65 has been initially grasped by suction, the carriage 530 and fingers 540 advance to an extended configuration. In this example, the linear actuators 535 move the carriage 530 and fingers 540 by extending the rods 534 in a distal direction 604, causing the carriage slider 532 to move along the longitudinal axis toward the distal end of the shaft 520. FIG. 6B depicts the intermediate position described above at which the finger extensions 546 contact the collar 526 of the shaft 520 after the slider 532 has moved longitudinally in a distal direction. At the position depicted in FIG. 6B, the volume of the target object area enveloped by the fingers 540 has not changed and remains at its largest extent.

Figure 6C:
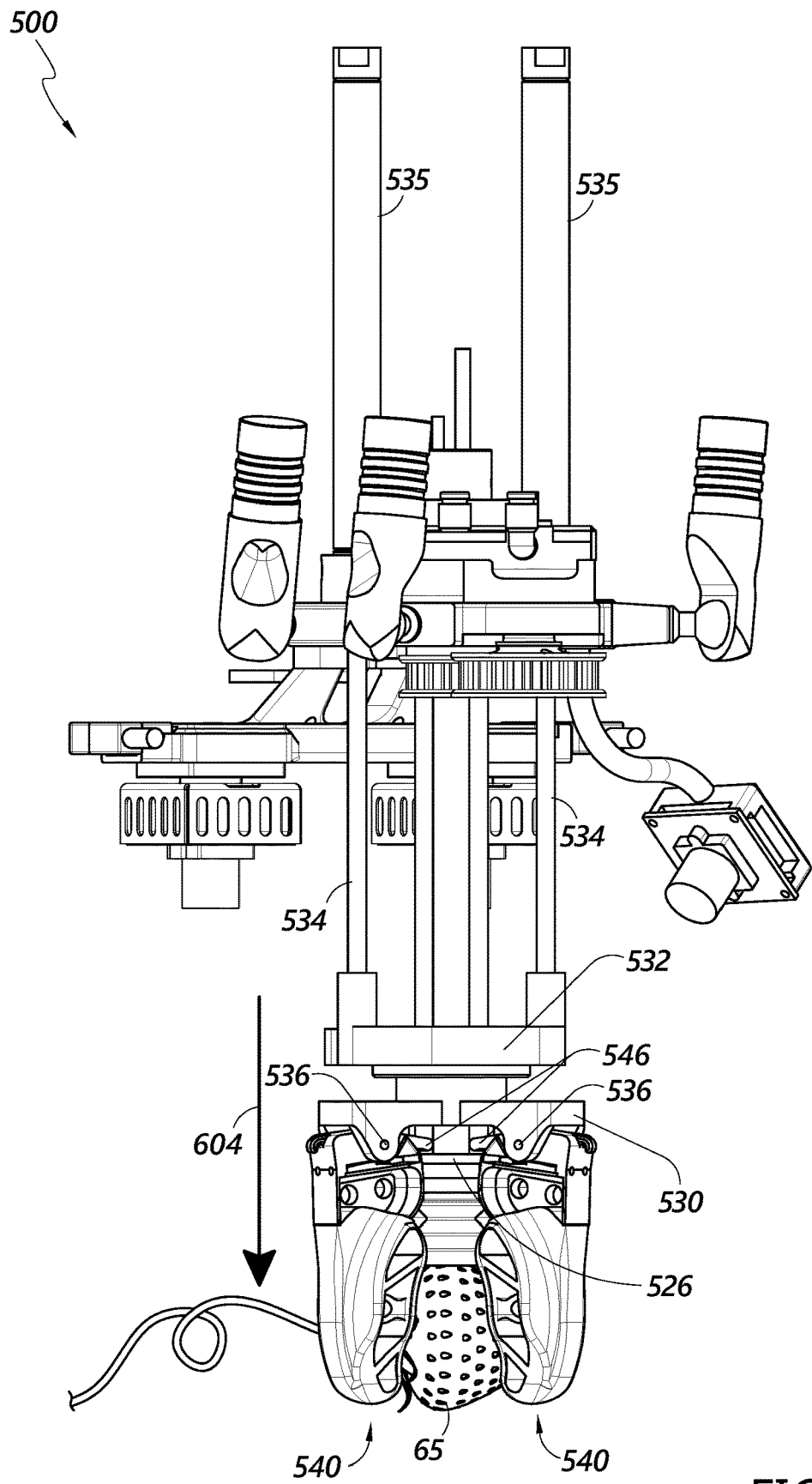

Referring now to FIG. 6C, the linear actuators 535 continue moving the rods 534, carriage slider 532, carriage 530, and fingers 540 longitudinally along the distal direction 604. As the carriage 530 continues beyond the intermediate position of FIG. 6B, the fingers 540 rotate about the hinge points 536 of the carriage 530 due to the finger extensions 546 being constrained by the collar 526. Thus, the fingers 540 close about the strawberry 65 to form a positive mechanical grasp. The linear actuators 535 may stop moving the rods 534 in the distal direction, and thus stop tightening the fingers' 540 grasp on the strawberry 65, in response to a threshold force detection at one or more force sensors within the fingers 540.

Figure 6D:
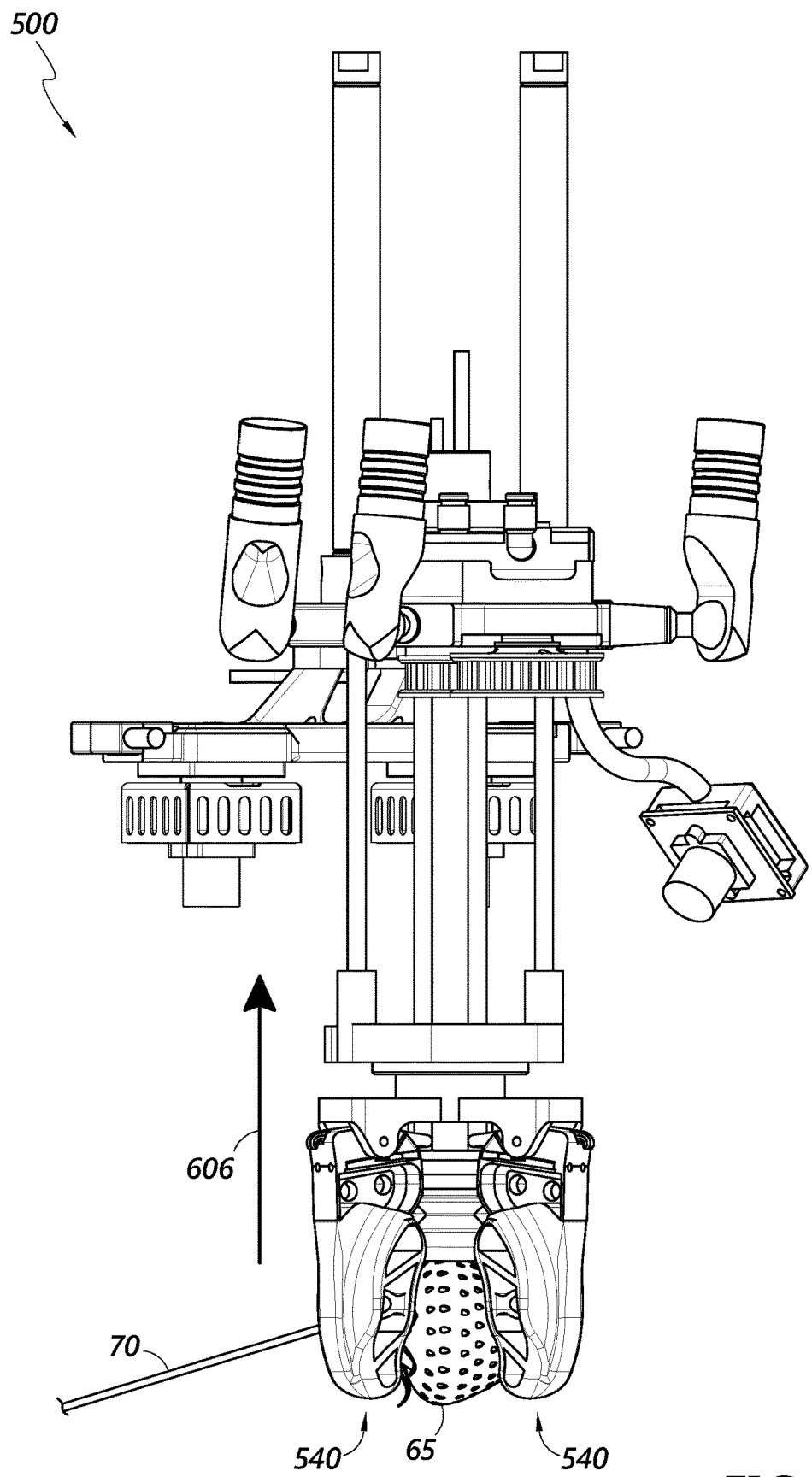

With reference to FIG. 6D, after the fingers 540 have positively grasped the strawberry 65, the robot moves the end effector 500 longitudinally upward along a proximal direction 606. As the end effector 500 moves upward, the strawberry 65 moves further from the base of its stem 70, thereby creating tension in the stem 70. As the stem 70 begins to tighten, the forces detected in the fingers' force detectors may change. For example, because the tension in the stem 70 tends to pull the strawberry 65 back toward the stem 70, the force sensors in the two fingers 540 adjacent to the stem 70 detect an increase in force, while the force sensor in the finger 540 opposite the stem 70 detects a decrease in force. In addition, the relative increases in force detected at the two stem-adjacent fingers may be used to more precisely determine the direction of the stem 70 relative to the end effector.

Figure 6E:
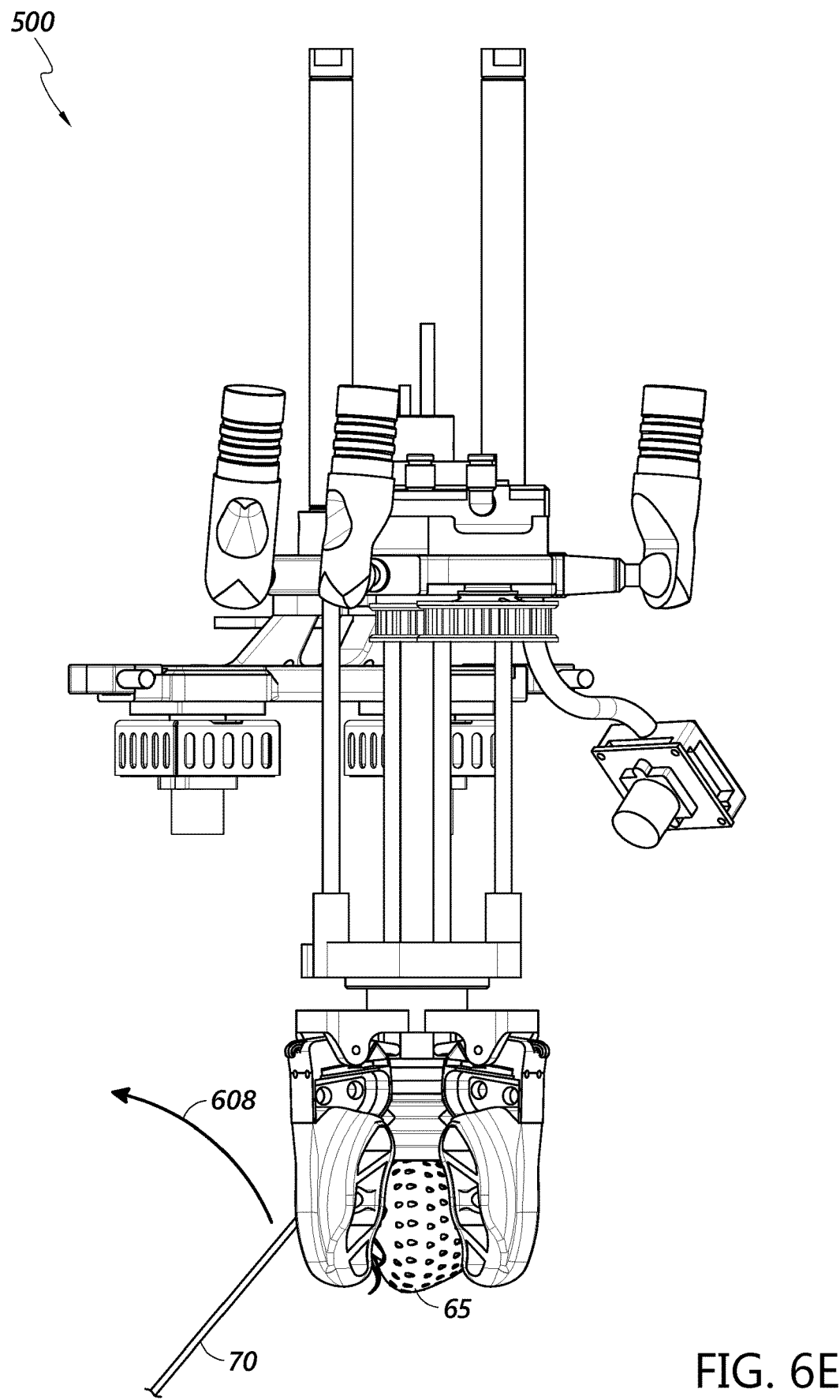

With reference to FIG. 6E, after the direction of the stem 70 has been determined based on changes in force determined during vertical motion of the strawberry 65, the picking sequence continues to an optional untensioning step. During the untensioning step, the robot moves the end effector 500 along a curved path 608. Using the anchored stem 70 as a radius, the end effector 500 can trace a portion of a circular arc defined by the length of the stem 70, thus moving the strawberry 65 to a position closer to the point directly above the base of the stem. Moving the strawberry 65 upward and toward the base of the stem at the plant, can advantageously reduce the amount of force necessary to separate the strawberry 65 from the stem 70. This reduction in force can enhance the ability of harvesters described herein to pick and place soft-bodied or delicate objects, such as berries, with little or no damage, while also maintaining very high picking efficiency.

Figure 6F:
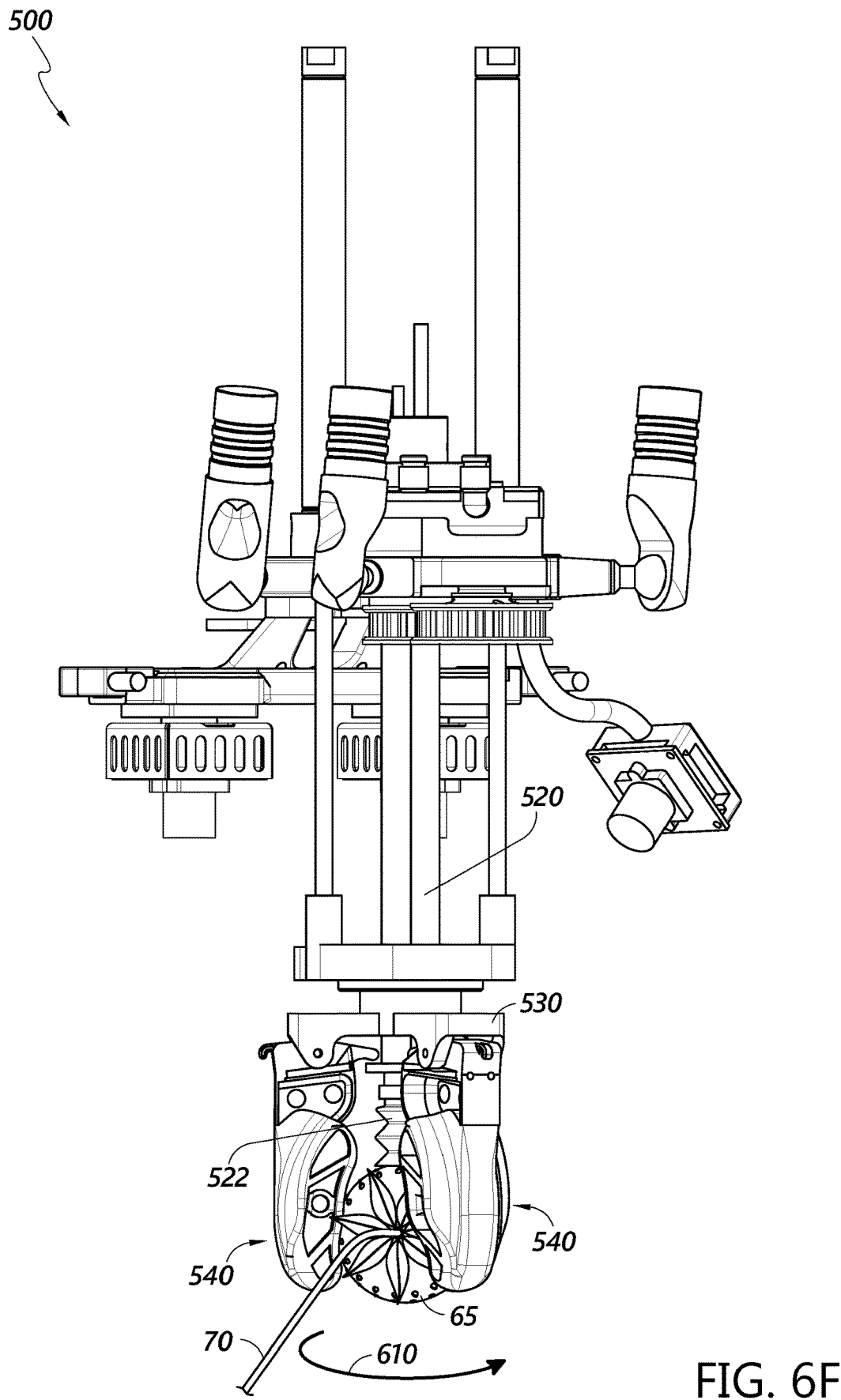

After the optional untensioning step, the picking sequence continues to the configuration of FIG. 6F. In FIG. 6F, the shaft 520, suction cup 522, carriage 530, and fingers 540 have rotated in a rotation direction 610 about the longitudinal axis to rotate the strawberry 65. The strawberry 65 may be rotated by 45 degrees, 60 degrees, 90 degrees, 120 degrees, 180 degrees, or more. In various embodiments, the rotation angle may be pre-determined or may not be pre-determined. For example, if the shaft actuator 515 is a pneumatic rotary actuator, the shaft 520 may only be rotatable to two positions; if the shaft actuator 515 is a servo-motor, the shaft 520 may be rotatable to a larger number of selectable positions. Rotation of the berry 65 about the longitudinal axis may advantageously further reduce the amount of force necessary to separate the strawberry 65 from the stem 70 (e.g., in some cases a stem that requires a force of approximately 20N to separate without rotation may only require approximately 2N if the berry has been rotated). Although the rotation direction 610 is depicted as being counterclockwise from a top-down perspective, it will be understood that the shaft 520, suction cup 522, carriage 530, and fingers 540 may also rotate clockwise, and an individual end effector 500 may be capable of both clockwise and counterclockwise rotation. For example, in some embodiments an end effector 500 may rotate a berry in a first rotation direction the first time it attempts to pick a berry, and, following a failed pick, may rotate the berry in the opposite rotation direction when making a second attempt to pick the berry. After the strawberry 65 has been untensioned and rotated, it is ready to be removed from the stem 70.

Figure 6G:
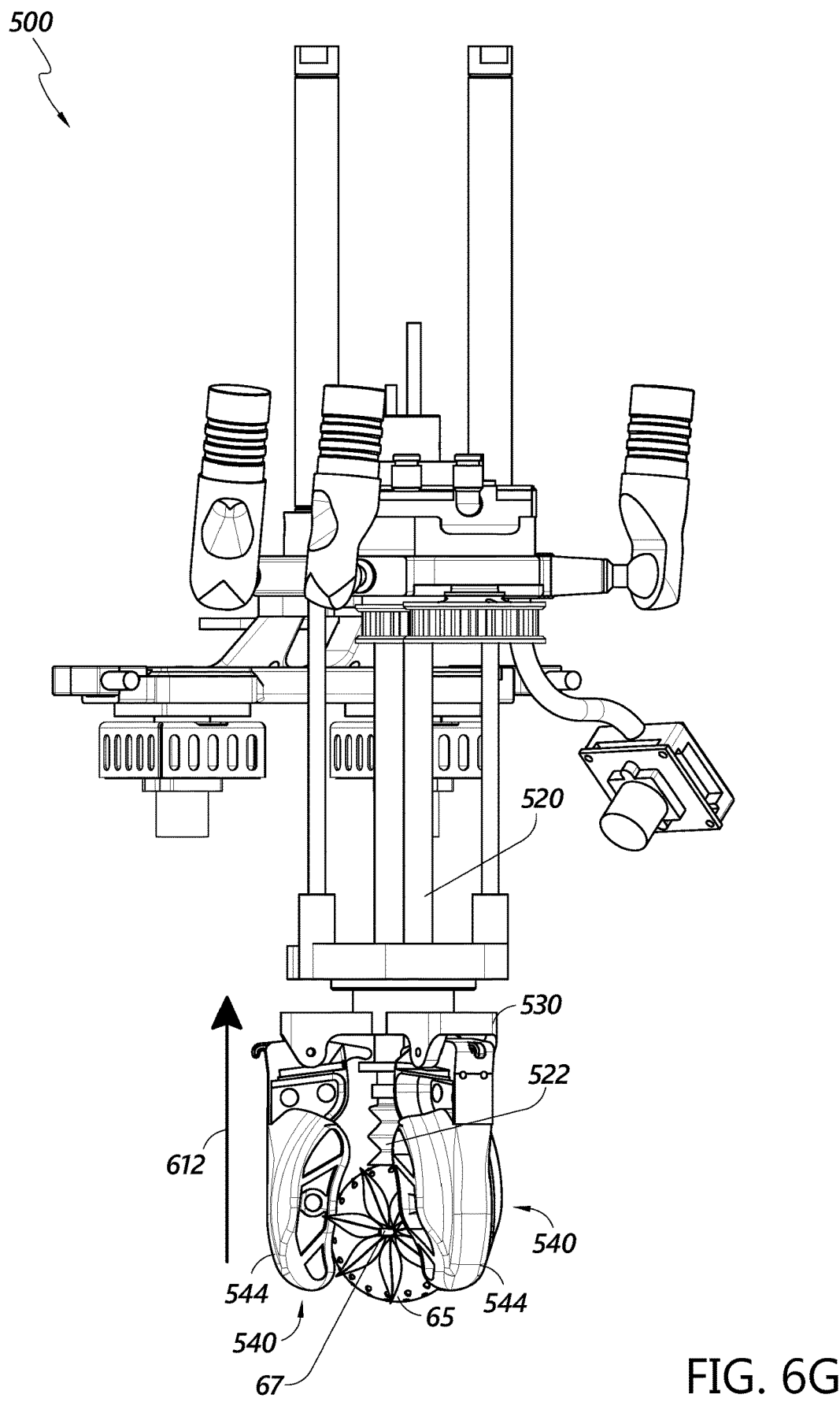

Referring now to FIG. 6G, the picking sequence is completed as the robot moves the end effector 500 upward along direction 612, separating the strawberry 65 from the stem 70 (not visible in FIG. 6G). In order to break the stem 70 and/or cause the stem 70 to detach from the calyx 67 of the strawberry 65, the end effector 500 may move upward at a high speed and/or acceleration. In some embodiments, the robot may move the end effector 500 upward, with the fingers 540 still positively grasping the strawberry 65, at an acceleration in the range of 3 g to 5 g or more, and/or exerting a stem separation force of 2N or more. During this rapid acceleration, the resilient and/or cushioned material forming the tips 544 of the fingers 540 may cushion the strawberry 65 to prevent it from being bruised during separation from the stem 70. In addition, the untensioning and rotation performed prior to separating the strawberry 65 from the stem 70 may further reduce the amount of force necessary to break the stem 70, thereby reducing the force that must be exerted on the strawberry 65 by the fingers 540 during this step. When the picking sequence has been completed, the strawberry 65 may be placed onto a conveyor and/or into a receptacle for storage, such as by positioning the end effector 500 above the receptacle and moving the carriage 530 and fingers 540 back to a retracted configuration at the proximal end of the shaft 520. Suction at the suction cup 522 may also be interrupted, and/or the end effector may be moved in a jerking motion, to break the grasp at the suction cup 522 and cause the strawberry 65 to fall into the receptacle.

Example Harvester-Level Harvesting Process According to the Present Disclosure

Figure 7:
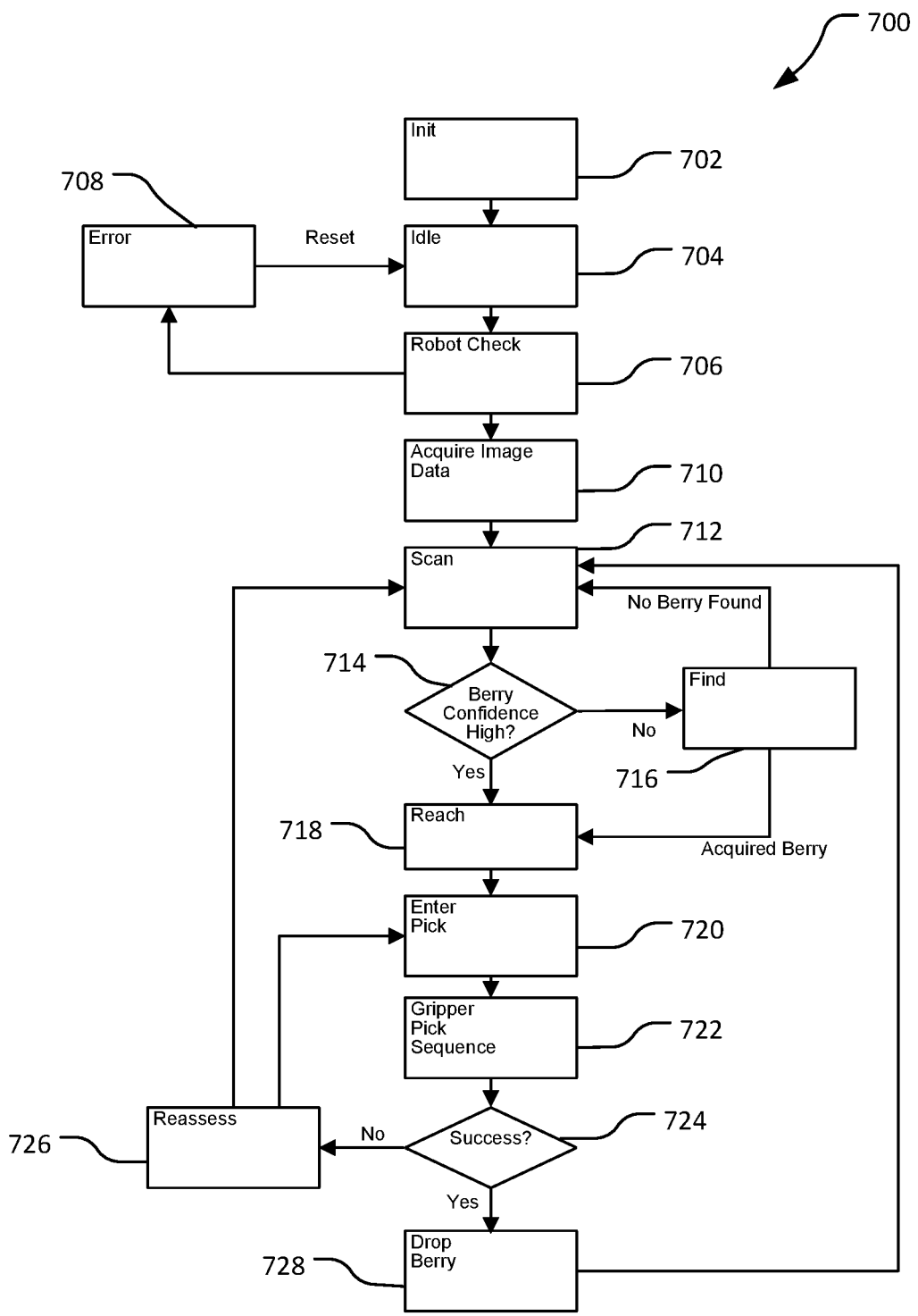
FIG. 7 is a flow chart illustrating an example harvester-level method for picking a berry as described herein.

FIG. 7 is a flow chart illustrating an example harvester-level method 700 for picking a berry according to the present disclosure. The method 700 may be performed by a computer system integrated within a system such as all or a subset of the processing components of the harvesters 100, 300, 400 depicted in FIGS. 1-4B. Throughout the description of method 700, reference will be made to example components of FIGS. 4A and 4B, but it will be understood that the method 700 can be implemented in any harvester according to the present disclosure.

The method 700 begins with block 702, where the harvesting process is initiated. The method 700 may begin, for example, based on a manual command to begin harvesting provided at a user interface 414 of a harvester 400. Alternatively, the method 700 may be initiated autonomously based on a determination by the vehicle master controller 402 that the harvester 400 is in a location where items will be picked (for example, based on detection of items to be picked, predetermined location or geofencing, etc.). When the harvesting process has been initiated, the method 700 continues to block 704.

At block 704, the work cell $416_N$ idles. For example, one or more processing components, controllers, or other devices may need to execute one or more tasks prior to harvesting. These tasks can be executed during the idle state. When the work cell $416_N$ has completed tasks during the idle state, the method 700 may continue to block 706 in which a robot check is performed. During the robot check, the robot controller 440 or other component of the robot $422_2$ may verify that sensing and control components of the robot $422_2$ (such as sensors 434, 436, 438 and servos 424) are in communication with the controller 440 and are working properly. If an error is detected during the robot check, the method continues to block 708 and resets one or more systems to return to idle at block 704. If an error is not detected at block 706, the method continues to block 710.

At block 710, one or more cameras $430_1$, $430_2$, $430_3$ in the work cell begin acquiring image data of the picking area corresponding to the work cell. For example, the cameras may begin imaging a row of strawberry plants disposed below the harvester in the work volume. Images may be obtained during a discrete image-gathering phase, and/or may be obtained real-time during harvesting. For example, with cameras mounted on the end effectors described herein, image data from multiple locations may be obtained throughout the picking process. When the cameras have begun acquiring image data, the method 700 continues to block 712.

At block 712, the harvester scans (e.g., by causing the robot to move an end effector containing one or more cameras) to detect items (e.g., berries) to be picked. Items to be picked may be detected and/or identified based on various computer vision methods and/or any other imaging and image processing methods. In one example implementation of strawberry harvesting, color images of the picking area obtained from the cameras $430_1$, $430_2$, $430_3$ are processed. Color images taken at a downward angle of a row containing strawberry plants may include, for example, brown areas corresponding to soil, green areas corresponding to plant leaves, stems, and unripe strawberries, white areas corresponding to flower petals and/or unripe strawberries, and red areas corresponding to ripening, ripe, or overripe strawberries for harvesting. Regions of one or more red pixels may thus be identified from the color images as possible berry candidates. The identified red regions may further be analyzed to determine the size, shape, and/or hue of each identified red region. Other suitable scanning techniques to detect different kinds of items of interest can be implemented.

Berry candidates may additionally be tracked from frame to frame for a moving camera (e.g., using an Intersection over Union metric or other suitable method to correlate identified regions from frame to frame). Potential berry candidates may thus be identified based on data from multiple cameras at multiple locations and converted to a global coordinate system for use by all robots in the work cell or for use by the robot that acquired the image at a later, more optimal time. When at least one berry candidate has been identified, the method 700 continues to decision state 714.

At decision state 714, the controller 440 determines whether a berry has been identified with a high confidence level. For example, one or more berry candidates may be analyzed to determine, for example, if the number of red pixels is large enough to correspond to a strawberry with a high level of confidence. In another example, the confidence level may be based at least in part on the shape of the region defined by the red pixels. In another example, a candidate berry may also be analyzed to determine if the hue of the pixels is a dark enough red to be confident that the berry is ripe enough to be picked. Berry candidate analysis may be implemented with any of various known statistical methods and/or thresholding processes, including neural networks, etc.

In some embodiments, the controller 440 may receive information regarding identified berry candidates from another robot within the same work cell. Sharing of information regarding berry candidates between nearby robots may be advantageous, especially in eye-in-hand implementations in which the cameras are located on and move with the robots and/or end effectors, by allowing robots to be informed of berry candidates that are accessible to their respective end effector but not visible to their respective cameras due to clutter in the environment (for example, a berry blocked from view by leaves but visible to a second robot nearby).

If it is determined at decision state 714 that a berry candidate cannot be confirmed with a sufficiently high confidence level, the method 700 continues to block 716 to search for another berry candidate in the image data. If no berry is found, the method 700 returns to block 712 to continue scanning for additional berry candidates in the picking area. If it is determined at decision state 714 that the berry candidate can be confirmed with sufficient confidence, or if another berry candidate is confirmed at block 716, the method 700 continues to block 718.

At block 718, the work cell reaches the location associated with the confirmed berry candidate and, at block 720, the robot initiates the process of attempting to pick the berry. Blocks 718 and 720 may include one or more of moving the harvester, moving a robot within the harvester to an appropriate position, and preconfiguring the end effector to begin the pick sequence. At block 722, the robot and end effector execute a robot-level pick sequence to grasp the berry and separate it from its corresponding plant. An example robot-level harvesting process is described above with reference to FIGS. 6A-6G. It will be understood, however, that the robot-level pick sequence may be any suitable pick sequence corresponding to the particular gripping mechanism being used, and is not to be interpreted as limited to the gripping mechanisms described herein. Accordingly, the work-cell level harvesting process may include the sequences depicted in FIGS. 6A-6G and 8 but is not limited to these sequences or the particular gripping mechanisms described in these figures. After the pick sequence is completed, the method 700 continues to decision state 724.

At decision state 724, the controller 440 or other processing component determines whether the pick was successful. In some embodiments, the determination at decision state 724 may be made after the robot attempts to break the berry stem and before moving the berry to the receptacle. At decision state 724, the controller 440 may analyze measurements received from the vacuum sensor 434 and/or finger force sensors 438. For example, if the force detected at the finger force sensors decreases to a baseline reading, or if the vacuum sensor no longer detects a low pressure, it may be determined that the berry disengaged from (or was dropped by) the end effector during the pick sequence, and that the attempted pick was not a success. If the finger force sensors continue to detect that force is being applied between the fingers and an item, or if the vacuum sensor still detects that an item is blocking the suction cup opening, it may be determined that the berry is still in the gripper, and that the pick was a success. If it is determined at decision state 724 that the pick was not successful, the method continues to block 726 where a reassessment occurs and the end effector does not continue moving toward the receptacle. Based on the reassessment, the method 700 may either return to block 720 to reattempt to pick the berry or may return to block 712 to scan for additional berry candidates or receive information from images taken by another robot that an identified berry is a candidate for picking.

If it is determined at decision state 724 that the pick was a success, the method 700 terminates at block 728, where the berry is dropped into the receptacle. The process of dropping the berry may include moving the end effector toward the receptacle but releasing the berry before the end effector is above the receptacle (thereby relying on the velocity and trajectory of the berry to carry it to the receptacle), or it can include moving the end effector to a position directly above the receptacle. For example, the robot may throw or toss the berry into the receptacle before the end effector is located physically above the receptacle. The point at which the berry is released can be determined by balancing the desire not to damage the berry when it lands in the receptacle and the desire to re-allocate the end effector to the next picking sequence as quickly as possible, increasing efficiency of the picking operation. Once the berry has been dropped into the receptacle, the picking process is complete and the work cell may continue picking additional berries. If continued operation is desired, the method 700 returns to block 712 to scan for additional berry candidates. Alternatively, if another berry candidate has already been identified with sufficient confidence, the method 700 may return directly to block 718 to begin picking the next berry candidate without an additional scanning operation. Blocks 712-728 may be repeated indefinitely during operation of a harvester according to the present disclosure.

Example End Effector-Level Picking Sequence According to the Present Disclosure

Figure 8:
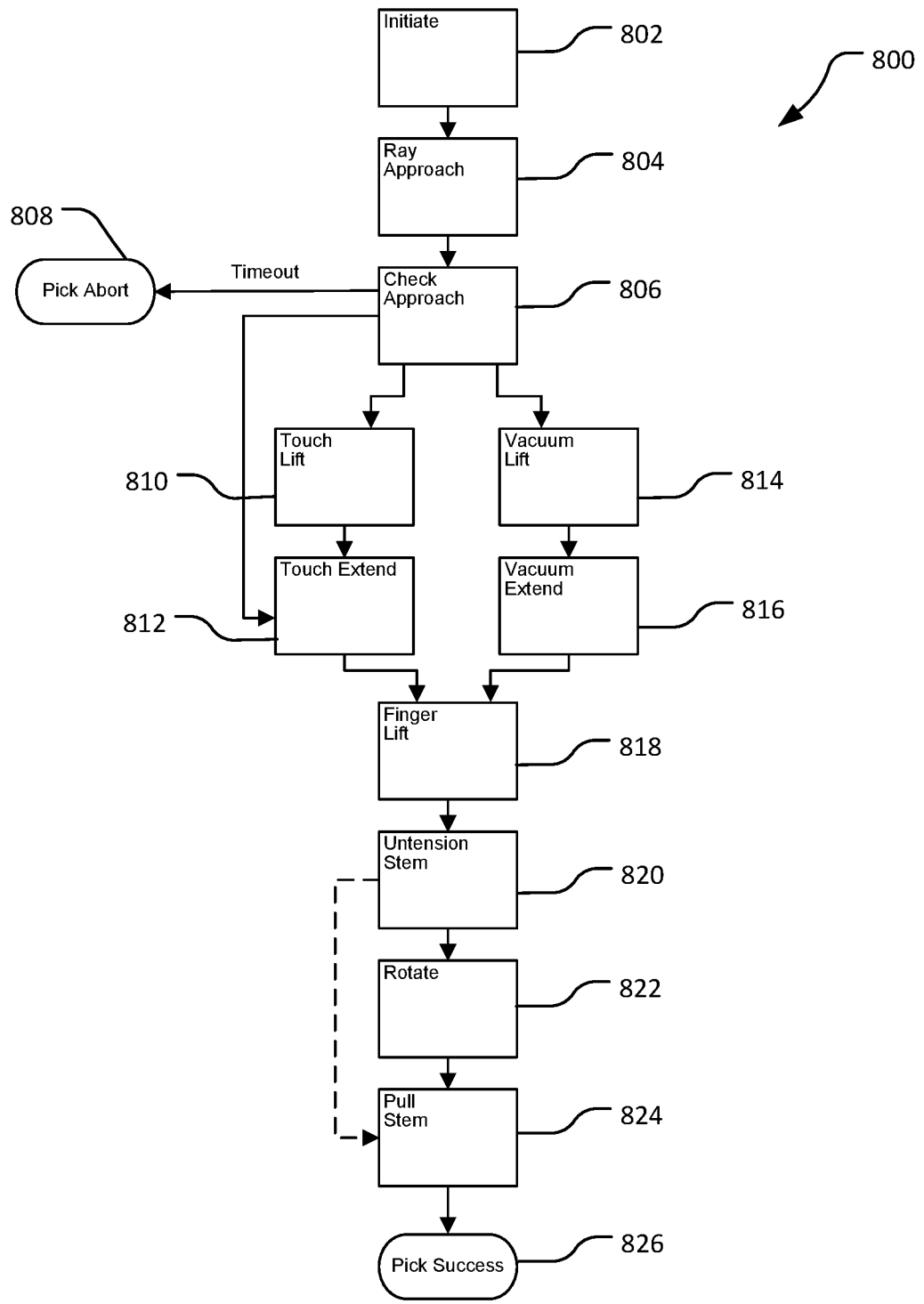
FIG. 8 is a flow chart illustrating an example end effector-level method for picking a berry as described herein.

FIG. 8 is a flow chart illustrating an example end effector-level method 800 for picking a berry according to the present disclosure. The method 800 may be performed by a computer system integrated within a system such as all or a subset of the processing components of the harvesters 100, 300, 400 depicted in FIGS. 1-4B. For example, the method 800 may be performed by the end effector 500 of FIGS. 5A-6G, moved by a robot $422_2$ and under control of the controller 440 or a slave controller 426. Although the method 800 will be described herein with reference to the end effector 500 of FIGS. 5A-6G, the method 800 may equally be implemented with any other suitable end effector.

The method 800 begins at block 802 when the pick sequence is initiated. The pick sequence may be initiated automatically, for example, when a work cell including the robot $422_2$ and end effector 500 detect a berry with a high level of confidence and enter a pick sequence at decision state 714 and/or block 720 of FIG. 7. Alternatively, the pick sequence may be initiated manually based on an input received at a user interface 414. When the pick sequence has been initiated, the method 800 continues to block 804.

At block 804, the controller 440 causes the robot $422_2$ to move the end effector 500 along a ray approach path to the berry to be picked. The ray approach path may be a predetermined ray approach path calculated at the controller 440 or other processing component of the harvester 400 based on the location of the berry as determined during the berry candidate identification and selection processes described above with reference to FIG. 7. In some embodiments, the ray approach may be calculated so as to be coincident with a line of sight along which the berry was viewed and identified during the berry candidate selection process. Advantageously, approaching the berry along a known line of sight (for example, a path known to be clear of obstructions) may provide a high probability that the suction cup 522 will be able to reach the berry without being blocked by leaves, stems, or other debris that may prevent the suction cup 522 from reaching or successfully engaging the berry. After the ray approach path to the berry has begun, the method 800 continues to block 806.

At block 806, one or more sensors of the end effector 500 can be monitored along the ray approach to detect when the suction cup 522 has reached the berry. For example, the ray approach may be calculated as a ray extending to and through the expected berry location. As described above, approaching the berry along a ray that extends through the expected location can mitigate the effects of berry movement. In a strawberry field, individual berries may move frequently. For example, an effector picking a nearby strawberry might move a target berry or rustle a stem or leaves that cause the target berry to move. Individual berries may also move due to harvester vibration, wind, or other forces. This movement may be slight, and moving through the initial position may still result in a successful contact with a target berry despite some movement. While the end effector 500 travels along the ray approach, the vacuum sensor and/or linear position sensor may be monitored continuously or periodically to detect formation of a vacuum at the suction cup 522, activation of a touch switch, and/or linear motion of the suction cup 522 upward along the longitudinal axis caused by running into the berry. When it is detected that the suction cup 522 has reached and engaged the berry (or an item estimated to be a berry with a high degree of confidence), the method 800 continues to block 810 or block 814.

In situations when engagement was detected at block 806 due to activation of both the vacuum sensor and the touch sensor, the method 800 can continue to block 810, in which the robot moves the end effector 500 upward to lift the berry away from the plant (for example, by 1 cm, 2 cm, 5 cm, or more) until the touch sensor disengages, before vacuum lifting at block 814 and extending the fingers 540 to grasp the berry at block 816. However, if engagement was detected based only on activation of the touch sensor and a vacuum was not also created at the suction cup, it is possible that the berry has been found by the suction cup 522 but not successfully vacuum grasped. In this situation, the method 800 may proceed directly from block 806 to block 812, as the suction cup 522 may not have a sufficient grasp on the berry to lift it. In contrast, if engagement was detected at block 806 due to activation of the vacuum sensor instead of or in addition to activation of the touch sensor, the method 800 continues from block 806 to lift and positively grasp the berry at blocks 814 and 816. When the fingers 540 have been extended to positively grasp the berry at block 812 or block 816, the method 800 continues to block 818.

At block 818, the robot lifts the end effector 500 upward in the z-axis direction such that the berry is lifted further upward along the longitudinal axis of the end effector shaft. If the berry is still connected to its stem, the stem will become more taut as the berry is lifted upward while being grasped by the fingers 540. As tension in the stem increases, the berry experiences an increasing force pulling along the direction of the stem. Accordingly, the force sensors in the two fingers 540 adjacent to the stem direction will detect an increased force, while the remaining finger 540 will detect a decreased force. When these varying forces are detected, the controller 440 may determine that the azimuth corresponding to the actual stem direction is somewhere between the azimuths of the two fingers 540 experiencing the increased force. The relative force increases at the two stem-adjacent fingers 540 may further be used to more accurately determine the stem azimuth. For example, if the two force increases are approximately equal, it may be determined that the stem originates from an azimuthal direction approximately equally between the two fingers 540. If one of the two stem-adjacent fingers 540 experiences a higher increased force than the other stem-adjacent finger 540, it may be determined that the stem azimuth is closer to the finger 540 sensing the higher increased force. In various embodiments, the actual stem direction may be determined with relatively high accuracy using known trigonometric operations, subject to the sensitivity and/or resolution of the force sensors in the fingers 540. After the berry has been lifted and the stem direction has been determined, the method 800 continues to block 820.

At block 820, the stem is untensioned to facilitate further steps in the method 800. For example, reducing tension in the stem may ensure that there is enough slack to rotate the berry. Based on the known stem direction, the robot moves the end effector 500 upward and laterally toward the base of the stem. In some embodiments, the end effector 500 may roughly trace a circular arc constrained by the stem as a radius. The end effector 500 may continue moving until it approximately reaches a zenith at which the stem is generally oriented along the longitudinal axis of the shaft, or may stop before reaching the zenith. Thus, following the untensioning step, the stem is more closely aligned with the longitudinal axis of the end effector relative to the initial grasping location, while the portion of the stem near the calyx is still horizontal. Thus, a subsequent pulling force along the longitudinal axis will result in a high moment applied at the point where the stem enters the berry, advantageously reducing the amount of force required to separate the berry from the stem by motion along the longitudinal axis. After the stem has been untensioned, the method 800 continues to block 822.

At block 822, the berry is rotated about the longitudinal axis of the end effector shaft. In the example end effector 500, the shaft actuator 515 causes the shaft 502 to rotate about the longitudinal axis 521 such that the suction cup 502, carriage 530, fingers 540, and berry all rotate about the longitudinal axis 521. The degree of rotation may be, for example, in the range of 45 degrees, 60 degrees, 90 degrees, 120 degrees, 180 degrees, or more. In some implementations, the rotation step may be skipped and the method 800 may proceed directly from block 820 to block 824. For example, some plant varieties may have weaker stems than other varieties, reducing the need to include a rotation step. In another example, plant stems may grow longer and become easier to break over the course of a season. Thus, the rotation step may be included early in a strawberry harvesting season while the stems are shorter and stronger, and may be omitted later in the season when the stems are longer and weaker. After the berry has been rotated, or if the rotation step is not being performed, the method 800 continues to block 824.

At block 824, the robot pulls the end effector 500 upward (generally in the z-axis direction) to pull the berry away from the stem and remove the berry from the plant. The pulling motion may be a sudden upward motion with acceleration in the range of 3 g-5 g or more to provide sufficient force to cause the stem to break or to separate from the berry at the calyx. If the stem is broken or separated from the berry (e.g., as determined by monitoring the finger force sensors, vacuum sensors, and/or camera sensors), the method 800 terminates at block 826 when a successful pick is determined.

LIDAR Guidance

Figures 9A, 9B:
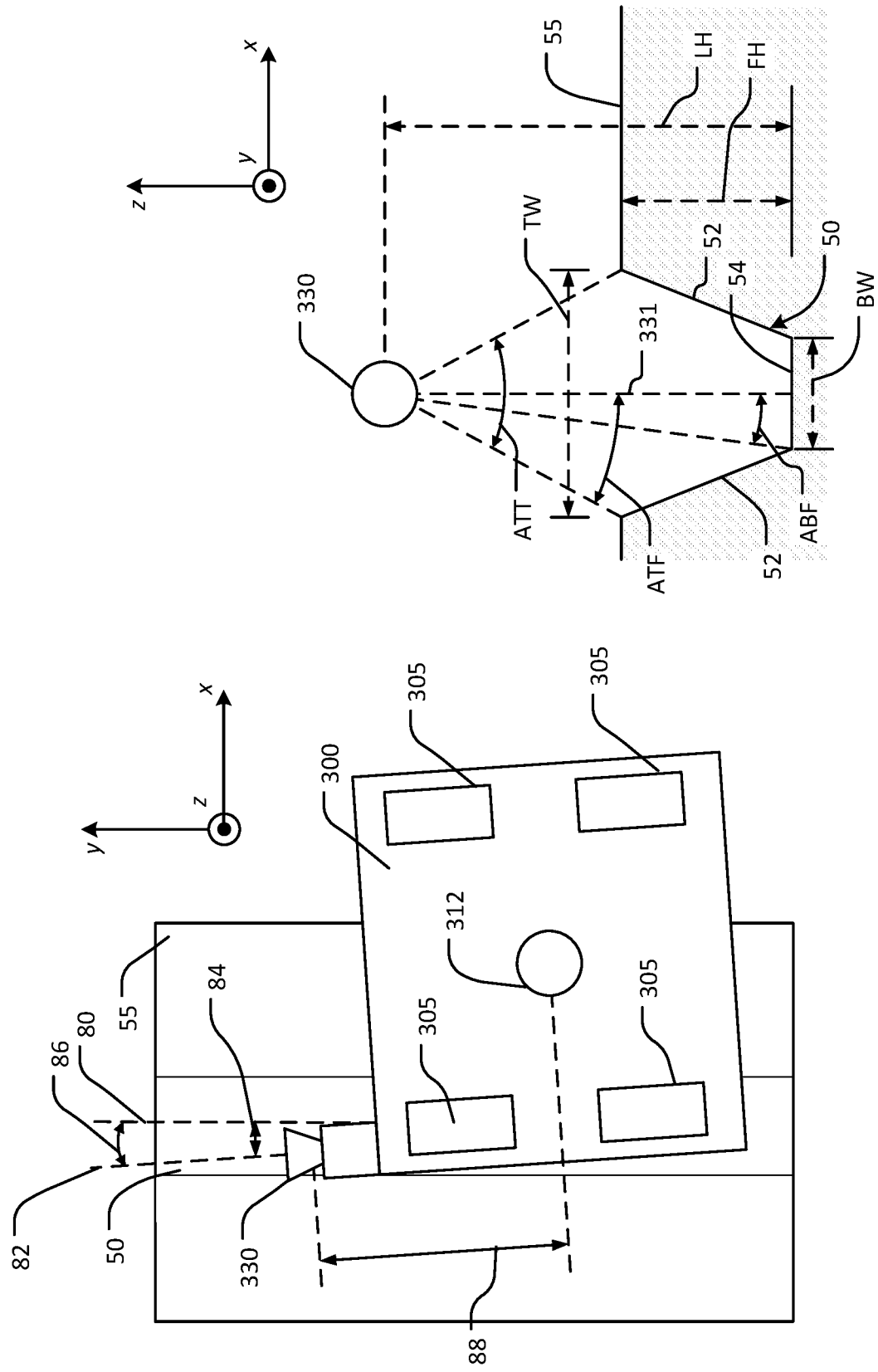
FIG. 9A is a schematic overhead view of an example harvester including a LIDAR guidance system.
FIG. 9B is a cross-sectional view schematically illustrating an example configuration of a LIDAR relative to a furrow.
Figure 10:
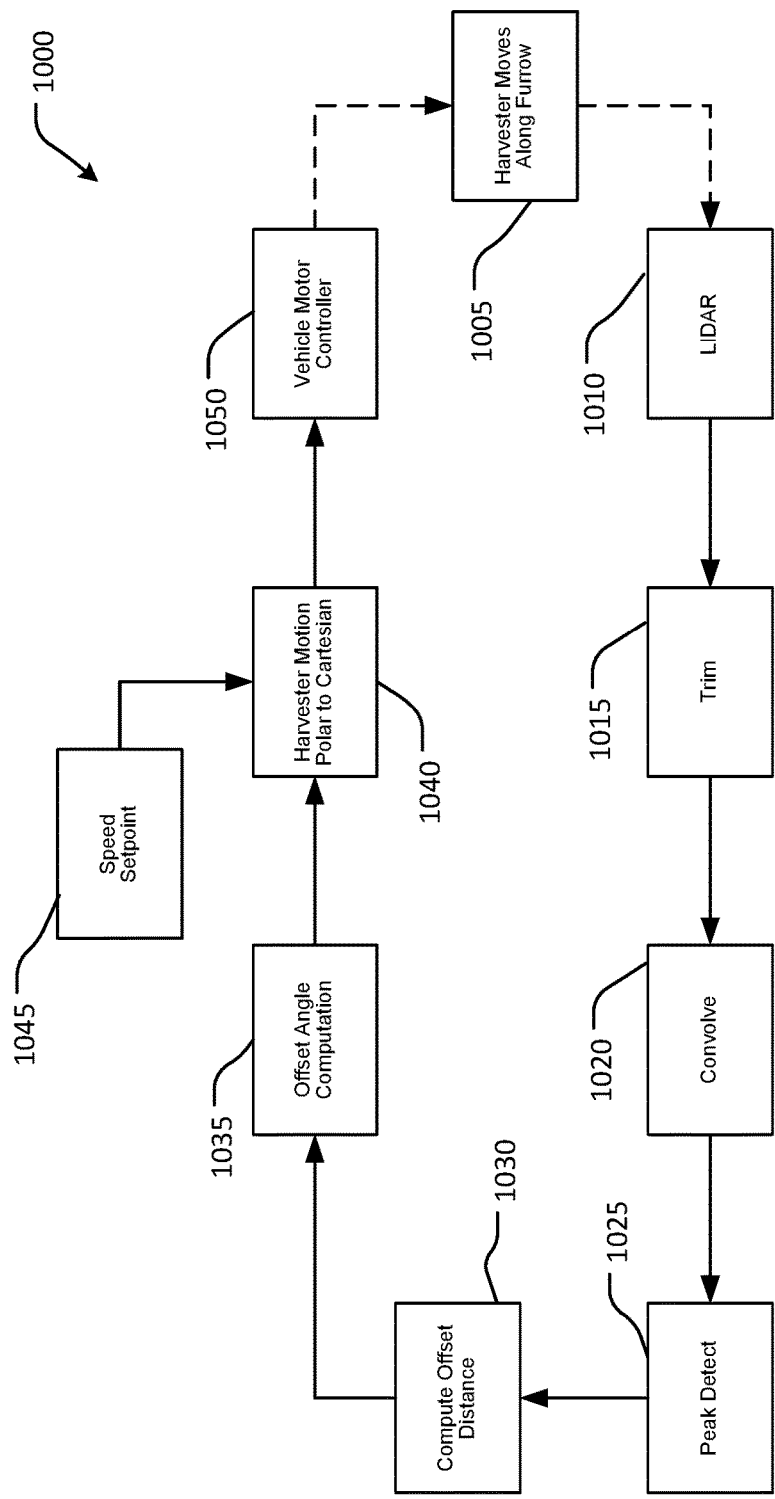
FIG. 10 is a flow diagram illustrating an example LIDAR control process.
Figure 11A:
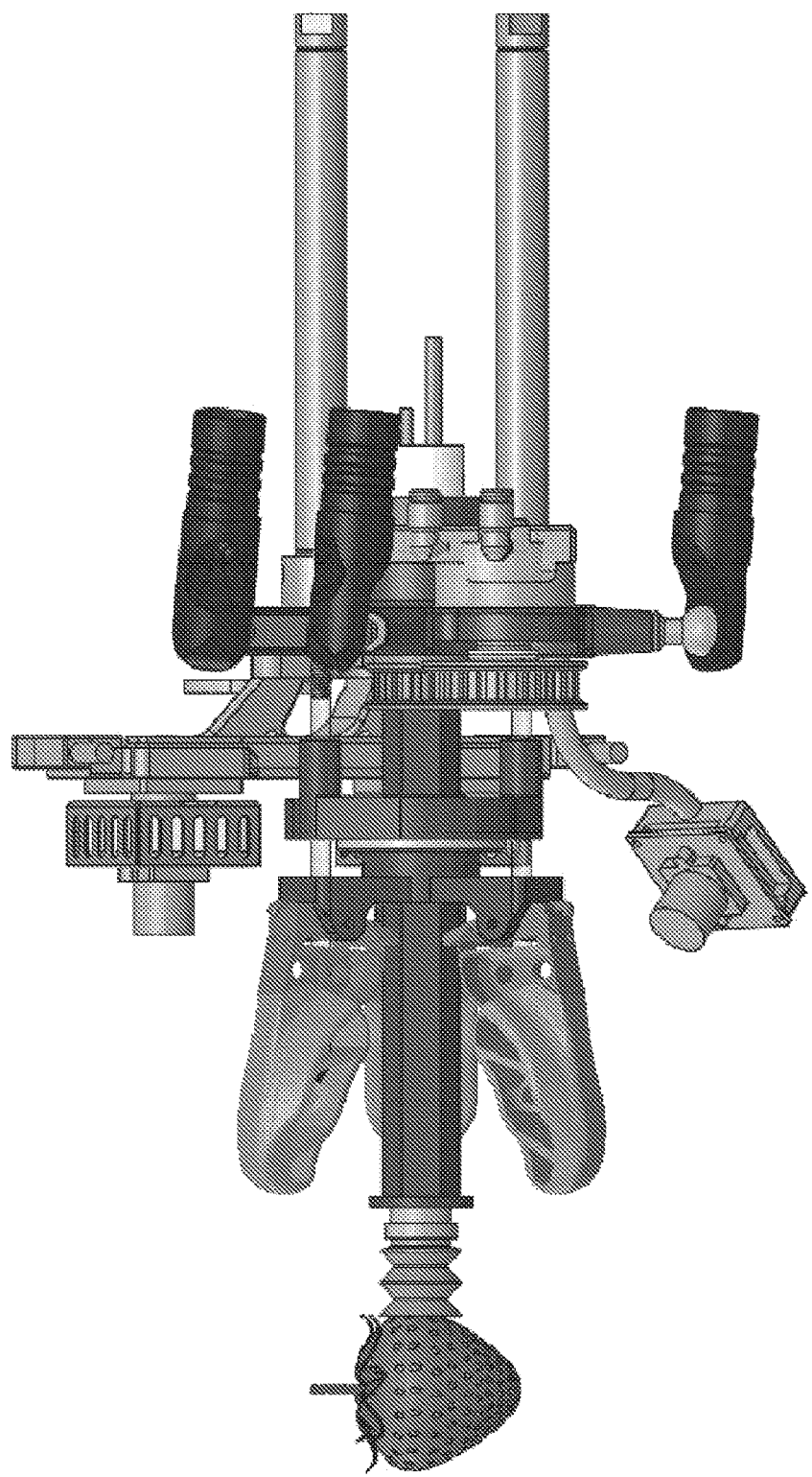
FIGS. 11A-11D depict additional views of the end effector of FIGS. 5A-5D during the example sequence of FIGS. 6A-6F.
Figure 11B:
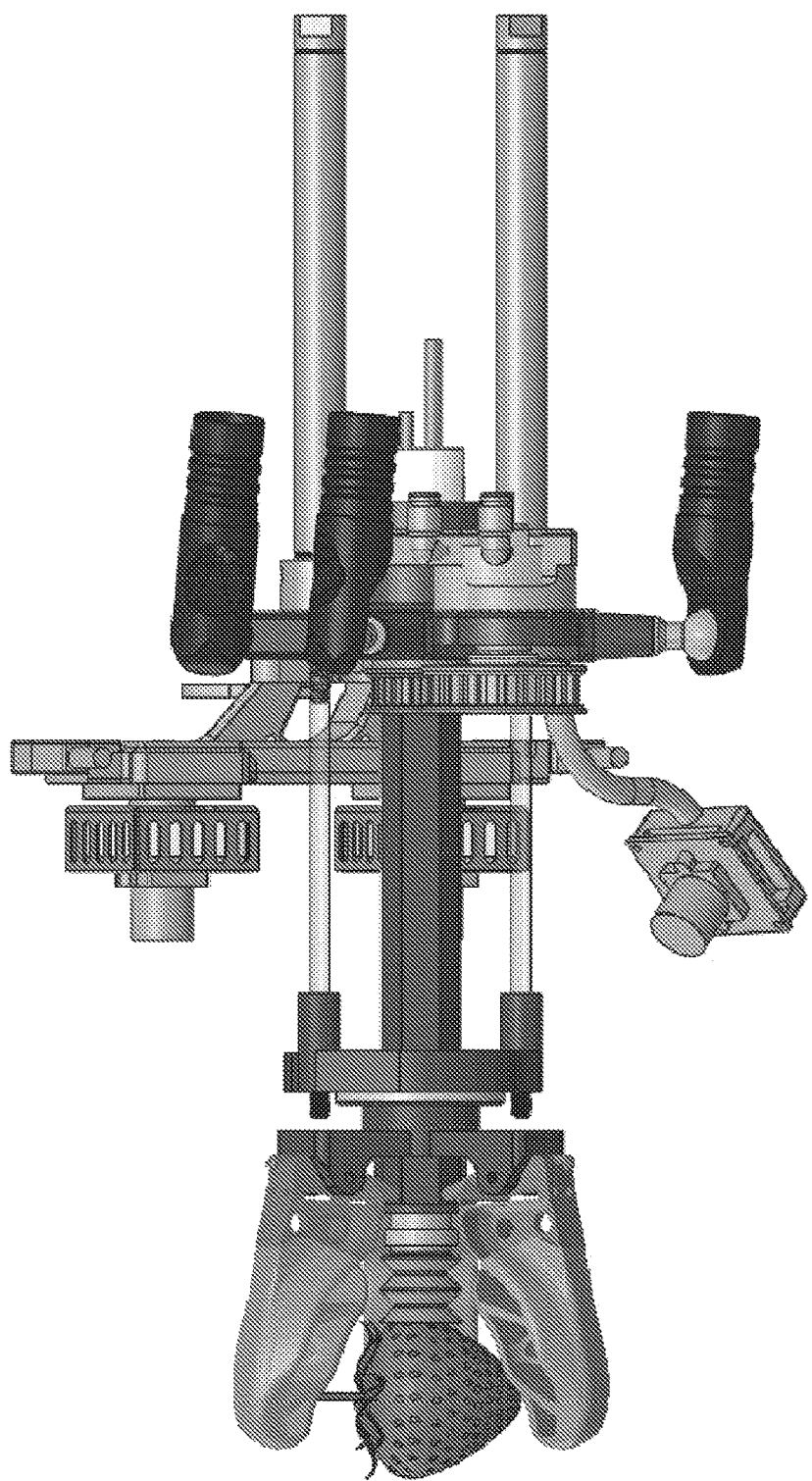
Figure 11C:
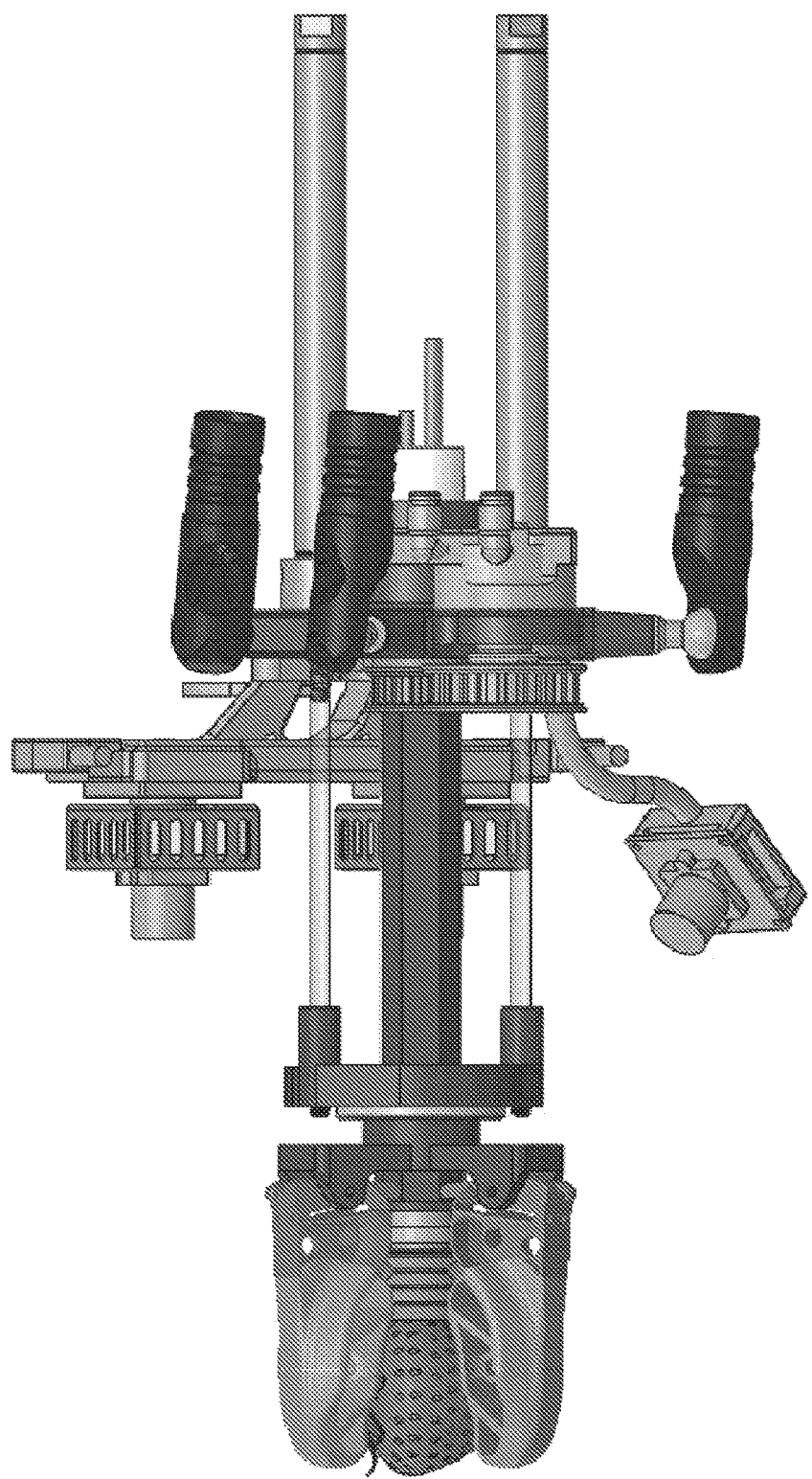
Figure 11D:
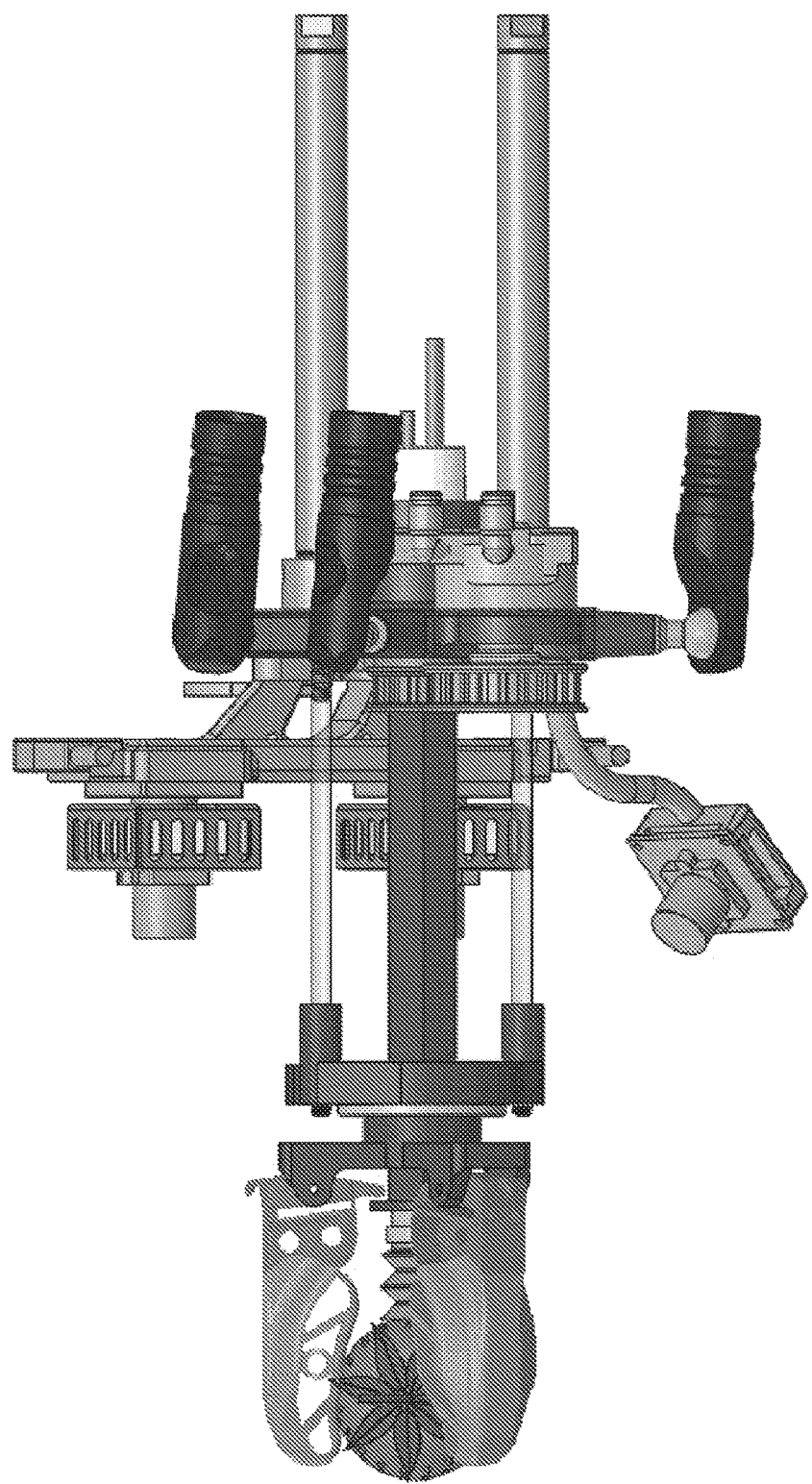

With reference to FIGS. 9A-10, autonomous harvesters described herein may be directed by guidance systems using LIDAR or the like. For example, the guidance system may use LIDAR to detect one or more furrows and/or beds of an agricultural field and identify a path or otherwise guide the harvester along the furrows without damaging the beds located between the furrows, as described above with reference to FIG. 3.

FIG. 9A is a top-down schematic view depicting a harvester 300 positioned over a furrow 50 and a bed 55 of an agricultural field, such as a strawberry field. The harvester 300 includes wheels 305 and a guidance sensor 330, which in this example is a detector of a LIDAR system. The wheels 305 preferably travel along the bottom of the furrow 50 near a furrow centerline 80, such that the intermediate portion of the harvester 300 is suspended above the bed 55 and does not contact the bed 55 or items such as plants located on the bed 55.

The guidance sensor 330 may be mounted on a front portion of the harvester 300. For example, the guidance sensor 330 may be located ahead of other components of the harvester. The guidance sensor 330 can be oriented to point directly downward or at a downward angle so as to detect physical features of the furrow 50. The guidance sensor 330 is mounted in-line with a wheel centerline 82 or at a known lateral offset relative to the wheel centerline 82. The wheel centerline 82 may be coincident with the furrow centerline 80 or may be linearly offset by a wheel offset distance 84 along the x-axis at a location near the guidance sensor 330. The wheel centerline 82 may further be angularly offset from the furrow centerline 80 by an offset angle 86. The guidance sensor 330 can be mounted at a known baseline distance 88 along the y-axis relative to a central location 312, such as a center of rotation of the harvester 300. In some embodiments, the offset angle 86 may be calculated trigonometrically based on the wheel offset distance 84 and the baseline distance 88.

Where the guidance sensor 330 is a LIDAR device, the guidance sensor 330 can be a line scanning device configured to determine radial distances from the sensor to objects or portions of objects within the field of view of the guidance sensor 330. Locations of objects or portions of objects may be readily determined in polar coordinates, with the guidance sensor 330 at the origin, based on the distance and angle to the object or portion thereof, as detected by the guidance sensor 330.

FIG. 9B illustrates an example LIDAR implementation in a furrow 50. The furrow 50 is located adjacent to a bed 55. Furrow walls 52 extend between the base 54 of the furrow and the bed 55. The furrow 50 can be generally defined by a base width BW, a top width TW, and a furrow height FH. The furrow walls 52 may be vertical such that TW is equal to BW, or may be disposed at an angle such that TW is greater than BW. The guidance sensor 330 (e.g., a LIDAR system or sensor thereof) is disposed at a LIDAR height LH above the base 54 of the furrow 50. In this position, the guidance sensor 330 may detect various features of the furrow 50. For example, the guidance sensor 330 may detect a furrow base angle ABF between a sensor centerline 331 and an intersection between the base 54 and a wall 52, a furrow top angle ATF between the sensor centerline 331 and an intersection between a bed 55 and a wall 52, and a top-to-top angle ATT between the tops of the two furrow walls 52.

Referring jointly to FIGS. 9A and 9B, the LIDAR guidance system can use the angles and distances to various points within the furrow 50 to detect the locations of the furrow walls 52. Based on the locations of the furrow walls 52, the guidance system can determine the location of the furrow centerline 80 and the corresponding wheel offset distance 84. Based on the wheel offset distance 84, the guidance system can cause the harvester 300 to adjust its course (e.g., by communicating with a vehicle master controller or other vehicle control component). The harvester 300 may be guided such that the wheels 305 are positioned at the furrow centerline 80 or within a desired distance from the furrow centerline 80 (e.g., the wheel offset distance 84 is 0 or close to zero, such as within 1 inch, 2 inches, inches, 6 inches, 1 foot, 1.5 feet, etc.).

Referring now to FIG. 10, an example LIDAR guidance method 1000 will be described. As shown in FIG. 10, the method 1000 may be a repeated and/or iterative process performed continuously or periodically as a harvester moves along a furrow at block 1005. As the harvester moves along the furrow or before the harvester begins moving, the LIDAR system obtains data at block 1010. The LIDAR data may include a set of data points in polar coordinates, with each point comprising an angle and a distance corresponding to a point along the bed 55, furrow wall 52, or furrow base 54 as depicted in FIG. 9B.

At block 1015, the LIDAR data may be trimmed to focus on a region of interest. For example, the data may be trimmed to exclude points at angles outside the angle ATT depicted in FIG. 9B. The data points within the LIDAR data may additionally be converted from polar coordinates to Cartesian coordinates (e.g., within the x-z coordinate plane depicted in FIG. 9B). At block 1020, the Cartesian converted LIDAR data may be convolved with a kernel (e.g., a mask or convolution matrix) to produce an output signal. For example, an edge detection kernel or similar kernel may be used to identify peaks corresponding to the edges of the furrow walls. In one particular example, the kernel may include a first half having values of −1 and a second half having values of +1, such that the output signal has positive peaks corresponding to the falling edges of the furrow walls 52 and negative peaks corresponding to the rising edges of the furrow walls 52.

At block 1025, the peaks in the output signal are detected, and their locations along the x-axis (FIG. 9B) are determined relative to the sensor centerline 331. Based on the locations of the peaks, at block 1030 the system calculates the wheel offset distance 84 as shown in FIG. 9A. At block 1035, the offset angle 86 is calculated based on the offset distance 84 and the known baseline distance 88. The offset angle 86 may then be compared with zero as a negative feedback for the vehicle control system. At block 1040, the motion of the harvester may be determined in Cartesian coordinates based on the computed offset angle and a speed set point 1045 corresponding to a linear speed of the harvester along the offset angle direction. At block 1050, a command may be issued to the vehicle motor controller, for example, to change the direction of motion or to continue along the same path. For example, if it is determined during the method 1000 that the offset angle is 0 and the offset distance is 0 or close to 0, the guidance system may direct the vehicle motor controller to continue along the current path without adjustment. However, if it is determined that the offset angle is not 0, the guidance system may direct the vehicle motor controller to change the direction of motion (e.g., by steering one or more wheels or by changing the relative rotational velocities of the left-side and right-side wheels) to reduce the offset angle. After the method 1000 is complete at block 1050, the method 1000 can repeat indefinitely as the harvester continues moving along the furrow at block 1005.

Additional End Effector Details

FIGS. 11A-11D depict additional views of the end effector 500 of FIGS. 5A-5E during the sequence of FIGS. 6A-6G. Specifically, FIG. 11A corresponds to the configuration of FIG. 6A, FIG. 11B corresponds to the configuration of FIG. 6B, FIG. 11C corresponds to the configuration of FIG. 6C, and FIG. 11D corresponds to the configuration of FIG. 6F.

Example Robot According to the Present Disclosure

Harvesters described herein can advantageously implement any suitable robot $422_1$, $422_2$ $422_N$ in accordance with the present disclosure. In addition to the example delta robot implementation described above with reference to FIG. 3A, a second example robot implementation illustrated in FIG. 3B will now be described. It will be understood that the present technology is not limited to either of the example robots described herein, and other suitable robots, or variations of the robots described herein, can be implemented.

Figure 12A:
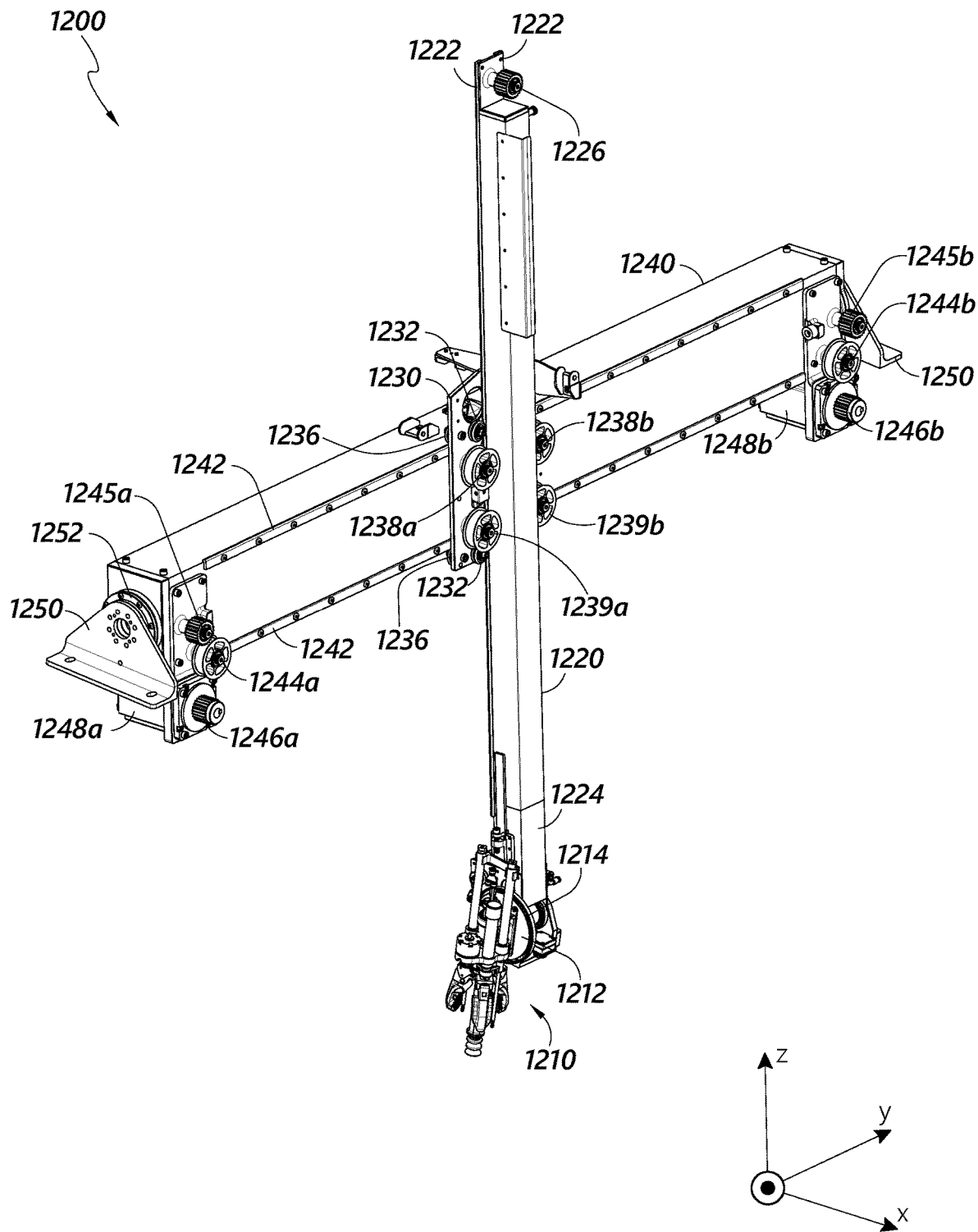
FIGS. 12A-12G depict an example robot including a modified t-bot architecture for supporting and manipulating the example end effectors described herein.

FIGS. 12A-12G depict an example robot 1200 that may be used to mount and move any of the end effectors described herein. The example robot 1200 is illustrated as a t-type robot 1200 configured to support an end effector 1210 and to move the end effector 1210 as desired within a harvester work cell or other picking area. With reference to FIG. 12A, the robot 1200 generally includes a radial member 1220, a carriage 1230, a longitudinal member 1240, and mounting brackets 1250 disposed at opposite ends of the longitudinal member 1240. The longitudinal member 1240 may be a gantry or other generally linear component.

The end effector 1210 is mounted to a distal end 1224 of the radial member 1220 at a mounting plate 1212. The mounting plate 1212 is coupled to an end effector actuator gear 1214 allowing the end effector 1210 to be rotated relative to the radial member 1220. The radial member 1220, which may be an arm, tube, or the like, includes radial member tracks 1222 retained by radial member rollers 1232 of the carriage 1230, such that the radial member 1220 is retained by the carriage 1230 but can slide relative to the carriage 1230 along a direction parallel to the length of the radial member 1220. The carriage 1230 further includes longitudinal member rollers 1236 counted on an opposite side of a plate of the carriage relative to the radial member rollers 1232. The longitudinal member rollers 1236 retain longitudinal member rails 1242 of the longitudinal member 1240 such that the carriage 1230 remains attached to the longitudinal member 1240 but can slide relative to the longitudinal member 1240 along a direction parallel to the length of the longitudinal member 1240. The longitudinal member 1240 is coupled to the mounting brackets 1250 by longitudinal member bearings 1252 (e.g., slew rings or other rotational bearings), such that the longitudinal member 1240 is fixed to the mounting brackets 1250 but can rotate about an axis parallel to the length of the longitudinal member 1240. In some embodiments, the longitudinal member 1240 may include a motor (not shown) which may be mounted inside the longitudinal member 1240 and configured to rotate the longitudinal member 1240 about the axis.

Movement of the carriage 1230 along the longitudinal member 1240 and movement of the radial member 1220 relative to the carriage 1230 may be controlled by one or more motors, such as motors 1248a and 1248b. In some embodiments, two or more motors may individually control movement of the radial member 1220 and the carriage 1230. In some embodiments, such as in the embodiment depicted in FIGS. 12A-12G, motors 1248a, 1248b may operate together to jointly control motion of both the radial member 1220 and the carriage 1230. Motors 1248a and 1248b include output shafts 1246a, 1246b shaped to engage and drive one or more belts (not shown) that couple to the longitudinal member 1240, the carriage 1230, and/or the radial member 1220 around idler pulleys 1244a, 1244b, 1245a, 1245b, 1238a, 1238b, 1222, 1239a, and 1239b. In one example configuration, a single belt is coupled at a first end to the radial member 1220 at a first belt securement 1228a and is looped, in order, over idler pulleys 1239a and 1244a, output shaft 1246a, idler pulleys 1245a, 1238a, 1222, 1238b, and 1245b, output shaft 1246b, and idler pulleys 1244b and 1239b. A second end of the belt is coupled to the radial member 1220 at a second belt securement 1228b.

In one example, motors 1248a and 1248b are utilized in a CoreXY control arrangement. In the CoreXY arrangement, a belt (not shown) is coupled to the components of the robot 1200 such that simultaneous motion of both motors 1248a, 1248b can produce translation of the radial member 1220, translation of the carriage 1230, or both. For example, simultaneous motion of the motors 1248a, 1248b in the same direction at the same speed may cause the radial member 1220 to move relative to the carriage 1230 while the carriage 1230 remains stationary, and simultaneous motion of the motors 1248a, 1248b in opposite directions at the same speed may cause the radial member 1220 to remain stationary with respect to the carriage 1230 while the carriage 1230 moves along the longitudinal member 1240. Combined motion of the radial member 1220 and the carriage 1230 may be achieved by driving the two motors 1248a, 1248b at different speeds and/or in different directions simultaneously. Additional details of CoreXY control arrangements are generally known in the art and will not be provided here. It will be understood that the term "CoreXY" does not necessarily indicate that the motors 1248a and 1248b are limited to controlling motion within a particular (x,y) coordinate system, but are configured to control the motion along substantially perpendicular directions parallel to the longitudinal member 1240 and the radial member 1220, regardless of the rotational orientation of the longitudinal member 1240 with respect to the mounting brackets 1250. It will further be understood that other suitable control arrangements to control movement of the carriage 1230 and the radial member 1220 could be implemented in accordance with the present disclosure.

Figure 12B:
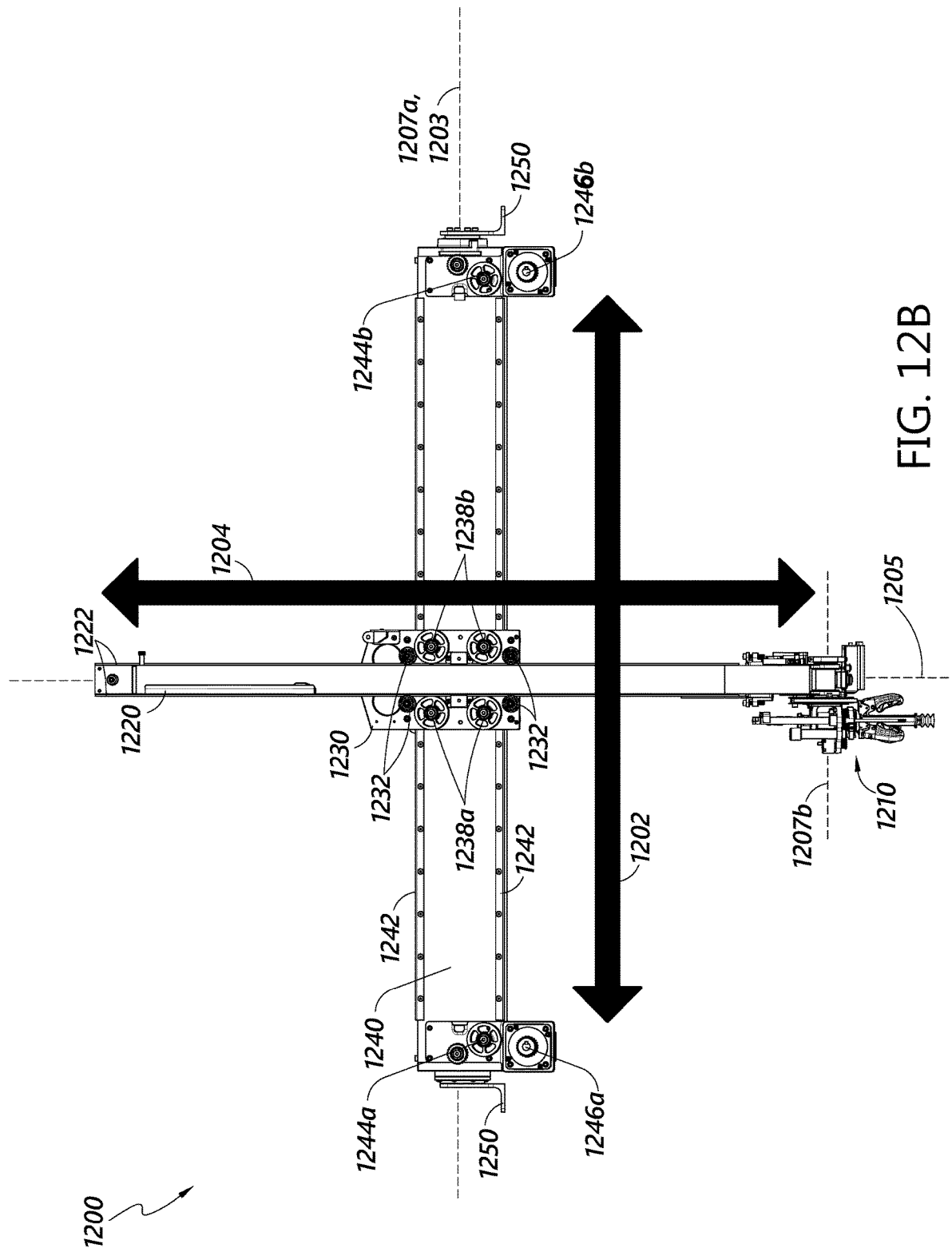
Figure 12C:
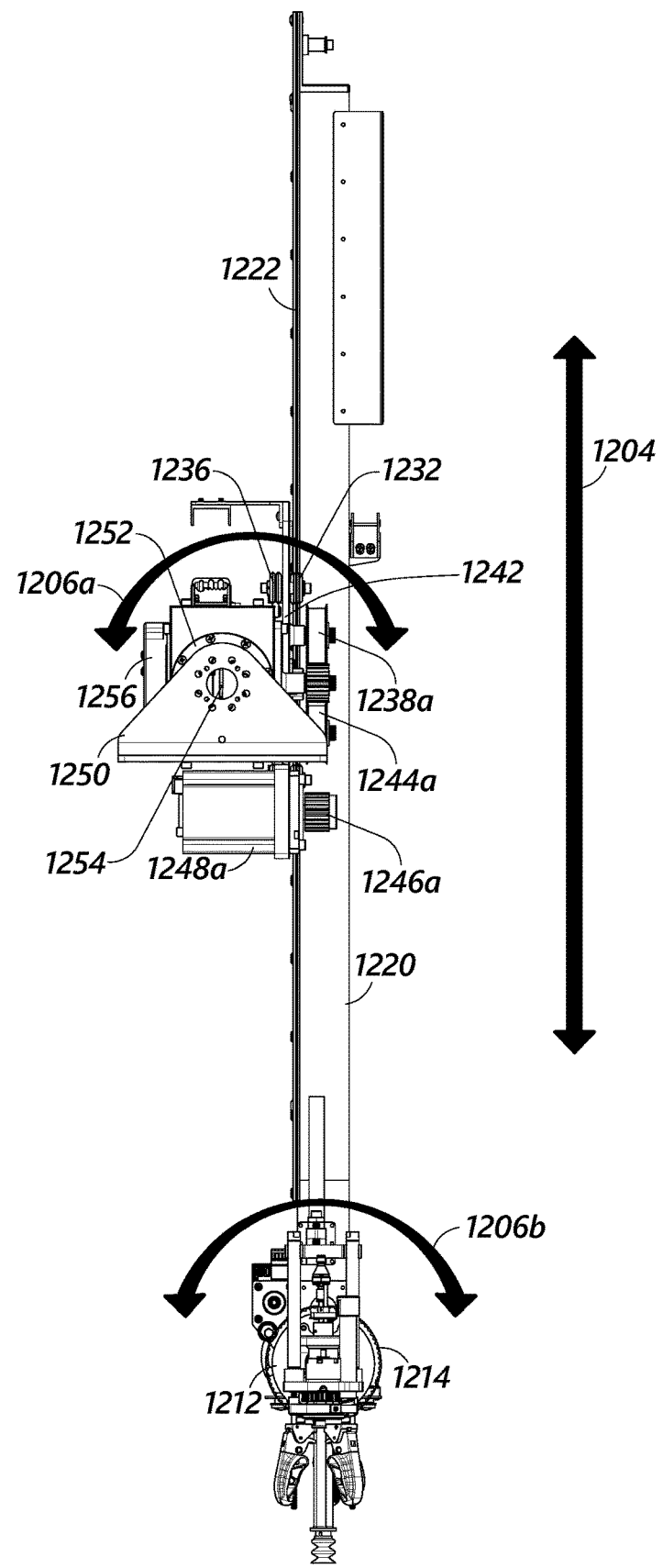
Figure 12D:
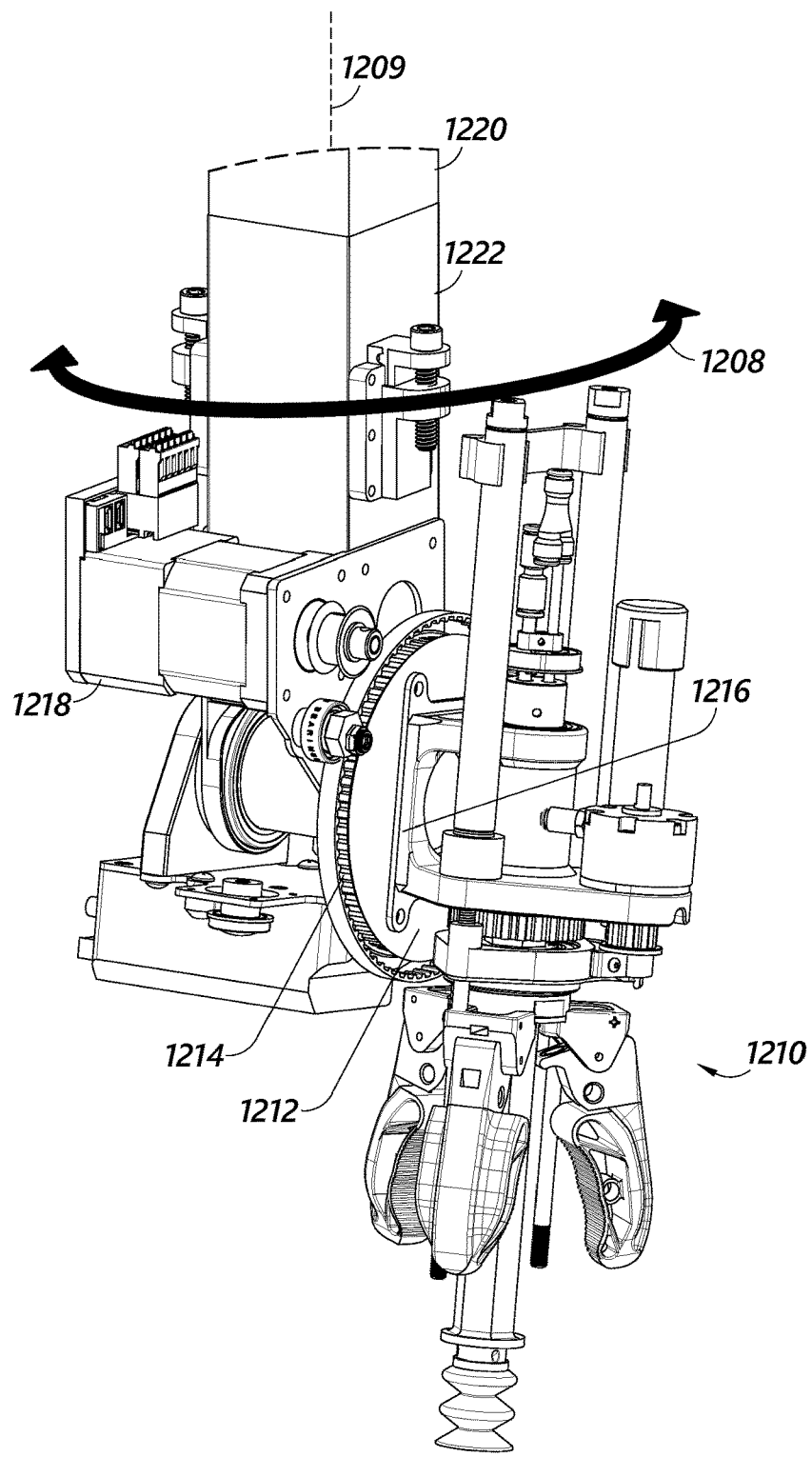

FIGS. 12B-12D illustrate the various axes of motion achievable with the example robot 1200. Referring jointly to FIGS. 12B-12D, the end effector 1210 may be translated along a longitudinal axis 1203 parallel to the longitudinal member 1240, as shown by motion 1202. Motion of the end effector 1210 along the longitudinal axis 1203 is achieved by moving the carriage 1230 along the longitudinal member 1240 as described above with reference to FIG. 12A. The end effector 1210 may further be translated toward or away from the longitudinal member 1240 along a radial axis 1205 parallel to the radial member 1220, as shown by motion 1204. When the longitudinal member 1240 is rotated such that the radial member 1220 is vertical, motion 1204 along the radial axis 1205 corresponds to vertical up-and-down motion.

The radial axis 1205 may be rotated relative to the longitudinal member 1240 about a first rotational axis 1207a as represented by rotational motion 1206a. The longitudinal member 1240 extends into the page of FIG. 12C, but a portion of the end of the longitudinal member 1240 is visible above the mounting bracket 1250. The longitudinal member 1240 may be rotated about a center of rotation 1254 defined by the longitudinal member bearings 1252. The end effector 1210 may further be rotated relative to the radial member 1220 about a second rotational axis 1207b defined by the center of the mounting plate 1212, controlled by motion of the end effector actuator gear 1214. Rotational motion 1206b illustrates the rotation of the end effector relative to the radial member 1220 about the second rotational axis. In some embodiments, the motion 1206a, 1206b about the first rotational axis 1207a and the second rotational axis 1207b may be linked such that clockwise motion 1206a, 1206b about either rotational axis is accompanied by counterclockwise motion 1206a, 1206b about the other rotational axis 1207a, 1207b. In such embodiments, the linking of the rotational axes 1207a, 1207b allows the end effector 1210 to be retained in the same orientation relative to the ground (e.g., vertical or substantially vertical) as the radial member 1220 rotates about the first rotational axis 1207a. Rotational motion 1206a, 1206b about either rotational axis 1207a, 1207b may be driven by a motor 1256 mounted to the carriage 1230.

With reference to FIG. 12D, in some embodiments the end effector 1210 may further be rotatable about a third rotational axis 1209 parallel to the radial member 1220, as shown by rotational motion 1208. For example, the distal end 1224 of the radial member 1220 may be rotatable relative to the remainder (e.g., a proximal portion) of the radial member 1220. In embodiments in which motion 1206*a*, 1206*b* about the first and second rotational axes 1207*a*, 1207*b* are not linked, motion 1208 about the third rotational axis 1209 may be used in combination with motion 1206*b* about the second rotational axis 1207*b* to position the end effector 1210 at any orientation including sideways and/or forward/backward orientations. Such additional possible orientations may allow for the picking of items that are not easily accessible and/or visible from above, but which are accessible and/or visible from the side, in front, and/or behind.

With continued reference to FIG. 12D, the end effector 1210 may be mounted to the mounting plate 1212 by an end effector mounting bracket 1216. Rotation of the end effector 1210 about the second rotational axis 1207*b* may be controlled by an end effector rotation motor 1218 coupled to the distal end 1224 of the radial member 1220.

Figure 12E:
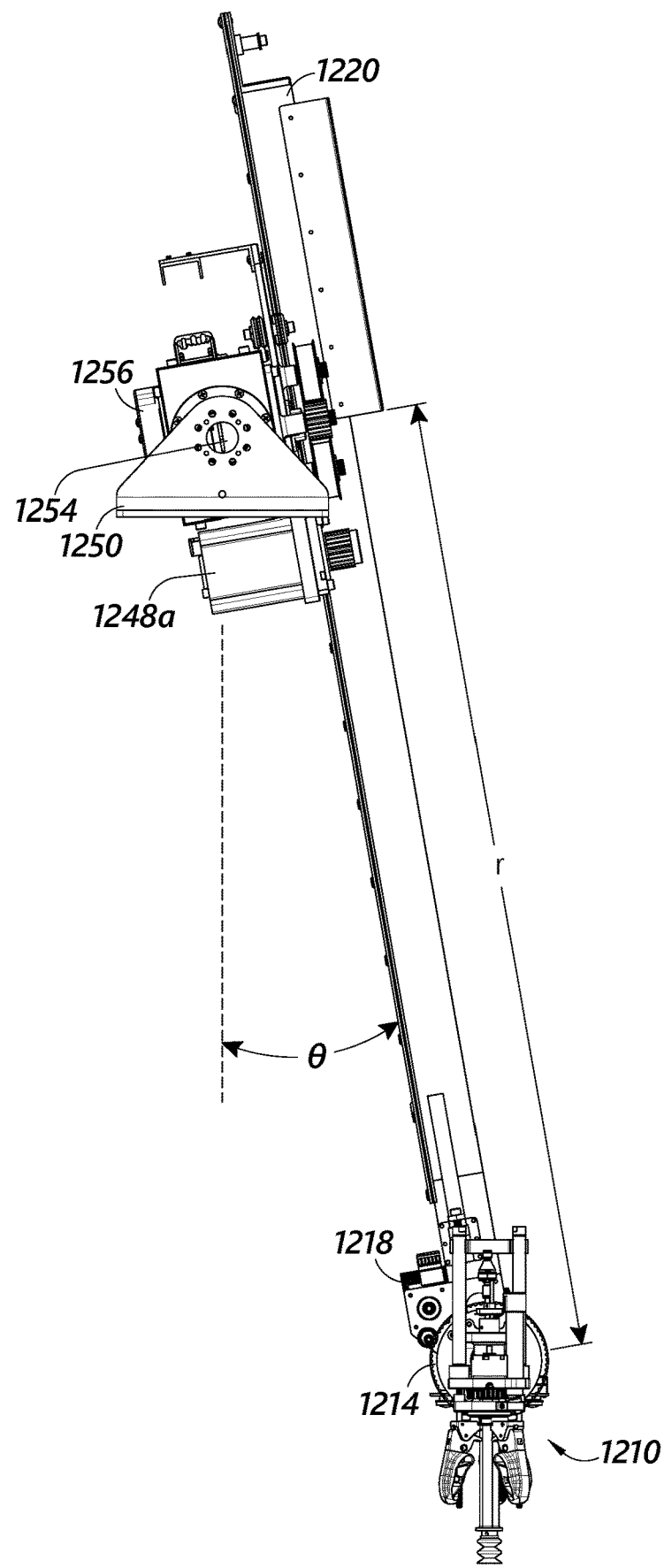
Figure 12F:
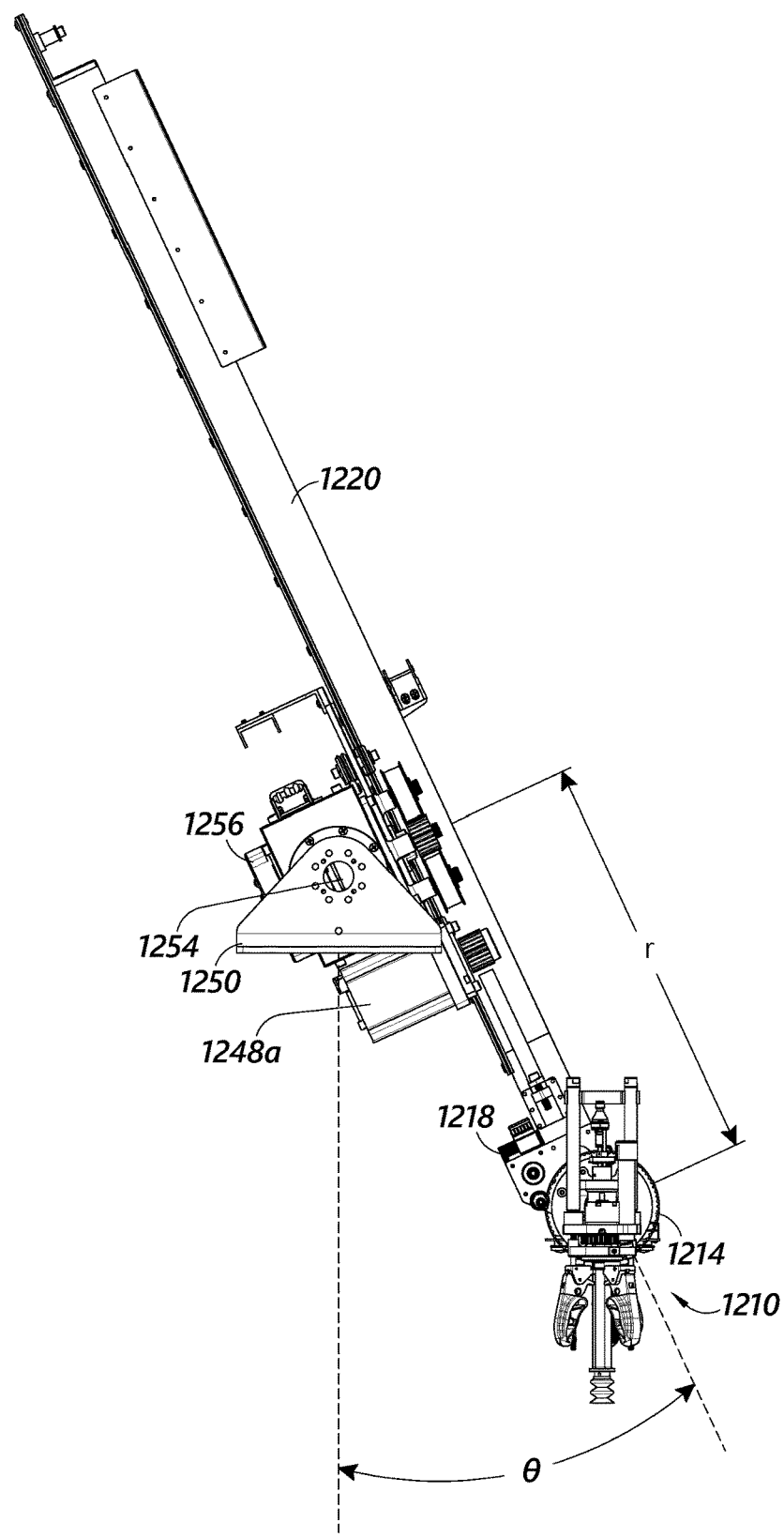
Figure 12G:
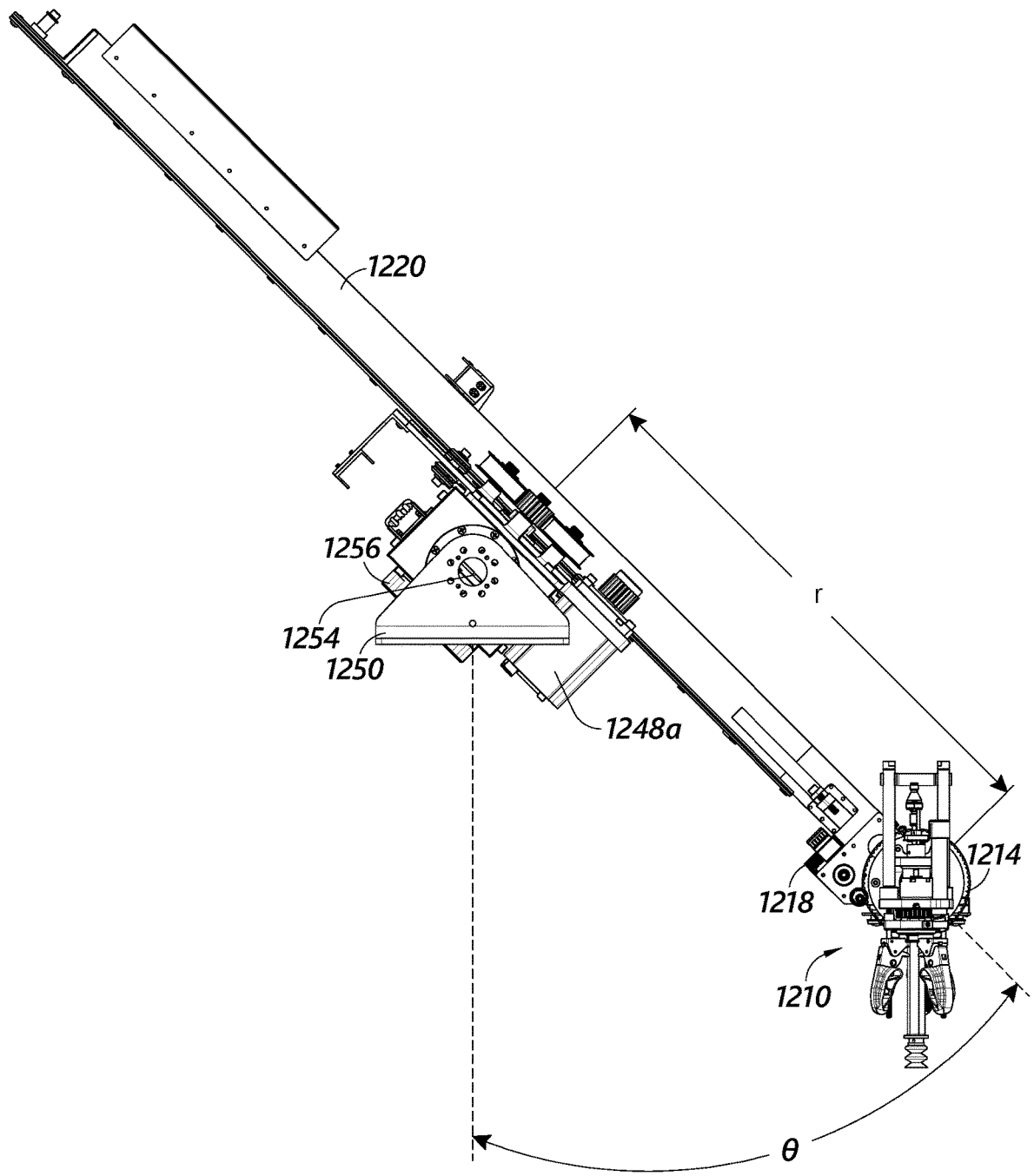

FIGS. 12E-12G illustrate example methods of moving the end effector 1210 using the robot 1200 with combined motion along the radial axis 1205 and about the first and second rotational axes 1207*a*, 1207*b*. It will be understood that the linear axes 1203 and 1205, and the first rotational axis 1207*a*, together form a cylindrical coordinate system. For a given position of the carriage 1230 along the longitudinal axis 1203, motion of the end effector 1210 occurs within a two-dimensional polar coordinate system in which the position of the end effector 1210 can be defined by a set of coordinates (r, θ), where r is defined by the displacement of the radial member 1220 relative to the carriage 1230, and θ is defined by the rotational position of the longitudinal member 1240 about the first rotational axis 1207*a*.

FIG. 12E depicts an initial position of the system in which the end effector 1210 is positioned generally below and slightly offset to the right relative to the mounting brackets 1250 and the longitudinal member 1240. To transition from the position of FIG. 12E to the position of FIG. 12F, the end effector 1210 moves directly upward and retains a vertical orientation. Such motion would be characterized in a Cartesian coordinate system as a change in the y-coordinate with a constant x-coordinate. In the polar coordinate system of the robot 1200, the same vertical motion is achieved by moving the radial member 1220 relative to the carriage 1230 such that r decreases, and rotating the carriage 1230 and radial member 1220 counterclockwise about the center of rotation 1254, as shown in FIG. 12F. As the carriage 1230 and radial member 1220 are rotated to increase θ, the end effector 1210 may also be rotated clockwise at the end effector actuator gear 1214 to maintain the end effector 1210 in a vertical orientation.

From the position shown in FIG. 12F, the system may then transition to the position of FIG. 12G. To transition to the position of FIG. 12G, the end effector 1210 moves directly to the right and retains a vertical orientation. Such motion would be characterized in a Cartesian coordinate system as a change in the x-coordinate with a constant y-coordinate. In the polar coordinate system of the robot 1200, the same vertical motion is achieved by moving the radial member 1220 relative to the carriage 1230 such that r increases, and rotating the carriage 1230 and radial member 1220 further counterclockwise about the center of rotation 1254, as shown in FIG. 12G. As the carriage 1230 and radial member 1220 are rotated to further increase θ, the end effector 1210 may also be rotated further clockwise at the end effector actuator gear 1214 to maintain the end effector 1210 in a vertical orientation.

In one example embodiment, an autonomous picking device comprises an end effector configured to pick items and a robot coupled to the end effector. The robot comprises a longitudinal member 1240 defining a first rotational axis 1207*a* extending along a length of the longitudinal member, the longitudinal member configured to rotate 1206*a* within the picking device about the first rotational axis, the longitudinal member further defining a first translational axis extending between a first end and a second end of the longitudinal member; a carriage 1230 defining a second translational axis 1205 extending between a first end and a second end of the carriage, the second translational axis perpendicular to the first translational axis of the longitudinal member, the carriage configured to translate along the first translational axis of the longitudinal member; a radial member 1220 defining a second rotational axis 1207*b* perpendicular to a length of the radial member at a distal end of the radial member, the radial member configured to translate along the second translational axis of the carriage; and a rotatable end effector mount coupling the end effector to the distal end of the radial member, the end effector configured to rotate 1206*b* within the picking device about the second rotational axis of the radial member.

Example Harvester According to the Present Disclosure

Figure 13A:
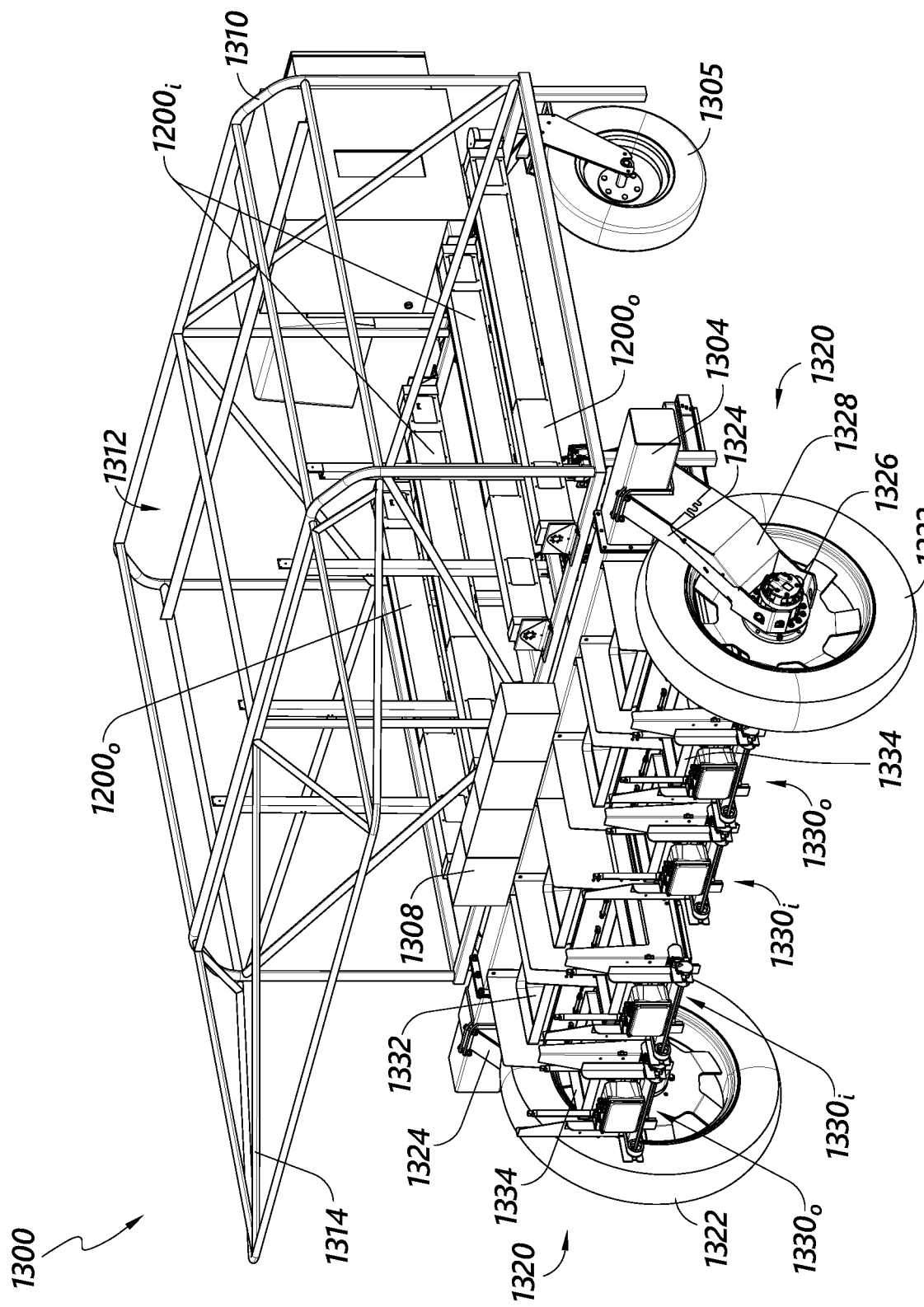
FIGS. 13A-13D depict an example embodiment of a harvester as described herein.
Figure 13B:
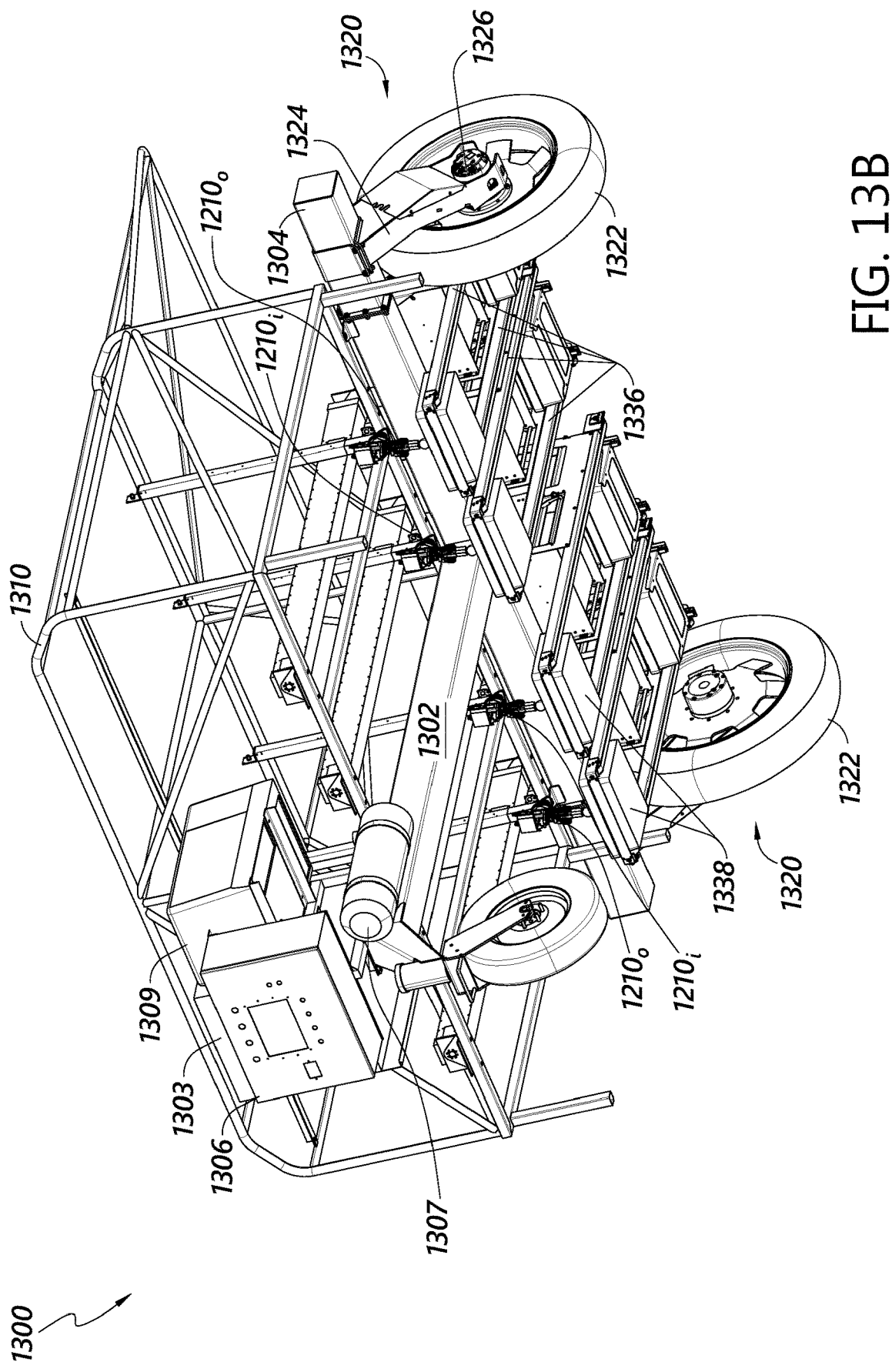
Figure 13C:
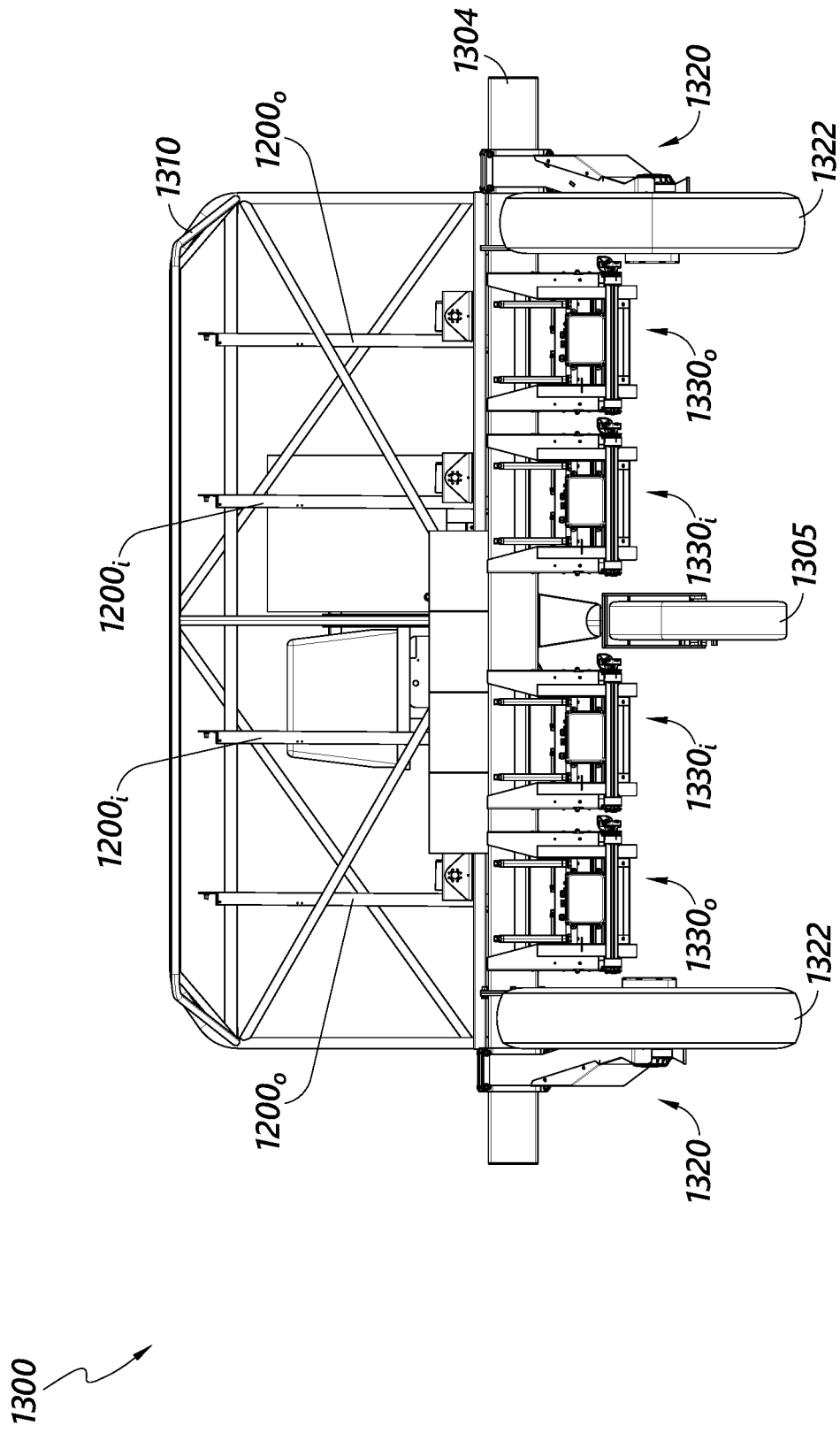
Figure 13D:
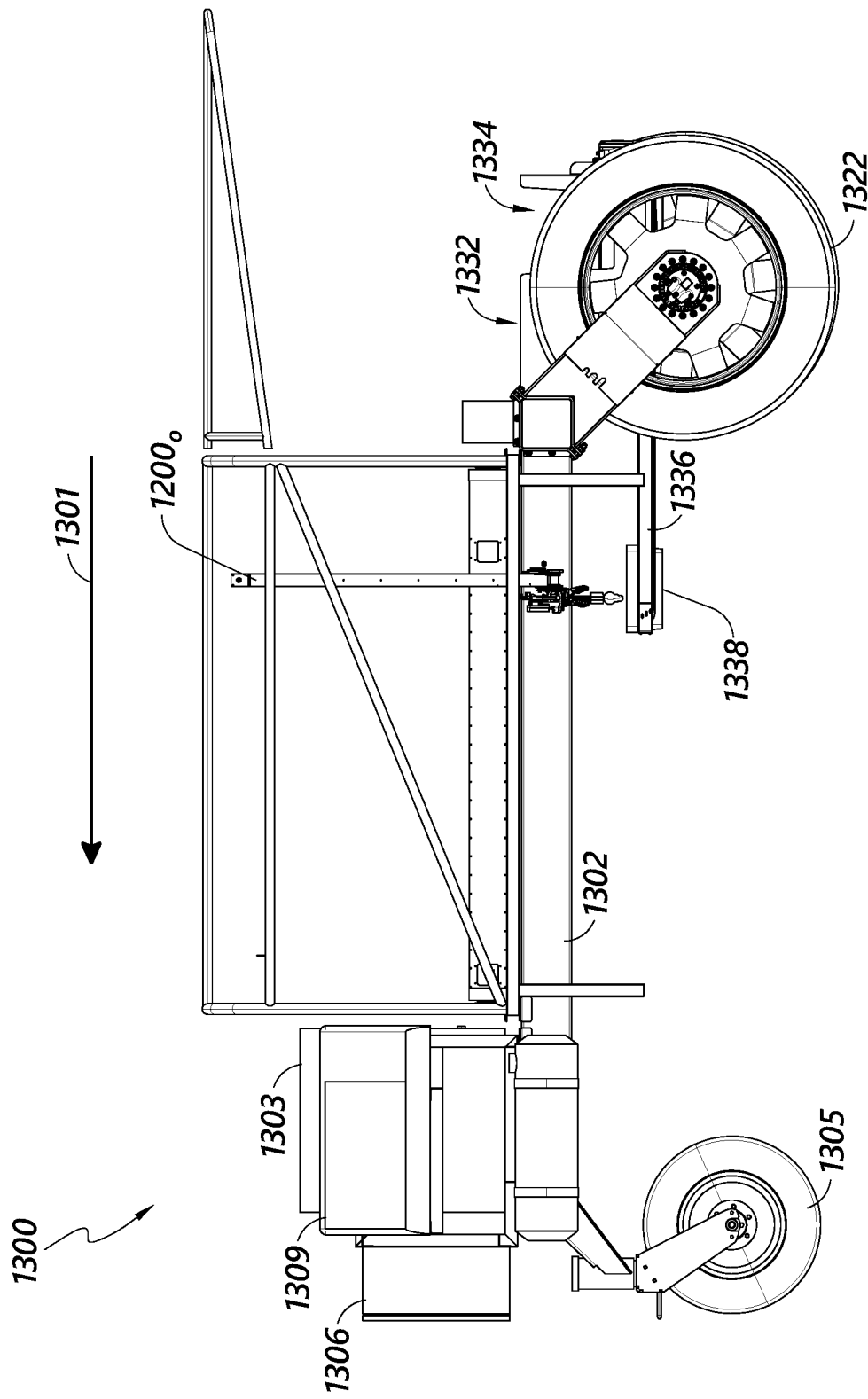

FIGS. 13A-13D depict a further example harvester 1300 in accordance with the systems and methods described herein. FIG. 13A is an upper, right, rear perspective view of the harvester 1300. FIG. 13B is a lower, left, front perspective view of the harvester 1300. FIG. 13C is a rear view of the harvester 1300. FIG. 13D is a side view of the harvester 1300. Referring jointly to FIGS. 13A-13D, the harvester 1300 is configured for harvesting berries or other items from a plurality of planting beds as the harvester 1300 travels along a forward direction 1301. The harvester 1300, or any component thereof, may be implemented in conjunction with any of the embodiments or aspects illustrated herein and described with reference to FIGS. 1-12G. Although the harvester 1300 will be described with reference to a particular set of features contained herein, the harvester 1300 is not limited to the particular components depicted in FIGS. 13A-13D, and may equally be implemented with fewer components, additional components, or different components relative to those of FIGS. 13A-13D.

The harvester 1300 includes a chassis including a longitudinal member 1302 and a lateral member 1304, a body 1310, drive wheel units 1320, robots 1200$_i$, 1200$_o$, and container handling units 1330$_i$, 1330$_o$. The body 1310, the drive wheel units 1320, and the container handling units 1330$_i$, 1330$_o$, as well as an air compressor 1303, a forward wheel 1305, a harvester control panel 1306, a generator fuel tank 1307, a vehicle power supply 1308, and a generator 1309, may be coupled to the longitudinal member 1302 and/or the lateral member 1304 of the chassis.

The body 1310 comprises a frame surrounding the work cell area including the robots 1200$_i$, 1200$_o$. The body 1310 may be a generally open frame, or may be enclosed by a skin 1312 to protect components such as the robots 1200$_i$, 1200$_o$ in the work cell area (e.g., from sun, precipitation, etc.). In some embodiments, a rear extension 1314 provides protection from sun or precipitation for items that have been picked and are being stored in containers at the rear of the harvester 1300.

Drive wheel units 1320 are mounted to the lateral member 1304 of the chassis and are configured to support and propel the harvester 1300. Each drive wheel unit 1320 includes a wheel 1322, a mounting arm 1324, a drive motor 1326, and a drive motor controller 1328. The drive wheel units 1320 are in wired or wireless communication with the harvester control panel 1306.

The chassis further supports a plurality of robots $1200_i$, $1200_o$, including two inboard robots $1200_i$ mounted medially near the longitudinal member 1302, and two outboard robots $1200_o$ mounted laterally outboard from the inboard robots $1200_i$. Each robot $1200_i$, $1200_o$ supports and moves an end effector $1210_i$, $1210_o$. As described elsewhere herein, all four of the robots $1200_i$, $1200_o$ may operate independently and simultaneously as the harvester 1300 travels along one or more rows of plants, and may be controlled so as to avoid collisions between adjacent robots $1200_i$, $1200_o$.

Container handling units $1330_i$, $1330_o$ are coupled to the lateral member 1304 of the chassis such that each container handling unit $1330_i$, $1330_o$ is aft of and substantially aligned with one of the robots $1200_i$, $1200_o$. Each container handling unit $1330_i$, $1330_o$ is configured to hold a stack of empty containers 1332 and/or a stack of filled containers 1334. Containers 1332, 1334 may be plastic, metal, cardboard, or other single-use or reusable containers. The container handling units $1330_i$, $1330_o$ are configured to move individual containers, such as an active container 1338, along rails 1336 between the stacks of containers 1332, 1334 and a forward position, as shown in FIG. 13D.

In one example process of operating the harvester 1300, a stack of empty containers 1332, such as reusable plastic containers or trays, is placed into each of the four container handling units $1330_i$, $1330_o$. The harvester 1300 is then positioned to span two beds with the drive wheel units 1320 positioned within the furrows on the outer sides of the two beds and the forward wheel 1305 positioned within the furrow between the two beds. The harvester 1300 may be driven forward until the forward wheel 1305 is aligned with a first plant along one or both beds. An autonomous driving mode may be engaged. As the harvester 1300 begins moving forward under the power of the drive wheel units 1320, each container handling unit $1330_i$, $1330_o$ drops a first empty container from the bottom of the stack of empty containers 1332 onto the rails 1336 to become the active container 1338. One or more motors (not shown) move the active container 1338 forward, toward a front end of the rails 1336.

In some embodiments, each container handling unit $1330_i$, $1330_o$ includes an optical sensor (e.g., a photo eye, light gate, proximity sensor, etc.), coupled to the rails 1336 and spaced aft of the front end of the rails 1336 by a distance approximately equal to the width of the containers 1332, 1334. As the front end of the active container 1338 reaches the optical sensor, the optical sensor asserts due to the presence of the wall of the active container 1338 at the optical sensor. As the active container 1338 continues moving forward, the rear end of the active container 1338 passes the optical sensor, causing the optical sensor to deassert. Deassertion of the optical sensor indicates to the container handling unit $1330_i$, $1330_o$ that the active container 1338 has reached the full forward position (e.g., the position illustrated in FIG. 13D), and causes the one or more motors to stop moving the active container 1338 forward. In some embodiments, the optical sensor can further be configured to detect a jam or malfunction of the tray handling unit $1330_i$, $1330_o$, such as if the optical sensor asserts and fails to deassert after a predetermined threshold time period.

When the active tray 1338 has reached the full forward position, the corresponding robot $1200_i$, $1200_o$ begins or continues picking items from the bed below, and deposits the picked items into the active container 1338. Each robot $1200_i$, $1200_o$ continues picking items until a processing component of the harvester 1300 determines that the active container 1338 is full. The active container 1338 may be determined to be full by various methods, for example, based on a weight change of the active container 1338, based on an optically detected level of items resting in the active container 1338, and/or based on an item count. For example, the harvester 1300 may be configured such that each active container 1338 is determined to be full when the corresponding robot $1200_i$, $1200_o$ has picked a predetermined number of items since the current active container 1338 was positioned. The predetermined number may be selected based on an empirically determined average size of the items or average number of items needed to fill a container.

When the active container 1338 is determined to be full, the corresponding robot $1200_i$, $1200_o$ temporarily stops depositing items into the active container 1338. The one or more motors move the active container 1338 rearward to the location of the stack of filled containers 1334. After the active container 1338 passes the stack of empty containers 1332, the bottom container of the stack of empty containers 1332 is dropped onto the rails 1336, where the bottom container becomes the new active container 1338 and is moved forward to receive additional items picked by the corresponding robot $1200_i$, $1200_o$. The process repeats, with each filled active container 1338 being moved backward when full to form the new bottom tray of the stack of filled containers 1334 and a new active container 1338 being lowered from the stack of empty containers 1332. When all empty trays 1332 have been filled, all of the containers in the harvester 1300 are full and are located within one of the stacks of filled containers 1334, which are located at the rear of the harvester 1300 such that they may be easily removed by an attendant.

In some embodiments, the harvester 1300 is at least partially modular such that it can be reconfigured as desired to pick items from fields having different bed widths. For example, some strawberry growing operations are implemented with beds having a width of 64 inches, while other strawberry growing operations use beds having a width of 48 inches. In the configuration illustrated in FIGS. 13A-13D, the wheels 1322 of the drive wheel units 1320 may each be offset laterally relative to the forward wheel 1305 by approximately 64 inches, corresponding to the distance between adjacent furrows in a field having 64-inch beds. In this configuration, the harvester 1300 can pick items from two adjacent 64-inch beds simultaneously, with two of the robots $1200_i$, $1200_o$ disposed above and picking from each bed. However, this configuration would not be suitable for a field having 48-inch beds, because the wheels 1322 of the drive wheel units 1320 would need to be offset relative to the forward wheel 1305 by either 48 inches or 96 inches in order to rest in a furrow.

In order to pick items from 48-inch beds, the harvester 1300 may be reconfigured by removing the drive wheel units 1320, the outboard robots $1200_o$, and the outboard container handling units $1330_o$. The inboard robots $1200_i$ and the inboard container handling units $1330_i$ may be left in place. After removing the outboard components, the drive wheel units 1320 may be reattached adjacent to the inboard container handling units $1330_i$ such that the wheels 1322 are laterally offset relative to the forward wheel 1305 by approximately 48 inches. The outboard container handling units $1330_o$ may then be reattached outboard of the drive wheel units 1320, and the outboard robots $1200_o$ may be reattached such that they are substantially aligned with the outboard container handling units $1330_o$. In this configuration, the harvester 1300 can pick items from four adjacent 48-inch beds simultaneously, with one of the robots $1200_i$, $1200_o$ disposed above and picking from each bed. Such reconfiguration of the harvester 1300 to service fields having variable bed widths, is facilitated by the use of self-contained drive wheel units 1320 which may easily be detached and attached as standalone units.

ADVANTAGES OF IMPLEMENTATIONS OF THE PRESENT DISCLOSURE

Without limiting the scope of the foregoing description, additional advantageous features of certain embodiments of the present disclosure will now be described.

Some embodiments may be advantageously adapted for picking of delicate items such as berries or other agricultural products. If these objects are bruised, scratched, discolored, or otherwise harmed by the picking process, they become nearly worthless. In some aspects, features such as resilient or cushioned gripper fingers, grasp force sensing, and untensioning and rotating during a harvesting process as described herein, may reduce the amount of force exerted against items and thereby reduce the probability of damaging the items during harvesting. Such harvesting without damaging the items is especially advantageous in the example of berries or other objects that must be disengaged from a tether (for example, a stem), rather than simply being picked up.

Real-time control, termination, and/or modification of harvesting processes may also be advantageous. As described above, a pick may be unsuccessful if a berry is not removed from the plant or subsequently dropped. However, certain real-time control methods described herein may permit dropped berries to be re-picked. A dropped berry may remain within the work volume, and can be picked later by a second pass of the robot or a different robot, or by hand. In some cases, a dropped berry may be immediately re-attempted by moving the end effector upward by a short distance (e.g., a few inches), detecting and localizing the berry again, and trying again from the short distance, rather than returning to a high-level scan state.

In some embodiments, the harvester may enhance efficiency by not trying to pick every possible berry within the work volume. Embodiments of the presently-disclosed harvesters can be configured to attempt to pick all possible berries, but in many cases it may be intended to achieve a particular efficiency or pick rate. For example, a harvester may be designed to pick a certain percentage of candidate strawberries less than 100% to ensure that the strawberries are picked in an optimal harvest window. Berries that are not picked may be recovered later. In another example, the harvester may pick a percentage of fruit that is in a particular range of ripeness, which may be user-adjustable such that the user may decide which fruit is most desirable to harvest.

In some embodiments, the parameters of a candidate berry can be adjusted to take into account many different considerations. In some non-limiting examples, some plants are more dense and hide strawberries better, older plants tend to have longer stems that can be broken more easily, the field may need to be picked within a specified time frame for environmental or cost reasons, a user may desire a particular yield or to only pick berries that meet higher quality standards, a user may desire to clear all strawberries in the field because they are diseased or otherwise undesirable, or any combination of these conditions and parameters may exist. In one particular example, a harvester may be used to quickly pick the best berries in a field before the arrival of an incoming freeze, storm, or other environmental event.

In some embodiments, harvesters may be configured to prioritize the health and survival of the plants. As described above with reference to FIGS. 1-3, some embodiments of harvesters described herein are configured to be supported within furrows between rows of plants, rather than traveling in contact with the rows. This configuration, in which the harvesting components are suspended above the plants, prevents trampling or other damage that may prevent the plants from producing additional fruit in the future. In another example, certain steps of the harvesting processes described above may further promote plant health. For example, rotating the berry before the final separation from the stem may protect not just the berry from damage, but also the plant, due to the reduction in force required to separate the berry from the stem.

Further Use Cases

It will be appreciated that the systems and methods described herein are not limited to the context of picking horizontally-grown strawberries or other fruit that are positioned in a horizontally-grown plant in the same or similar orientation as strawberry plants. Rather, the harvesters, work cells, robots, end effectors, and all components thereof, as described herein, may be use for a wide variety of implementations.

In one example, grapes or other vine crops, vertically-grown strawberries, and the like may be similarly picked and/or harvested using the systems and methods described herein. Because vine crops generally grow in a substantially vertical orientation, such harvesters may be configured such that the robots to which the end effectors are mounted are located in a horizontal, rather than a vertical, orientation. For example, the robots of FIGS. 12A-12G may be mounted in a position rotated by approximately 90 degrees about the longitudinal member relative to the orientation depicted herein, such that they can manipulate one or more end effectors to pick items from a substantially vertical picking environment. The computer vision systems described herein may be configured to identify vine crops based on color, shaped, bunch shape, or other criteria to reliably identify grapes or other vine crops to be picked. In some embodiments, end effectors configured for picking of vine crops may further include one or more blades or other cutting or snipping elements in order to allow for snipping of bunches rather than harvesting of individual grapes or other vine fruits.

In some embodiments, blades or other cutting or snipping elements may further be employed for pruning of various crops. For example, trees producing almonds, walnuts, peaches, cherries, or other tree crops may require pruning which may easily be accomplished using the systems disclosed herein.

Other ground crops may further be harvested using the systems and methods of the present disclosure. For example, cucumbers, watermelons, other melons, broccoli, cauliflower, asparagus, and the like, may all be harvested by the harvesters described herein. In some embodiments, modifications to the disclosed end effectors may include changes in the size and placement of fingers, gripping forces, etc., as required to reliably harvest each individual type of ground crop.

Implementing Systems and Terminology

Implementations disclosed herein provide systems, methods, and devices for autonomous selection and retrieval of items using robots. One skilled in the art will recognize that these embodiments may be implemented in hardware or a combination of hardware and software and/or firmware.

Embodiments of robots according to the present disclosure may include one or more sensors (for example, image sensors), one or more signal processors (for example, image signal processors), and a memory including instructions or modules for carrying out the processes discussed above. The robot may also have data, a processor loading instructions and/or data from memory, one or more communication interfaces, one or more input devices, one or more output devices such as a display device and a power source/interface. The device may additionally include a transmitter and a receiver. The transmitter and receiver may be jointly referred to as a transceiver. The transceiver may be coupled to one or more antennas for transmitting and/or receiving wireless signals.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the present disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

The methods disclosed herein include one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). Further, the term "comprising" as used herein is synonymous with "including," "containing," or "characterized by," and is inclusive or open-ended and does not exclude additional, unrecited elements or method steps. Accordingly, the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like. The phrase "based on" does not mean "based only on," unless expressly specified otherwise. In other words, the phrase "based on" describes both "based only on" and "based at least on."

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present disclosure. Embodiments of the present disclosure are susceptible to modifications in the methods and materials, as well as alterations in the fabrication methods and equipment. Such modifications will become apparent to those skilled in the art from a consideration of this disclosure or practice of the present disclosure. Consequently, it is not intended that the present disclosure be limited to the specific embodiments disclosed herein, but that it cover all modifications and alternatives coming within the true scope and spirit of the present disclosure as embodied in the attached claims.

What is claimed is:

1. An end effector for a picking robot, the end effector comprising:
   a shaft extending along a longitudinal axis between a proximal end and a distal end;
   a carriage configured to rotate about and translate along an intermediate portion of the shaft between a proximal position and a distal position;
   a suction device coupled to the distal end of the shaft; and
   a plurality of fingers spaced radially about the carriage, each finger coupled to the carriage by a hinge and extending distally from the carriage, the plurality of fingers configured to envelop the intermediate portion of the shaft when the carriage is in the proximal position, the plurality of fingers further configured to envelop a target object space comprising the distal end of the shaft and the suction device when the carriage is in the distal position;
   wherein the suction device comprises at least one sensor configured to detect the presence of an object within the target space, wherein the at least one sensor comprises a linear position sensor or a 3D force sensor, wherein the object within the target object space is tethered to a stationary object, and wherein the at least one sensor is configured to detect a direction at which the object is tethered to the stationary object.

2. The end effector of claim 1, wherein the suction device is configured to apply a vacuum to the target object space when the carriage is in the proximal position and in the distal position.

3. The end effector of claim 1, wherein the suction device is a distal-most portion of the end effector when the carriage is in the proximal position, and wherein the plurality of fingers are the distal-most portion of the end effector when the carriage is in the distal position.

4. The end effector of claim 1, wherein the plurality of fingers do not envelop the distal end of the shaft when the carriage is in the proximal position.

5. The end effector of claim 1, wherein the plurality of fingers are configured to envelop an object within the target object space when the carriage is in the distal position.

6. The end effector of claim 1, wherein each of the plurality of fingers is configured to rotate about the hinge toward the longitudinal axis of the shaft.

7. The end effector of claim 6, wherein a volume of the target object space decreases when each of the plurality of fingers rotates toward the longitudinal axis of the shaft.

8. The end effector of claim 1, wherein the carriage is rotationally fixed about the shaft, and wherein the shaft is rotatably mounted within the end effector such that the carriage is rotatable by rotating the shaft about the longitudinal axis.

9. The end effector of claim 1, wherein the shaft comprises a collar extending radially outward about the distal end of the shaft, wherein each finger comprises a finger extension extending radially inward toward the longitudinal axis at a proximal end of the finger, and wherein, as the carriage moves from the proximal position towards the distal position, the finger extension is configured to contact the collar before the carriage reaches the distal position.

10. The end effector of claim 9, wherein movement of the carriage to the distal position following contact of each finger extension with the collar causes each finger to rotate about the hinge toward the longitudinal axis.

11. The end effector of claim 9, wherein movement of the carriage to the distal position following contact of each finger extension with the collar causes the volume of the target object space to decrease.

12. The end effector of claim 1, wherein each finger comprises a force sensor configured to detect a force exerted between the finger and an object within the target object space.

13. The end effector of claim 12, wherein the force exerted between the finger and the object comprises at least one of a normal force and a shear force.

14. The end effector of claim 1, wherein the suction device further comprises a vacuum sensor.

15. The end effector of claim 1, further comprising a camera coupled to the end effector and processing circuitry configured to detect target objects based at least in part on images obtained from the camera.

16. The end effector of claim 15, wherein the processing circuitry is further configured to determine target object locations with respect to a coordinate system based at least in part on the images obtained from the camera.

17. The end effector of claim 16, wherein the processing circuitry is further configured to share at least one of image data and target object location data with processing circuitry associated with a second end effector.

18. The end effector of claim 1, wherein the suction device is a suction cup comprising a collapsible bellows.

19. The end effector of claim 1, wherein the end effector is coupled to a picking robot of a movable harvester.

20. The end effector of claim 19, wherein the harvester further comprises a LIDAR system configured to guide the harvester along a path parallel to a furrow of an agricultural field based on detection of at least a portion of a profile of the furrow.

21. An end effector for a picking robot, the end effector comprising:
- a shaft extending along a longitudinal axis between a proximal end and a distal end, the shaft comprising a collar extending radially outward about the distal end of the shaft;
- a carriage configured to rotate about and translate along an intermediate portion of the shaft between a proximal position and a distal position;
- a suction device coupled to the distal end of the shaft; and
- a plurality of fingers spaced radially about the carriage, each finger coupled to the carriage by a hinge and extending distally from the carriage, the plurality of fingers configured to envelop the intermediate portion of the shaft when the carriage is in the proximal position, the plurality of fingers further configured to envelop a target object space comprising the distal end of the shaft and the suction device when the carriage is in the distal position, each finger comprising a finger extension extending radially inward toward the longitudinal axis at a proximal end of the finger;
- wherein, as the carriage moves from the proximal position towards the distal position, the finger extension is configured to contact the collar before the carriage reaches the distal position.

22. The end effector of claim 21, wherein movement of the carriage to the distal position following contact of each finger extension with the collar causes each finger to rotate about the hinge toward the longitudinal axis.

23. The end effector of claim 21, wherein movement of the carriage to the distal position following contact of each finger extension with the collar causes the volume of the target object space to decrease.

24. The end effector of claim 21, wherein the suction device is configured to apply a vacuum to the target object space when the carriage is in the proximal position and in the distal position.

25. The end effector of claim 21, wherein the suction device is a distal-most portion of the end effector when the carriage is in the proximal position, and wherein the plurality of fingers are the distal-most portion of the end effector when the carriage is in the distal position.

* * * * *